United States Patent
Kawai

(10) Patent No.: US 11,482,917 B2
(45) Date of Patent: Oct. 25, 2022

(54) POWER CONVERSION DEVICE

(71) Applicant: Mitsubishi Electric Corporation, Tokyo (JP)

(72) Inventor: Yu Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 95 days.

(21) Appl. No.: 17/258,458

(22) PCT Filed: Sep. 28, 2018

(86) PCT No.: PCT/JP2018/036251
§ 371 (c)(1),
(2) Date: Jan. 7, 2021

(87) PCT Pub. No.: WO2020/065918
PCT Pub. Date: Apr. 2, 2020

(65) Prior Publication Data
US 2021/0281159 A1    Sep. 9, 2021

(51) Int. Cl.
*H02M 1/00* (2006.01)
*H02M 1/08* (2006.01)
*H02M 3/158* (2006.01)
*H02M 7/5387* (2007.01)

(52) U.S. Cl.
CPC .......... *H02M 1/0009* (2021.05); *H02M 1/08* (2013.01); *H02M 3/158* (2013.01); *H02M 7/53871* (2013.01)

(58) Field of Classification Search
CPC ...... H02M 1/0009; H02M 1/08; H02M 3/158; H02M 7/53871; H02M 1/0003
See application file for complete search history.

(56) References Cited

U.S. PATENT DOCUMENTS

| 6,335,871 B1 | 1/2002 | Kita et al. | |
| 7,173,393 B2 * | 2/2007 | Maeda | H02P 27/06 318/803 |
| 8,159,163 B2 * | 4/2012 | Akiyama | H02P 21/34 318/400.11 |

(Continued)

FOREIGN PATENT DOCUMENTS

| JP | 8-107683 A | 4/1996 |
| JP | 11-18433 A | 1/1999 |

(Continued)

OTHER PUBLICATIONS

International Search Report and Written Opinion dated Dec. 25, 2018, received for PCT Application PCT/JP2018/036251, Filed on Sep. 28, 2018, 11 pages including English Translation.

*Primary Examiner* — Kyle J Moody
(74) *Attorney, Agent, or Firm* — Xsensus LLP

(57) ABSTRACT

A PWM control unit generates signals for controlling switching elements in respective legs based on the magnitude relationship between individual Duty commands for the respective legs and triangular wave carriers having different initial phases and having a common cycle, a current estimation unit acquires detected values from a current detector at a sampling cycle different from the carrier cycle and estimates the phase currents, and a current control unit adjusts Duty commands so that the estimated phase currents coincide with target values for the phase currents.

20 Claims, 51 Drawing Sheets

(56) References Cited

U.S. PATENT DOCUMENTS

| | | | |
|---|---|---|---|
| 10,526,007 B2 * | 1/2020 | Furukawa | H02P 27/14 |
| 10,547,265 B2 * | 1/2020 | Kim | H02P 23/14 |
| 2009/0160248 A1 | 6/2009 | Ang | |

FOREIGN PATENT DOCUMENTS

| | | | |
|---|---|---|---|
| JP | 2007-159345 A | 6/2007 |
| JP | 2008-42983 A | 2/2008 |
| JP | 5325561 B2 | 10/2013 |
| JP | 2013-240133 A | 11/2013 |
| JP | 2017-28950 A | 2/2017 |

* cited by examiner

FIG. 11

| Duty[%] | | 12 | 13 | 14 | 15 | 16 | 17 |
|---|---|---|---|---|---|---|---|
| D1* | D2* | \|Z\|, PHASE CURRENT ESTIMATION: ENABLED (O), DISABLED (×) | | | | | |
| GREATER THAN 50% | GREATER THAN 50% | -1, O | -1, O | -1, O | 0, × | -1, O | -1, O |
| | LESS THAN 50% | 0, × | 0, × | 0, × | -1, O | -1, O | 0, × |
| LESS THAN 50% | GREATER THAN 50% | 0, × | -1, O | 0, × | -1, O | 0, × | 0, × |
| | LESS THAN 50% | 0, × | 0, × | 0, × | -1, O | 0, × | 0, × |

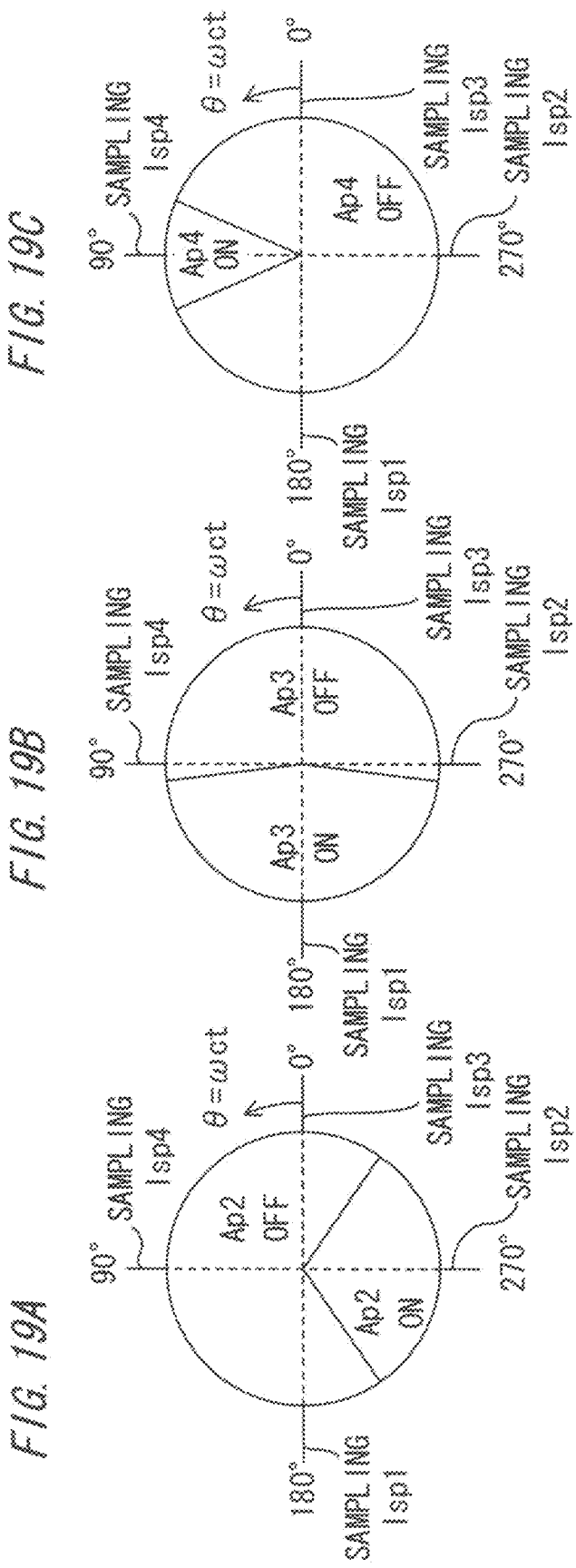

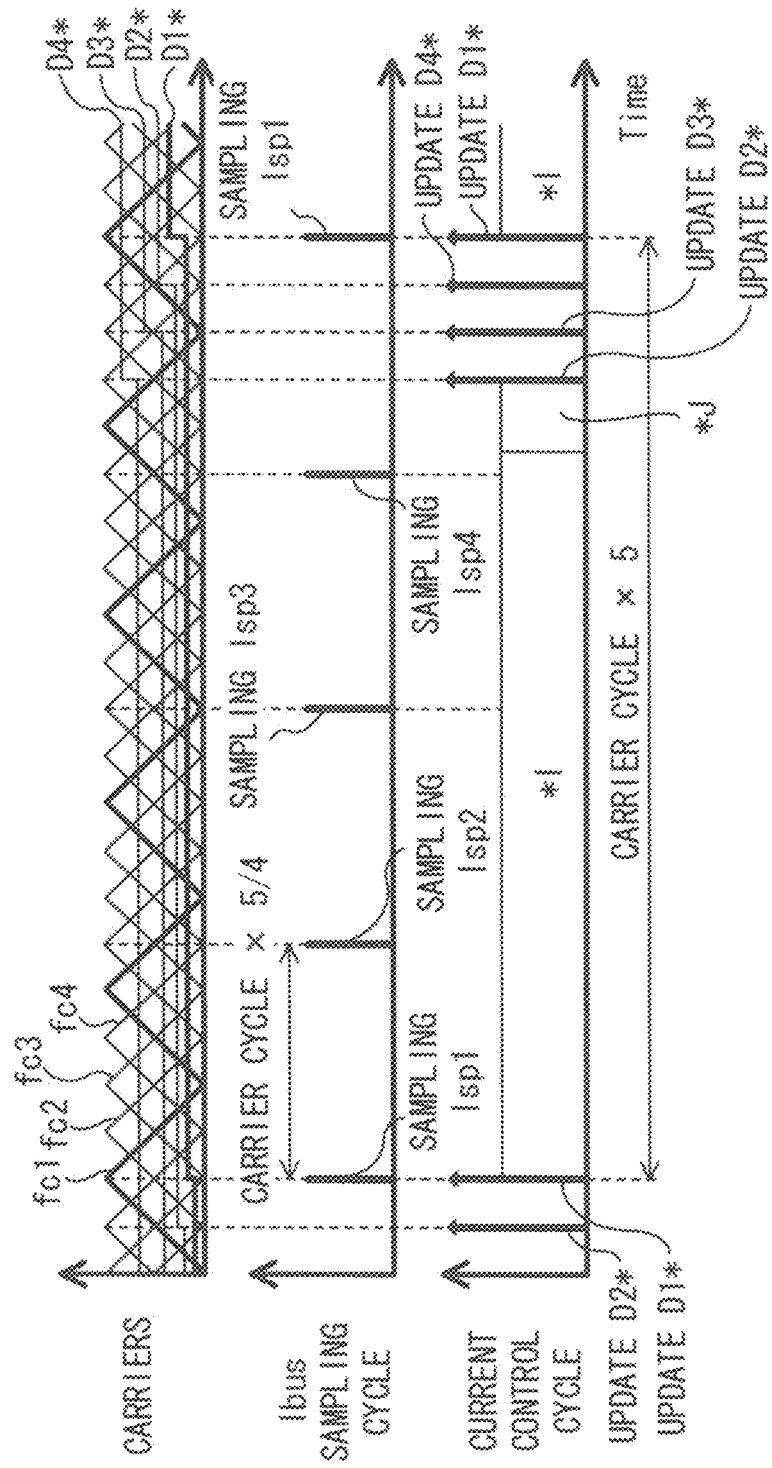

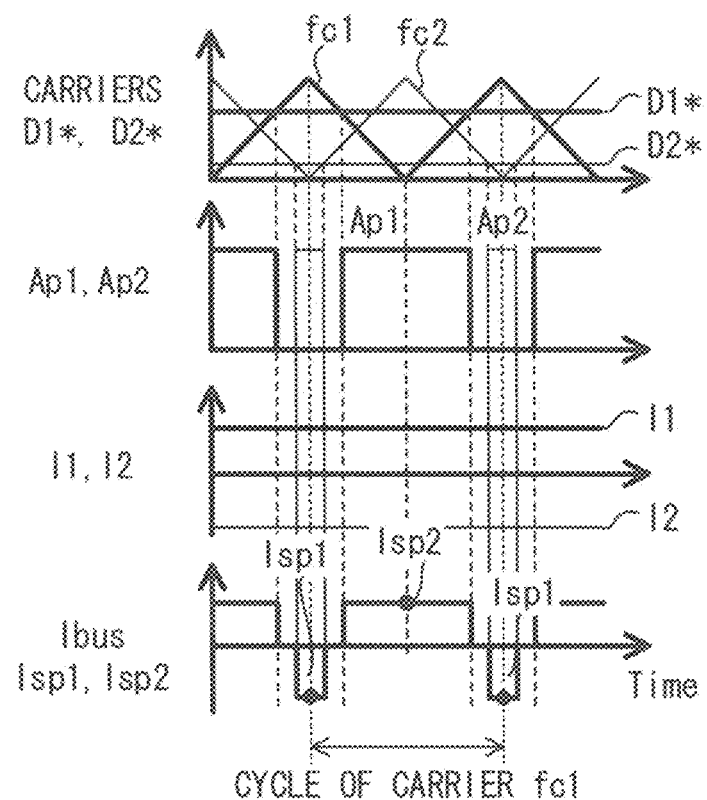

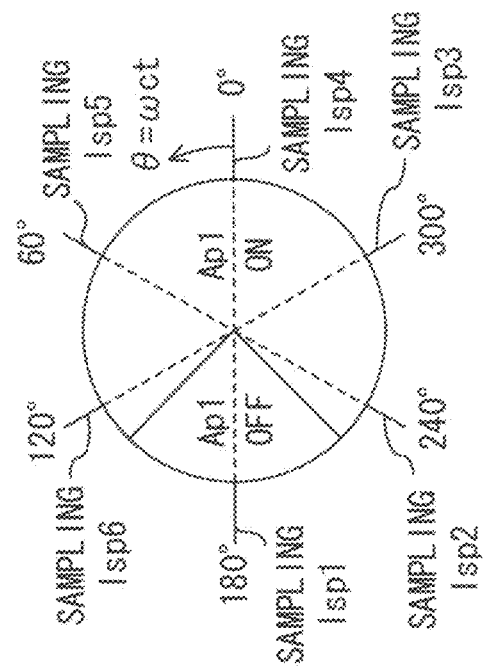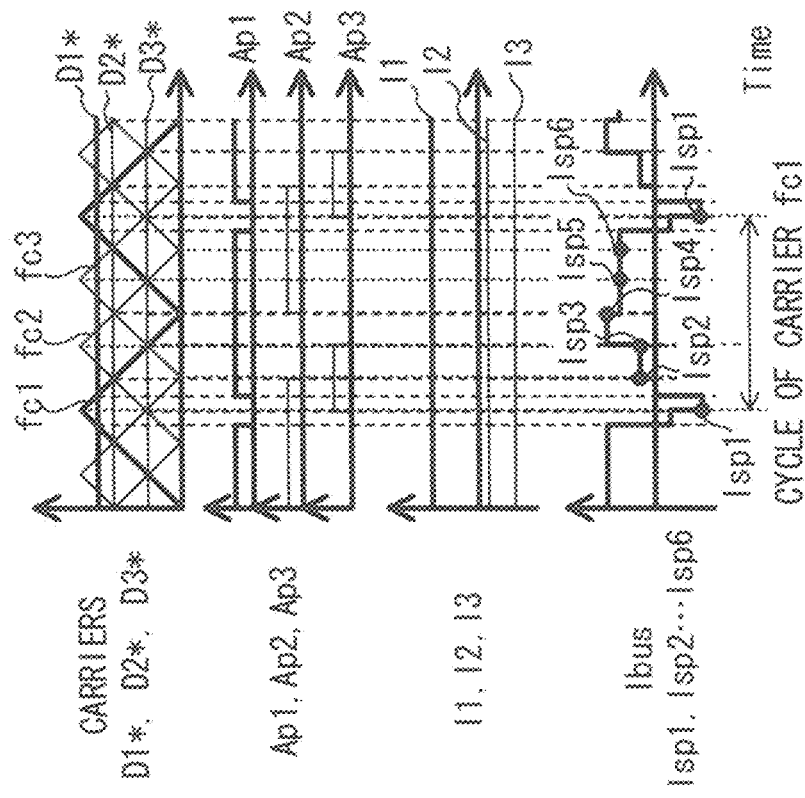
FIG. 34A
FIG. 34B

POWER CONVERSION DEVICE

CROSS-REFERENCE TO RELATED APPLICATION

The present application is based on PCT filing PCT/JP2018/036251, filed Sep. 28, 2018, the entire contents of which are incorporated herein by reference.

TECHNICAL FIELD

The present disclosure relates to technology in which, in a power converter including an inverter or a converter having a plurality of legs provided to a common DC bus, phase current for each leg is estimated from current generated in the common DC bus.

BACKGROUND ART

A multiphase power converter is used for size reduction of the power converter and allowing input from different power supplies. In general, a multiphase converter requires the same number of current detectors as the number of phases to control current for each phase.

As technology for reproducing each phase current using sampling information of pulse current generated in a common DC bus, a method using switching patterns of a three-phase inverter and characteristics that the sum of three-phase currents is zero, is disclosed (for example, Patent Document 1).

In addition, as technology for reproducing each phase current using plural pieces of sampling information of pulse current generated in a common DC bus, a method using difference in switch-ON/OFF states at plural times of sampling in a multiphase converter, is disclosed (for example, Patent Document 2).

CITATION LIST

Patent Document

Patent Document 1: Japanese Patent No. 5325561 (paragraphs [0022]-[0028], [0051]-[0057], and FIGS. 1, 5, 6)

Patent Document 2: Japanese Laid-Open Patent Publication No. 2017-28950 (paragraphs [0009], [0035]-[0044], [0046]-[0053], and FIGS. 1 to 3)

SUMMARY OF THE INVENTION

Problems to be Solved by the Invention

In Patent Document 1, Duty commands for the respective three legs are compared with a common triangular wave carrier, to generate ON/OFF signals, and each phase current is estimated using two pieces of sampling information per one carrier cycle and characteristics that the sum of three-phase AC currents is zero. However, in a condition in which, when the voltage for one phase of the three-phase AC is the maximum value or the minimum value, the voltages for the other two phases cross, two pieces of sampling information cannot be acquired, and therefore reproduction error occurs. Further, there is a problem that two pieces of sampling information cannot be acquired at a fixed cycle.

In Patent Document 2, each phase current is estimated using a matrix expression in which the switch ON/OFF states of the respective legs at each sampling timing for DC bus current are represented by 0 and 1. Therefore, there is a problem that, when the matrix is not a regular matrix, the estimation cannot be performed. Although a measure for this problem is described, this causes a problem that estimation delay occurs due to power detection.

The present disclosure has been made to solve the above problems, and aims to provide means for achieving improvement against estimation error and estimation delay with a fixed sampling cycle, and estimating each phase current by selecting the same number of detected currents as phases from detected currents sampled for not less than the number of phases within a constant cycle based on the sampling cycle and the carrier cycle of triangular wave carriers.

Solution to the Problems

A power conversion device according to the present disclosure includes: a power conversion unit including a plurality of legs each formed by connecting a pair of two arms on upper and lower sides, each arm including a switching element, where current flowing through a path connected to a middle point between the two arms in each leg is defined as phase current, both ends of each of the plurality of legs being connected to a common DC bus; a current detector for measuring current flowing through the common DC bus; a PWM control unit for generating ON/OFF signals for controlling the switching elements of the upper and lower arms in the legs; a current estimation unit for estimating the phase current; and a current control unit for controlling the phase current. The PWM control unit generates the ON/OFF signals for controlling the switching elements in the legs based on a magnitude relationship between individual Duty commands for the respective legs and triangular wave carriers having different initial phases for the respective legs and having a common cycle. The current estimation unit acquires detected values from the current detector at a sampling cycle different from the carrier cycle of the triangular wave carriers, and estimates the phase currents of the legs. The current control unit adjusts the Duty commands so that the estimated phase currents coincide with target values for the phase currents.

A power conversion device according to the present disclosure includes: a power conversion unit including a plurality of legs each formed by connecting a pair of two arms on upper and lower sides, each arm including a switching element, where current flowing through a path connected to a middle point between the two arms in each leg is defined as phase current, both ends of each of the plurality of legs being connected to a common DC bus; a current detector for measuring current flowing through the common DC bus; a PWM control unit for generating ON/OFF signals for controlling the switching elements of the upper and lower arms in the legs; a current estimation unit for estimating the phase current; and a current control unit for controlling the phase current. A transformer path on a primary side or a secondary side of an isolation converter that operates with a phase shift is connected to a plurality of the paths for the phase currents of the power conversion unit. The PWM control unit generates the ON/OFF signals for controlling the switching elements in the legs based on a magnitude relationship between individual phase shift commands for the respective legs and triangular wave carriers having different initial phases for the respective legs and having a common cycle. The current estimation unit acquires detected values from the current detector at a sampling cycle different from the carrier cycle of the triangular wave carriers and synchronized with a timing coinciding with a maximum value and a minimum value of a plurality of the triangular wave carriers, and estimates the phase currents. The current control unit adjusts the phase shift commands so that the estimated phase currents coincide with target values for the phase currents.

Effect of the Invention

In the power conversion device according to the present disclosure, the PWM control unit generates ON/OFF signals for controlling the switching elements in the legs based on the magnitude relationship between the individual Duty commands for the respective legs and the triangular wave carriers having different initial phases for the respective legs and having a common cycle, the current estimation unit acquires detected values from the current detector at a sampling cycle different from the carrier cycle of the triangular wave carriers, and estimates the phase currents of the legs, and the current control unit adjusts the Duty commands so that the estimated phase currents coincide with the target values for the phase currents. Thus, different power supplies can be connected to the respective phases, and stable current estimation with a fixed cycle and current control based thereon are achieved.

In the power conversion device according to the present disclosure, the PWM control unit generates ON/OFF signals for controlling the switching elements in the legs based on the magnitude relationship between the individual phase shift commands for the respective legs and the triangular wave carriers having different initial phases for the respective legs and having a common cycle, the current estimation unit acquires detected values from the current detector at a sampling cycle different from the carrier cycle of the triangular wave carriers and synchronized with a timing coinciding with the maximum value and the minimum value of a plurality of the triangular wave carriers, and estimates the phase currents, and the current control unit adjusts the phase shift commands so that the estimated phase currents coincide with the target values for the phase currents. Thus, different power supplies can be connected to the respective phases, and stable current estimation with a fixed cycle and current control based thereon are achieved.

BRIEF DESCRIPTION OF THE DRAWINGS

FIG. 11 illustrates a determinant calculation result and whether or not it is possible to derive an inverse matrix in the setting example 2 for the representative configuration 1 of the power conversion device according to embodiment 1.

FIG. 19A illustrates the setting example 1 for triangular wave carriers and current detection timings in the representative configuration 3 of the power conversion device according to embodiment 1.

FIG. 19B illustrates the setting example 1 for triangular wave carriers and current detection timings in the representative configuration 3 of the power conversion device according to embodiment 1.

FIG. 19C illustrates the setting example 1 for triangular wave carriers and current detection timings in the representative configuration 3 of the power conversion device according to embodiment 1.

FIG. 20 illustrates the setting example 1 for a carrier cycle, a sampling cycle, phase current estimation, and a Duty command update cycle, in which a problem remains in estimation for each phase current, in the representative configuration 3 of the power conversion device according to embodiment 1.

FIG. 30 illustrates a setting example 1 for triangular wave carriers and current detection timings in the representative configuration 4 of the power conversion device according to embodiment 1.

FIG. 34A illustrates a setting example 1 for triangular wave carriers and current detection timings in the representative configuration 5 of the power conversion device according to embodiment 1.

FIG. 34B illustrates the setting example 1 for triangular wave carriers and current detection timings in the representative configuration 5 of the power conversion device according to embodiment 1.

DESCRIPTION OF EMBODIMENTS

Embodiment 1

Figure 1:
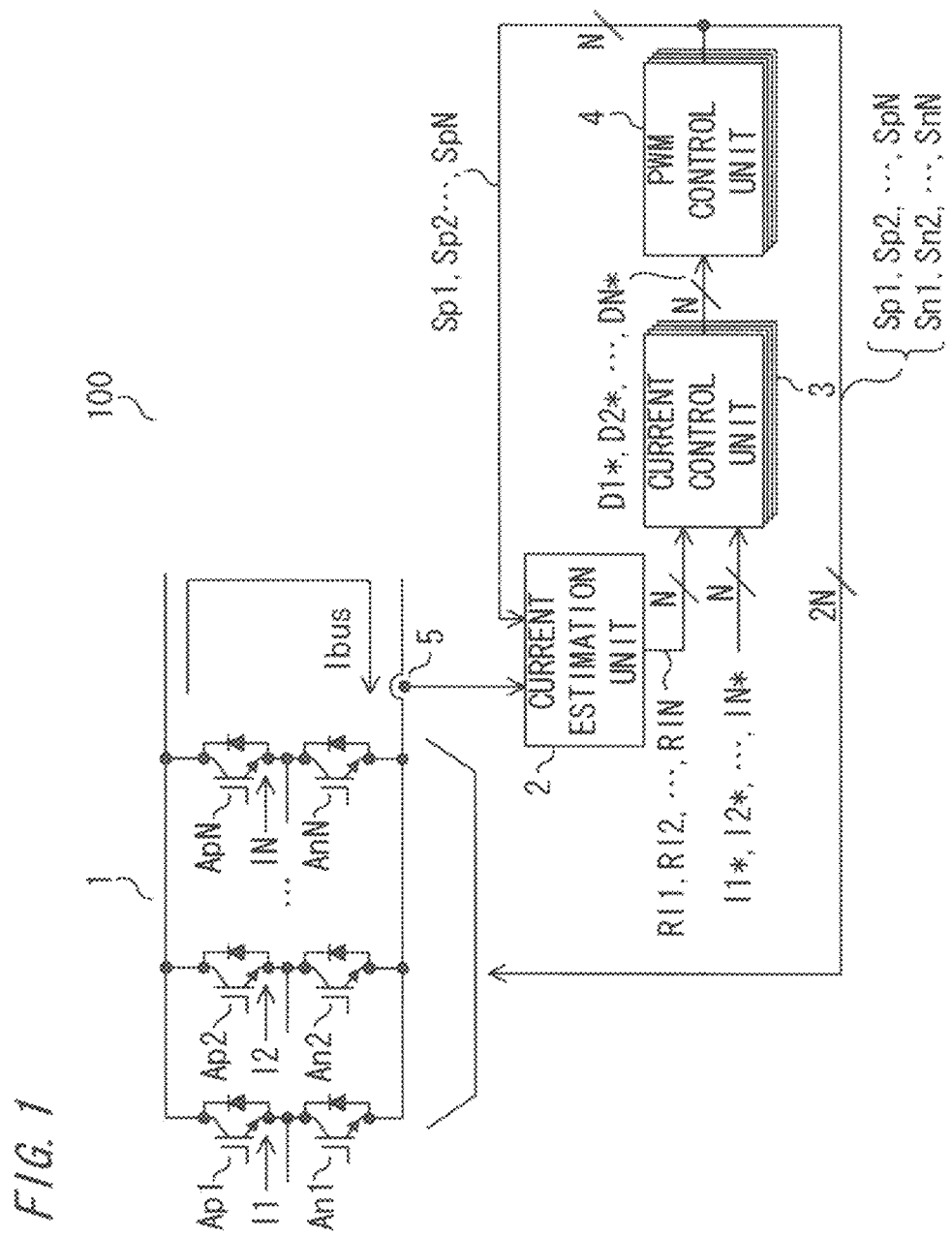
FIG. 1 is a configuration diagram of a power conversion device according to embodiment 1.

Embodiment 1 relates to a power conversion device including a power conversion unit having a plurality of legs connected to a common DC bus; a current detector for detecting current of the common DC bus; a PWM control unit for generating ON/OFF signals for the legs; a current estimation unit for estimating phase currents; and a current control unit for adjusting Duty commands so that the phase currents coincide with target values, wherein the PWM control unit generates the ON/OFF signals for controlling the power conversion unit based on the magnitude relationship between the Duty commands for the respective legs and triangular wave carriers having different initial phases and having a common cycle, the current estimation unit acquires detected currents from the current detector at a sampling cycle different from the carrier cycle and estimates each phase current, and the current control unit adjusts the Duty commands so that the estimated values of the respective phase currents coincide with the target values for the phase currents at a cycle synchronized with a time equal to or greater than the least common multiple of the carrier cycle and the sampling cycle.

Hereinafter, the configuration and operation of the power conversion device according to embodiment 1 will be described with reference to FIG. 1 which is a configuration diagram of the power conversion device, FIG. 2 which is the configuration diagram showing a developed version 1, FIG. 3 which is a configuration diagram showing a developed version 2, FIG. 4 which is the configuration diagram showing a representative configuration 1, FIG. 5, FIG. 6A, and FIG. 6B which illustrate a setting example 1 for current detection timings in the representative configuration 1, FIG. 7 which illustrates the setting example 1 for a Duty command update cycle that enables estimation for each phase current in the representative configuration 1, FIG. 8, FIG. 9A, and FIG. 9B which illustrate a setting example 2 for current detection timings in the representative configuration 1, FIG. 10 which illustrates the setting example 2 for a Duty command update cycle in the representative configuration 1, FIG. 11 which illustrates a determinant calculation result and whether or not it is possible to derive an inverse matrix in the setting example 2 for the representative configuration 1, FIG. 12 which is a configuration diagram showing a representative configuration 2, FIG. 13A, FIG. 13B, FIG. 14A, and FIG. 14B which illustrate a setting example 1 for current detection timings in the representative configuration 2, FIG. 15 which illustrates the setting example 1 for a Duty command update cycle that enables estimation for each phase current in the representative configuration 2, FIG. 16 which illustrates a setting example 2 for a Duty command update cycle that enables estimation for each phase current in the representative configuration 2, FIG. 17 which is a configuration diagram showing a representative configuration 3, FIG. 18A, FIG. 18B, FIG. 19A, FIG. 19B, and FIG. 19C which illustrate a setting example 1 for current detection timings in the representative configuration 3, FIG. 20 which illustrates the setting example 1 for a Duty command update cycle in which a problem remains in estimation for each phase current in the representative configuration 3, FIG. 21A, FIG. 21B, FIG. 22A, FIG. 22B, and FIG. 22C which illustrate a setting example 2 for current detection timings in the representative configuration 3, FIG. 23 which illustrates the setting example 2 for a Duty command update cycle that enables estimation for each phase current in the representative configuration 3, FIG. 24 which is a configuration diagram showing a derived example of the representative configuration 1, FIG. 25 which is a configuration diagram showing a derived example 1 of the representative configuration 2, FIG. 26 which is a configuration diagram showing a derived example 2 of the representative configuration 2, FIG. 27 which is a configuration diagram showing a derived example 1 of the representative configuration 3, FIG. 28 which is a configuration diagram showing a derived example 2 of the representative configuration 3, FIG. 29 which is a configuration diagram showing a representative configuration 4 (single-phase two-line inverter), FIG. 30, FIG. 31A, and FIG. 31B which illustrate an example 1 for current detection timings in the representative configuration 4, FIG. 32 which illustrates the setting example 1 for a Duty command update cycle that enables estimation for each phase current in the representative configuration 4, FIG. 33 which is a configuration diagram showing a representative configuration 5, FIG. 34A, FIG. 34B, FIG. 35A, and FIG. 35B which illustrate a setting example 1 for current detection timings in the representative configuration 5, FIG. 36 which illustrates the setting example 1 for a Duty command update cycle that enables estimation for each phase current in the representative configuration 5, FIG. 37 which is a configuration diagram showing a representative configuration 6, FIG. 38 which is a configuration diagram showing a developed version of the representative configuration 6, FIG. 39 which is a configuration diagram showing a derived example of the representative configurations 4 to 6, FIG. 40 which is a configuration diagram showing a representative combined configuration 1, FIG. 41 which is a configuration diagram showing a representative combined configuration 2, FIG. 42 which is a configuration diagram of a representative combined configuration 3, and FIG. 43 which is a configuration diagram of a representative combined configuration 4.

The basic configuration and the function of the power conversion device of embodiment 1 will be described with reference to FIG. 1.

A power conversion device 100 includes a power conversion unit 1, a current estimation unit 2, current control units 3, PWM control units 4, and a current detector 5.

In description of the specific configuration and operation of the power conversion device 100 of embodiment 1 in FIG. 4 and later, an input power supply unit 11 formed from various power supplies connected to the input side of the power conversion unit 1, and a load 12 connected to the output side of the power conversion unit 1, are included. In the basic configuration of the power conversion device 100 in FIG. 1, the input power supply unit 11 and the load 12 are not shown.

The power conversion unit 1 is configured such that two arms having switching elements are connected on the upper and lower sides as a pair to form a leg, current flowing through a path connected to the middle point between the two arms is defined as phase current, and both ends of a plurality of legs are connected to common DC buses.

In FIG. 1, the upper arms including the switching elements are denoted by Ap1, Ap2, . . . , ApN, and the lower arms including the switching elements are denoted by An1, An2, . . . , AnN. In addition, phase current for a leg 1 is denoted by I1, phase current for a leg 2 is denoted by I2, . . . , and phase current for a leg N is denoted by IN. In the following description, the kth upper arm is referred to as Apk, the kth lower arm is referred to as Ank, and the kth phase current is referred to as Ik, as appropriate.

The current detector 5 measures common DC bus current Ibus which is current flowing through a current path on the low-voltage side of the legs of the power conversion unit 1. In FIG. 1, the current detector 5 is assumed to be a current transformer (CT).

The current estimation unit 2 estimates phase currents (RI1, RI2, . . . , RIN) from the common DC bus current Ibus detected by the current detector 5 and ON/OFF signals (Sp1, Sp2, Sp3, . . . , SpN) generated by the PWM control unit 4 for driving the upper arms of the power conversion unit 1. The current estimation unit 2 outputs the generated estimated phase currents (RI1, RI2, . . . , RIN) to the current control units 3.

The current control units 3 generate Duty commands (D1*, D2*, . . . , DN*) for controlling the respective phase currents, using the estimated phase currents (RI1, RI2, . . . , RIN) and target values (I1*, I2*, . . . , IN*) for the phase currents.

The PWM control units 4 generate ON/OFF signals (Sp1, Sp2, . . . , SpN and Sn1, Sn2, . . . , SnN) for controlling the upper and lower arms (Ap1, Ap2, . . . , ApN and An1, An2, . . . , AnN) of the legs of the power conversion unit 1.

In the following description, for example, "ON/OFF signals for controlling the upper and lower arms" are referred to as "ON/OFF signals for the upper and lower arms", as appropriate.

In the drawings, each number (e.g., N) accompanying an oblique line on a signal line represents the number of signals.

Next, operation and components of the upper arms (Ap1, Ap2, . . . , ApN) and the lower arms (An1, An2, . . . , AnN) of the power conversion unit 1 will be described.

In the kth leg, one of the upper arm Apk and the lower arm Ank is switched and the other one is constantly turned off.

In operation in which ON/OFF signals inverted to each other are given to the upper arm and the lower arm, the ON/OFF signals may be provided with dead time to prevent the common DC buses from being short-circuited due to variation among the elements of the upper and lower arms and the element characteristics. Here, the dead time is a period for preventing short-circuit in which the upper arm and the lower arm are turned off at the same time.

As the switching elements of the upper arm Apk and the lower arm Ank, self-turn-off semiconductor switching elements such as insulated gate bipolar transistors (IGBT) or metal oxide semiconductor field effective transistors (MOSFET) are used, and free-wheeling diodes are connected in antiparallel thereto. For MOSFET, parasitic diodes may be used.

In an application in which the direction of each phase current is limited to one direction, the switching element of one of the upper arm Apk and the lower arm Ank may be replaced with a diode.

The common DC bus current Ibus can be represented by Expression (1) based on the relationship between the phase current I1 for 1st phase to the phase current IN for Nth phase, and the upper arm Ap1 for 1st phase to the upper arm ApN for Nth phase or the lower arm An1 for 1st phase to the lower arm AnN for Nth phase. Here, the functions of the kth Apk and Ank exhibit 1 for ON and 0 for OFF, and the functions with overlines exhibit 0 for ON and 1 for OFF.

[Mathematical 1]

$$Ibus = \sum_{k=1}^{N} Spk \times Ik = [Sp1 \ Sp2 \ \ldots \ SpN] \begin{bmatrix} I1 \\ I2 \\ \vdots \\ IN \end{bmatrix} \quad (1)$$

$$= \sum_{k=1}^{N} \overline{Snk} \times Ik = [\overline{Sn1} \ \overline{Sn2} \ \ldots \ \overline{SnN}] \begin{bmatrix} I1 \\ I2 \\ \vdots \\ IN \end{bmatrix}$$

The ON/OFF state on the lower arm side can be considered using inverted operation from the upper arm side. Therefore, in the following description, operation will be described focusing on ON/OFF operation on the upper arm side. When one of the upper arm and the lower arm is a diode, operation can be considered using inverted operation of the ON/OFF state of the other switching element.

Values obtained by detecting the common DC bus current Ibus N times are denoted by Isp1 to IspN. The detected currents Isp1 to IspN can be represented by Expression (2) using the phase currents I1 to IN.

Here, the function for the upper arm corresponding to the N times of detections is represented by a matrix Z, and the phase currents I1 to IN in Expression (2) are treated as constant during a period in which the common DC bus current Ibus is detected N times.

[Mathematical 2]

$$\begin{bmatrix} Isp1 \\ Isp2 \\ \vdots \\ IspN \end{bmatrix} = \begin{bmatrix} Sp11 & Sp21 & \cdots & SpN1 \\ Sp12 & Sp22 & \cdots & SpN2 \\ \vdots & \vdots & \ddots & \vdots \\ Sp1N & Sp2N & \cdots & SpNN \end{bmatrix} \begin{bmatrix} I1 \\ I2 \\ \vdots \\ IN \end{bmatrix} = Z \begin{bmatrix} I1 \\ I2 \\ \vdots \\ IN \end{bmatrix} \quad (2)$$

When the determinant of the matrix Z in Expression (2) is not zero, the phase currents I1 to IN can be represented by Expression (3) using the inverse matrix of the matrix Z and the detected currents (Isp1 to IspN).

[Mathematical 3]

$$\begin{bmatrix} I1 \\ I2 \\ \vdots \\ IN \end{bmatrix} = Z^{-1} \begin{bmatrix} Isp1 \\ Isp2 \\ \vdots \\ IspN \end{bmatrix} \quad (3)$$

When the phase currents I1 to IN vary during the period in which the common DC bus current Ibus is detected N times, I1 to IN in Expression (3) mean the average values of the phase currents during the period. That is, using the relationships of Expressions (2) and (3), the average values of the phase currents (I1 to IN) during the period in which the common DC bus current Ibus is detected N times can be estimated.

The current estimation unit 2 estimates each phase current (RI1, RI2, ..., RIN) from the common DC bus current Ibus, using the characteristics of Expression (3).

The current control units 3 compare the respective estimated phase currents (RI1, RI2, ..., RIN) estimated by the current estimation unit 2 and the target values (I1*, I2*, ..., IN*) for the respective phase currents, and generate the Duty commands (D1*, D2*, ..., DN*) so as to reduce the deviations therebetween.

The PWM control units 4 compare the Duty commands (D1*, D2*, ..., DN*) and the triangular wave carriers, for the respective legs, and generate the ON/OFF signals (Sp1, Sp2, ..., SpN and Sn1, Sn2, ..., SnN) for the upper and lower arms. Here, when one of the upper arm and the lower arm is a diode, the PWM control unit 4 generates only the ON/OFF signal for the other arm.

Next, the configuration of a developed version 1 of the power conversion device 100 in FIG. 1 will be described with reference to FIG. 2, focusing on a difference from the power conversion device 100. For discrimination from the configuration in FIG. 1, the power conversion device is denoted by 101.

Figure 2:
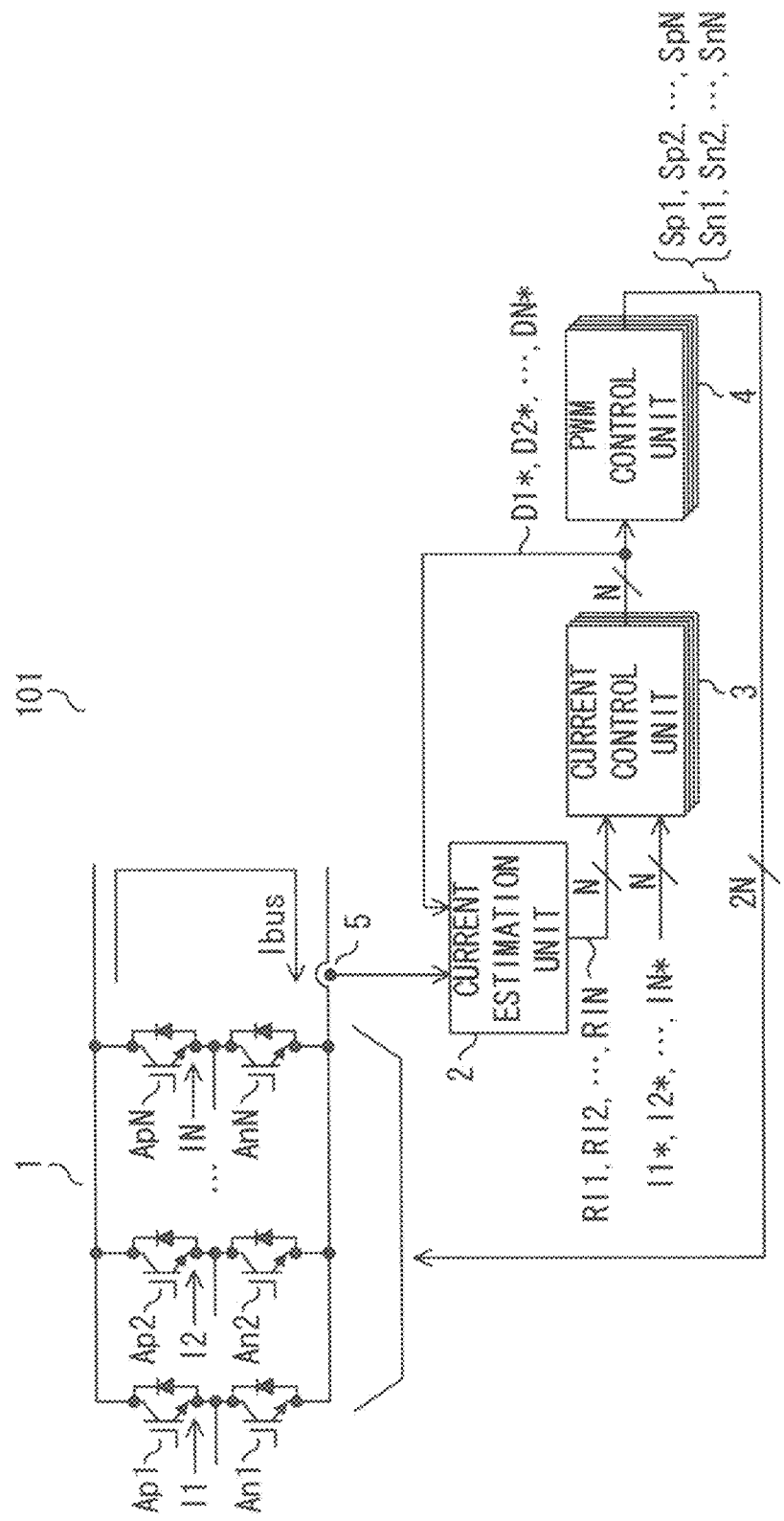
FIG. 2 is a configuration diagram showing a developed version 1 of the power conversion device according to embodiment 1.
Figure 3:
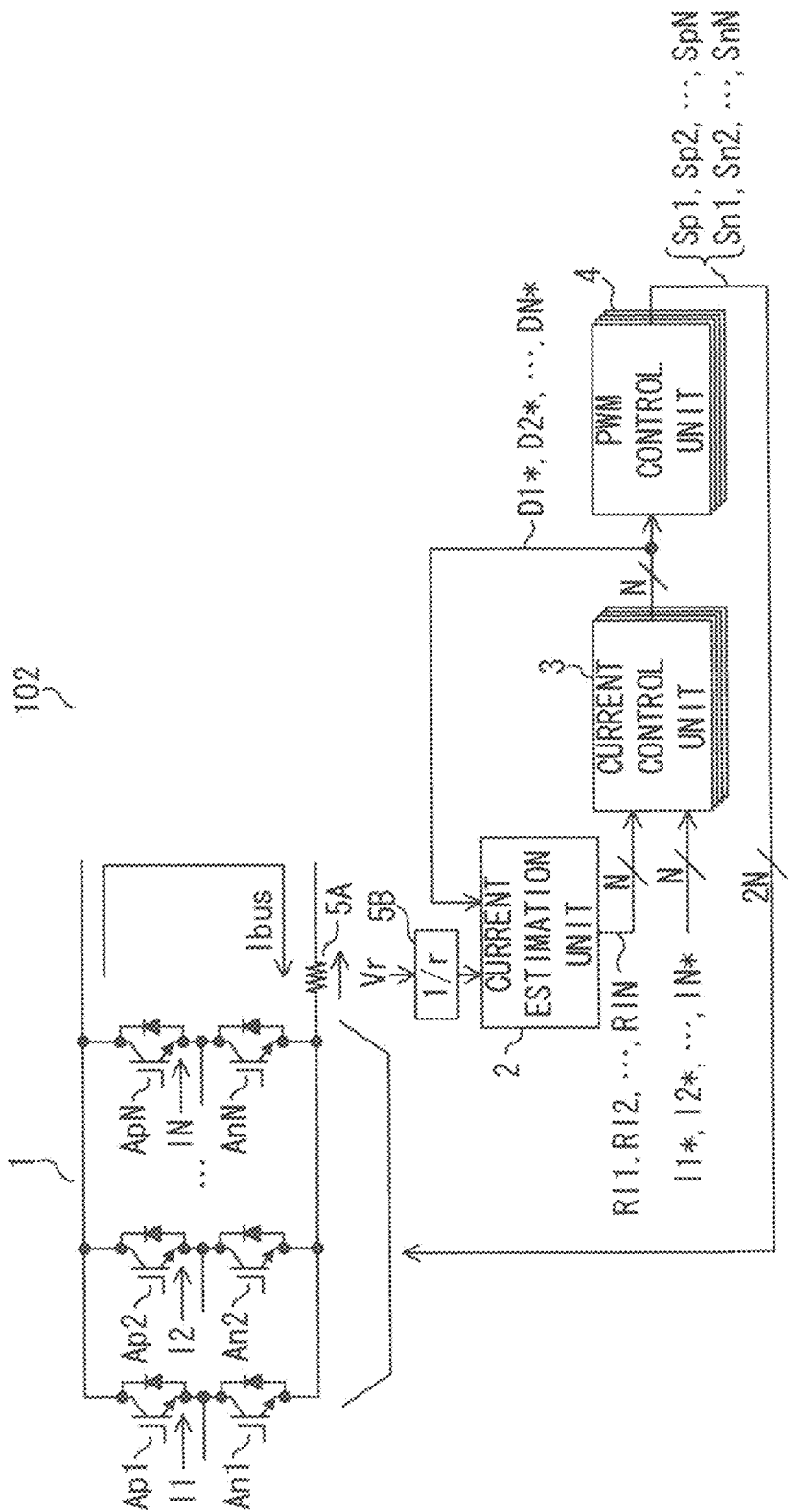
FIG. 3 is a configuration diagram showing a developed version 2 of the power conversion device according to embodiment 1.

The power conversion device 101 in FIG. 2 uses characteristics that the ON/OFF signals for the upper and lower arms in Expression (2) can be estimated from the Duty commands inputted to the PWM control units 4. The ON/OFF signal for each arm at the detection timing for the common DC bus current Ibus can be estimated from the Duty command and a time difference of the detection timing with reference to the maximum value or the minimum value of the triangular wave carrier.

In the power conversion device 101 in FIG. 2 using the above characteristics, the current estimation unit 2 estimates the phase currents (RI1, RI2, ..., RIN) from the common DC bus current Ibus by using the Duty commands (D1*, D2*, ..., DN*) outputted from the current control units 3, without using the ON/OFF signals for the arms outputted from the PWM control units 4.

The functions and operations of the current control units 3 and the PWM control units 4 are the same as those in the power conversion device 100 in FIG. 1, and therefore will not be described.

Next, the configuration of a developed version 2 of the power conversion device 100 in FIG. 1 will be described with reference to FIG. 3, focusing on a difference from the power conversion device 101. For discrimination from the configurations in FIG. 1 and FIG. 2, the power conversion device is denoted by 102.

The power conversion device 102 is obtained by replacing the current detector 5 of the power conversion device 101 with a resistor 5A and a calculator 5B. The common DC bus current Ibus is calculated by the calculator 5B dividing voltage Vr across the resistor 5A by a resistance value r of the resistor 5A.

The common DC bus current Ibus has characteristics that pulse current is generated due to ON/OFF of the arms. Therefore, for using a CT as the current detector 5, the CT needs to have wide-band detection characteristics to reduce error in Expressions (2) and (3).

In the power conversion device 102, voltage generated at the resistor 5A is detected and the detected value is divided by the calculator 5B, whereby wide-band detection for the common DC bus current Ibus can be achieved at low cost.

This configuration can be applied also to the power conversion device 100 in FIG. 1 in the same manner, that is, the current detector 5 can be replaced with the resistor 5A and the calculator 5B, whereby wide-band detection for the common DC bus current Ibus can be achieved at low cost.

Next, six representative configuration examples corresponding to the configuration of the power conversion device 101 in FIG. 2 will be described focusing on the configurations of the input power supply unit 11 and the power conversion unit 1 and operation of the current estimation unit 2.

By managing the ON/OFF operation for each leg and the detection timings for the common DC bus current Ibus, it is possible to realize a configuration in which Expression (3) can be generally applied while the determinant of the matrix Z of Expression (2) does not become zero in the current estimation unit 2.

Hereinafter, setting examples for the carrier phase difference between the phases and the detection timings for the common DC bus current Ibus to realize a stable operation of the current estimation unit 2 will be described.

The configuration (two-input two-phase converter) and the function/operation in the representative configuration 1 of the power conversion device in embodiment 1 will be described with reference to FIG. 4 to FIG. 9.

First, with reference to FIG. 4, the configuration in the representative configuration 1 will be described focusing on the input power supply unit and the power conversion unit. For discrimination from the configurations in FIG. 1, etc., the power conversion device is denoted by 103. In addition, the power conversion unit is denoted by 1A and the input power supply unit is denoted by 11A. A smoothing capacitor 6 is added to the common DC buses connecting the power conversion unit 1A and the load 12. Here, the voltage of the capacitor 6 is defined as Vbus.

The input power supply unit 11A of the power conversion device 103 includes reactors L1, L2 and DC power supplies VDC1, VDC2, and forms a two-input two-phase converter together with the power conversion unit 1A.

The power conversion device 103 has a two-phase configuration, and therefore includes two current control units 3 and two PWM control units 4.

The current estimation unit 2 estimates phase currents (RI1, RI2) from the common DC bus current Ibus detected by the current detector 5 and Duty commands (D1*, D2*) generated by the current control units 3, and outputs the estimated phase currents to the current control units 3.

The current control units 3 generate Duty commands (D1*, D2*) for controlling the respective phase currents, using the estimated phase currents (RI1, RI2) and the target values (I1*, I2*) for the phase currents.

The PWM control units 4 generate ON/OFF signals (Sp1, Sp2 and Sn1, Sn2) for controlling the upper and lower arms (Ap1, Ap2 and An1, An2) of the respective legs of the power conversion unit 1A, from the Duty commands (D1*, D2*) generated by the current control units 3.

Figure 5:
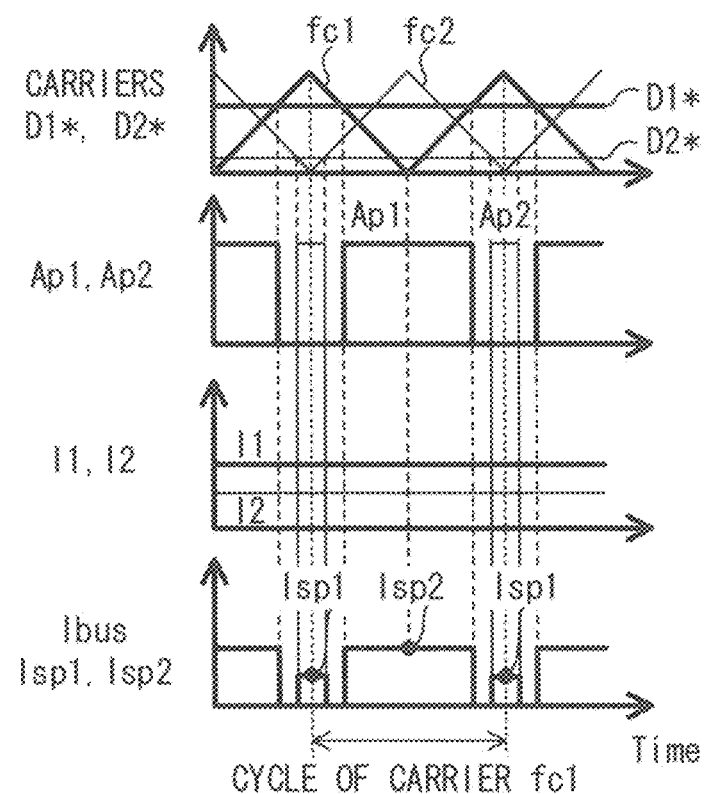
FIG. 5 illustrates a setting example 1 for triangular wave carriers and current detection timings in the representative configuration 1 of the power conversion device according to embodiment 1.

FIG. 5 shows a setting example 1 for the triangular wave carriers for the respective phases, the ON/OFF states of the high-voltage-side upper arms Ap1 and Ap2, the phase currents (I1, I2), and the detection timings for the common DC bus current Ibus in the representative configuration 1 (power conversion device 103).

Specifically, FIG. 5 illustrates the relationship among the triangular wave carriers (fc1, fc2), the ON/OFF states of the high-voltage-side upper arms Ap1, Ap2, the phase currents (I1, I2), the common DC bus current Ibus, and the detected currents (Isp1, Isp2).

Figures 6A, 6B:
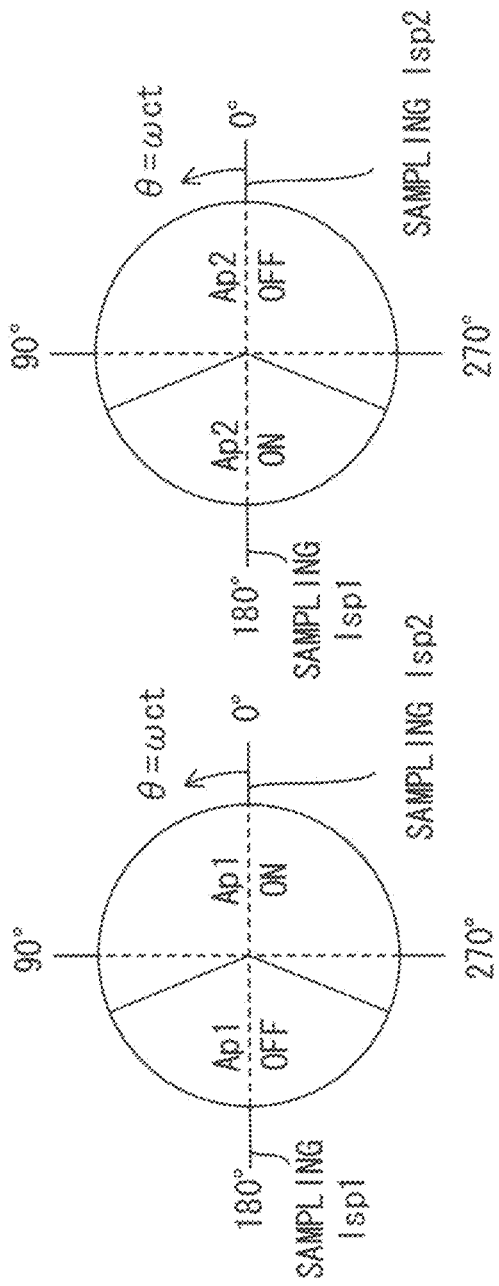
FIG. 6A illustrates the setting example 1 for triangular wave carriers and current detection timings in the representative configuration 1 of the power conversion device according to embodiment 1.
FIG. 6B illustrates the setting example 1 for triangular wave carriers and current detection timings in the representative configuration 1 of the power conversion device according to embodiment 1.

FIG. 6A illustrates the ON/OFF state of the upper arm Ap1 and the detection timings for the common DC bus current Ibus (i.e., detection timings for Isp1, Isp2), using a phase. It is noted that K is the amplitude of the triangular wave carrier and $\omega c$ is the angular frequency of the triangular wave carrier.

Here, the triangular wave carrier fc1 is represented by fc1=$(K/\pi)\cdot|\omega c t|$ in a range where the time function t is not less than $-\pi/\omega c$ and not greater than $\pi/\omega c$.

FIG. 6B illustrates the ON/OFF state of the upper arm Ap2 and the detection timings for the common DC bus current Ibus, using a phase.

Here, the triangular wave carrier fc2 is represented by fc2=$(K/\pi)\cdot|\omega c t+\pi|$ in a range where the time function t is not less than $-2\pi/\omega c$ and not greater than 0.

Here, with one cycle of the triangular wave carrier (fc1, fc2) defined as 360 degrees, the relationship between the ON/OFF states of the high-voltage-side upper arms Ap1 and Ap2 corresponding to the Duty commands, and the detection timings for the common DC bus current Ibus, can be extracted. Thus, it is possible to find, in advance, a condition in which sampling error is likely to occur due to overlap between the arm ON/OFF switching timing and the detection timing for the common DC bus current Ibus.

In FIG. 5, FIG. 6A, and FIG. 6B, it can be said that, for both of the two phases, sampling error is likely to occur when the Duty command is 0% and 100%. Hereinafter, for example, when FIG. 6A and FIG. 6B need not be discriminated from each other and are to be collectively mentioned, they are referred to as FIG. 6, as appropriate.

Figure 7:
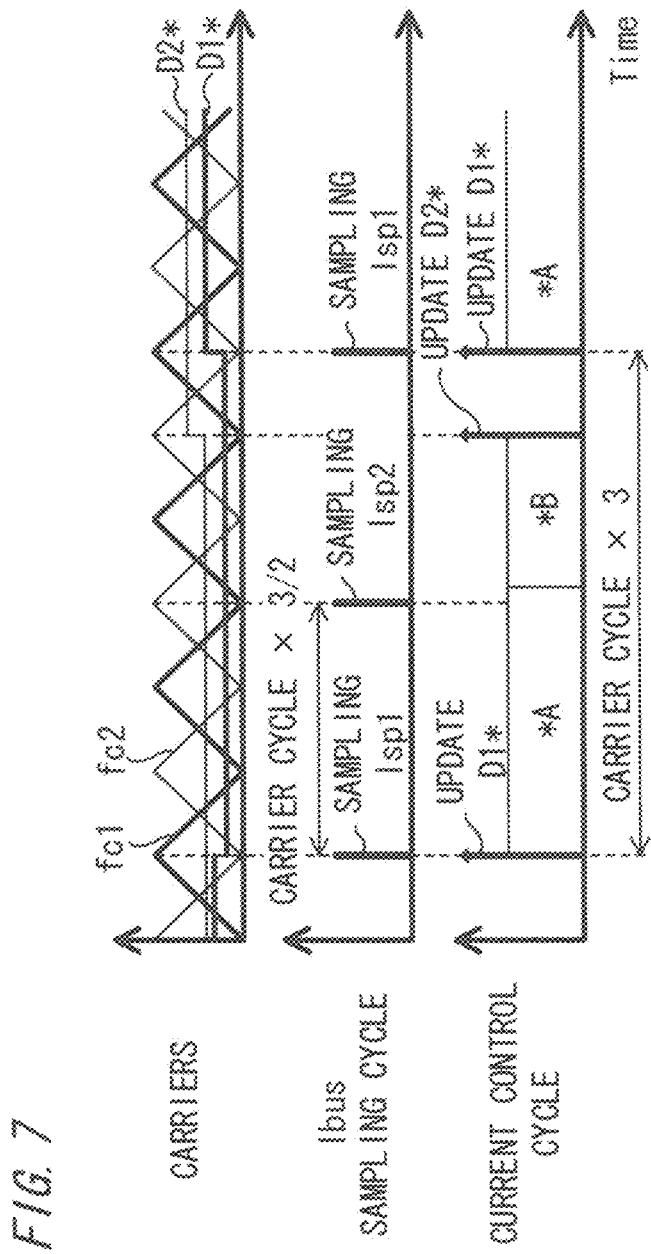
FIG. 7 illustrates the setting example 1 for a carrier cycle, a sampling cycle, phase current estimation, and a Duty command update cycle that enable estimation for each phase current in the representative configuration 1 of the power conversion device according to embodiment 1.

FIG. 7 shows the setting example 1 for a Duty command update cycle that enables estimation for each phase current, corresponding to FIG. 5 and FIG. 6, in the representative configuration 1 (power conversion device 103). Specifically, FIG. 7 shows the setting example 1 for the carrier cycle, sampling cycle, phase current estimation, and the Duty command update cycle that enable estimation for each phase current.

In FIG. 7, *A represents "perform current detection (Isp1, Isp2) and estimate phase currents", and *B represents "current control".

Here, the carrier phase differences between the phases is set to 180 degrees, the detection timing cycle for the common DC bus current Ibus is set to 1.5 times the carrier cycle, and the cycle of current control and update for the Duty command is set to 3.0 times the carrier cycle, which is the least common multiple of the carrier cycle and the current detection timing cycle.

It is noted that the current detection timing cycle is, namely, the cycle of the estimation timing for each phase current.

In a condition in which the Duty command is 0% and a condition in which the Duty command is 100%, the common DC bus current detection timing and the arm ON/OFF timing overlap each other, so that detection error is likely to occur in detection for the common DC bus current Ibus. However, it is not general to perform operations with a Duty command of 0% and a Duty command of 100%, and therefore it will be described that the phase currents can be estimated from the common DC bus current Ibus over almost the entire region.

In the setting example in FIG. 5 to FIG. 7 in the representative configuration 1 (power conversion device 103), the relationship between the phase currents (I1, I2) and the detected currents (Isp1, Isp2) for the common DC bus current Ibus can be represented by Expression (4).

[Mathematical 4]

$$\begin{bmatrix} Isp1 \\ Isp2 \end{bmatrix} = \begin{bmatrix} Sp11 & Sp21 \\ Sp12 & Sp22 \end{bmatrix} \begin{bmatrix} I1 \\ I2 \end{bmatrix} = Z \begin{bmatrix} I1 \\ I2 \end{bmatrix} \quad (4)$$

Here, if operations with Duty commands of 0% and 100% are assumed to be prohibited operations, Expression (4) can be replaced with Expression (5).

[Mathematical 5]

$$\begin{bmatrix} Isp1 \\ Isp2 \end{bmatrix} = \begin{bmatrix} 1 & 0 \\ 0 & 1 \end{bmatrix} \begin{bmatrix} I1 \\ I2 \end{bmatrix} = Z \begin{bmatrix} I1 \\ I2 \end{bmatrix} \quad (5)$$

That is, under the constraint that the Duty command is greater than 0% and less than 100%, Expression (5) can be established. Therefore, the phase currents (I1, I2) can be estimated from the common DC bus current detection value, using the inverse matrix of the matrix Z represented by Expression (6).

[Mathematical 6]

$$\begin{bmatrix} I1 \\ I2 \end{bmatrix} = Z^{-1} \begin{bmatrix} Isp1 \\ Isp2 \end{bmatrix} = \begin{bmatrix} 1 & 0 \\ 0 & 1 \end{bmatrix} \begin{bmatrix} Isp1 \\ Isp2 \end{bmatrix} \quad (6)$$

Here, if the Duty command (D1*, D2*) changes at the detection timing for Isp1, Isp2, the state of the arm Ap1, Ap2 at the detection timing also changes. Therefore, when the cycle for detecting Isp1, Isp2 is 1.5 times the carrier cycle, if the update cycles for the Duty commands (D1*, D2*) are set to be equal to or greater than 3.0 times the carrier cycle, which is the least common multiple of the carrier cycle and the detection cycle for the common DC bus current Ibus, estimation error for the phase currents (I1, I2) can be reduced.

In FIG. 7, update of the Duty commands (D1*, D2*) is performed for D1* after D2*. However, depending on the speed of current control calculation, update of the Duty commands (D1*, D2*) may be performed for D2* after D1*.

If it is clear in the description, the "detection cycle for the common DC bus current" is referred to as "current detection cycle", as appropriate.

Figure 8:
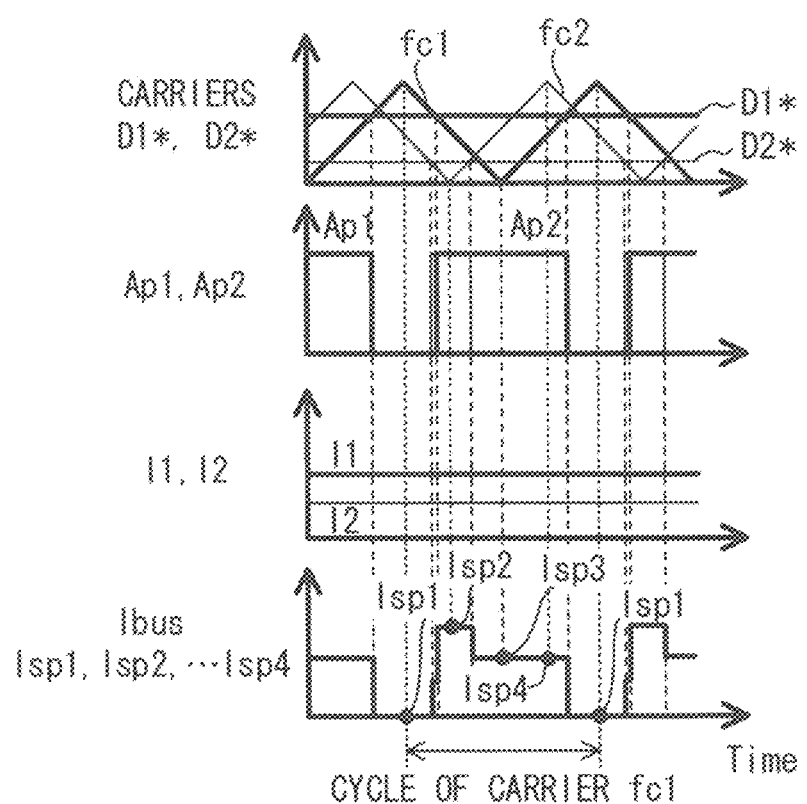
FIG. 8 illustrates a setting example 2 for triangular wave carriers and current detection timings in the representative configuration 1 of the power conversion device according to embodiment 1.
Figure 9:
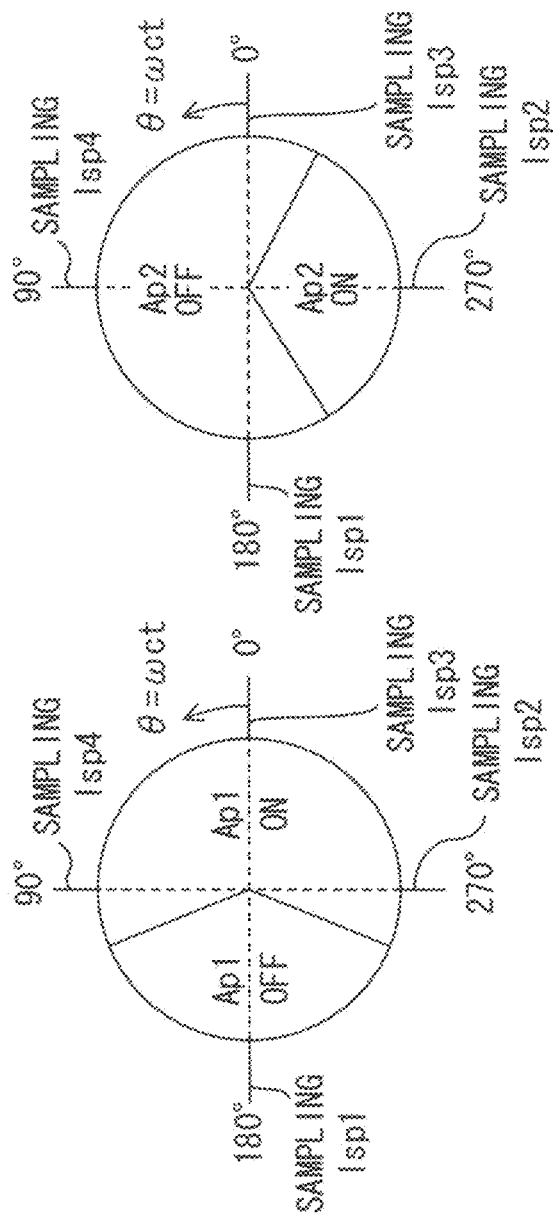
FIG. 9A illustrates the setting example 2 for triangular wave carriers and current detection timings in the representative configuration 1 of the power conversion device according to embodiment 1.
FIG. 9B illustrates the setting example 2 for triangular wave carriers and current detection timings in the representative configuration 1 of the power conversion device according to embodiment 1.

FIG. 8 and FIG. 9 show a setting example 2 for the triangular wave carriers for the respective phases, the ON/OFF states of the high-voltage-side upper arms Ap1 and Ap2, the phase currents (I1, I2), and the detection timings for the common DC bus current Ibus in the representative configuration 1 (power conversion device 103).

Specifically, FIG. 8 illustrates the relationship among the triangular wave carriers (fc1, fc2), the Duty commands (D1*, D2*), the ON/OFF states of the high-voltage-side upper arms Ap1, Ap2, the phase currents (I1, I2), the common DC bus current Ibus, and the detected currents (Isp1, Isp2, Isp3, Isp4).

FIG. 9A illustrates the ON/OFF state of the upper arm Ap1 and the detection timings for the common DC bus current Ibus (i.e., detection timings for Isp1 to Isp4), using a phase.

Here, the triangular wave carrier fc1 is represented by $fc1=(K/\pi)\cdot|\omega ct|$ in a range where the time function t is not less than $-\pi/\omega c$ and not greater than $\pi/\omega c$.

FIG. 9B illustrates the ON/OFF state of the upper arm Ap2 and the detection timings for the common DC bus current Ibus (i.e., detection timings for Isp1 to Isp4), using a phase.

Here, the triangular wave carrier fc2 is represented by $fc2=(K/\pi)\cdot|\omega ct+(\pi/2)|$ in a range where the time function t is not less than $-(3/2)\pi/\omega c$ and not greater than $(1/2)\pi/\omega c$.

In FIG. 8 and FIG. 9, it can be said that, for both of the two phases, sampling error is likely to occur when the Duty command is 0%, 50%, and 100%.

Figure 10:
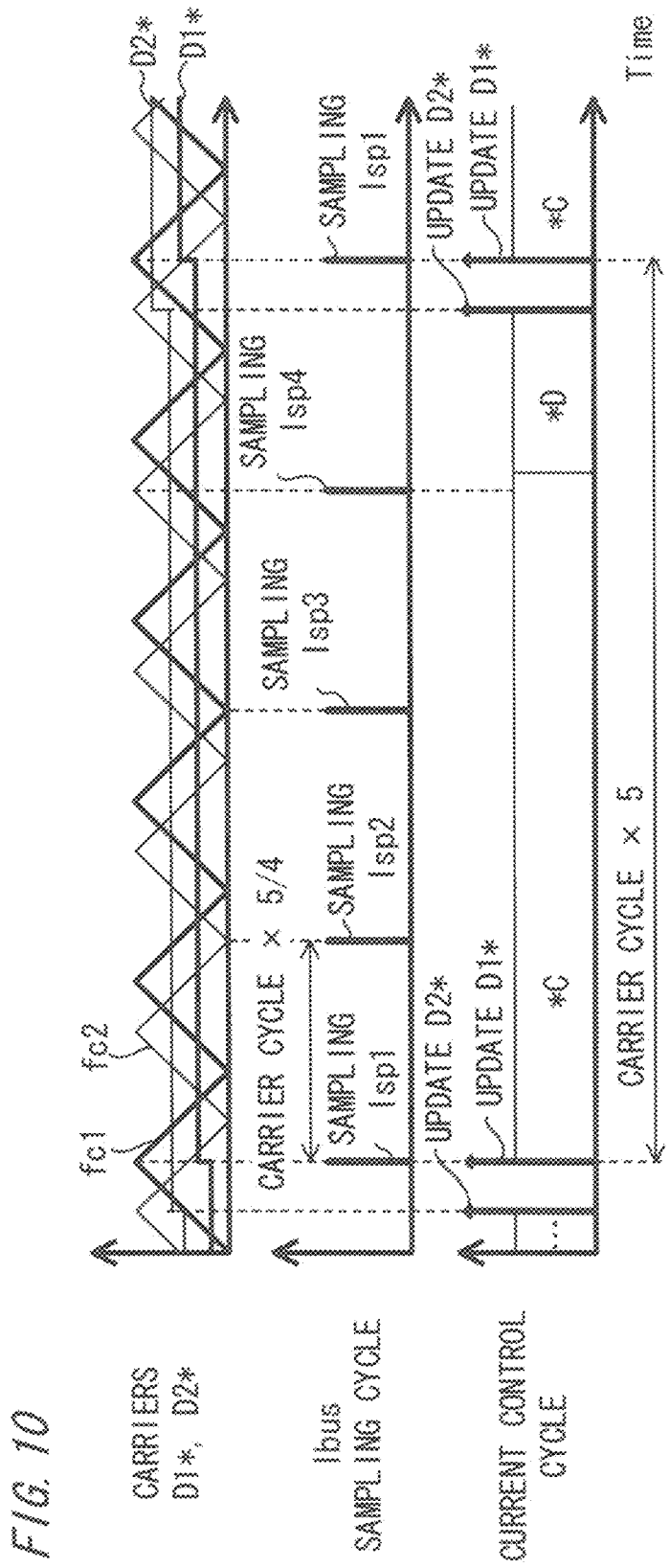
FIG. 10 illustrates the setting example 2 for a carrier cycle, a sampling cycle, phase current estimation, and a Duty command update cycle that enable estimation for each phase current in the representative configuration 1 of the power conversion device according to embodiment 1.

FIG. 10 shows the setting example 2 for the carrier cycle, the sampling cycle, phase current estimation, and the Duty command update cycle that enable estimation for each phase current, corresponding to FIG. 8 and FIG. 9, in the representative configuration 1 (power conversion device 103).

In FIG. 10, *C represents "perform current detection (Isp1 to Isp4) and estimate phase currents", and *D represents "current control".

Here, the carrier phase difference between the phases is set to 90 degrees, the detection timing cycle for the common DC bus current Ibus is set to 1.25 times the carrier cycle, and the cycle of current control and update for the Duty command is set to 5.0 times the carrier cycle, which is the least common multiple of the carrier cycle and the detection timing cycle.

In the setting example 2 in FIG. 10, in addition to the condition in which the Duty command is 0% and the condition in which the Duty command is 100% as shown in the setting example 1, in a condition in which the Duty command is 50%, the detection timing and the ON/OFF timing overlap each other, so that detection error for Ibus is likely to occur. As in the setting example 1, it will be described that the phase currents can be estimated from the common DC bus current Ibus under the condition in which the Duty command is greater than 0% and less than 100% in the setting example 2.

In the setting example in FIG. 8 to FIG. 10 in the representative configuration 1 (power conversion device 103), the relationship between the phase currents (I1, I2) and the detected currents (Isp1, Isp2, Isp3, Isp4) for the common DC bus current Ibus can be represented by six expressions including Expression (4) and Expressions (7) to (11).

[Mathematical 7]

$$\begin{bmatrix} Isp1 \\ Isp3 \end{bmatrix} = \begin{bmatrix} Sp11 & Sp21 \\ Sp13 & Sp23 \end{bmatrix}\begin{bmatrix} I1 \\ I2 \end{bmatrix} = Z\begin{bmatrix} I1 \\ I2 \end{bmatrix} \quad (7)$$

[Mathematical 8]

$$\begin{bmatrix} Isp1 \\ Isp4 \end{bmatrix} = \begin{bmatrix} Sp11 & Sp21 \\ Sp14 & Sp24 \end{bmatrix}\begin{bmatrix} I1 \\ I2 \end{bmatrix} = Z\begin{bmatrix} I1 \\ I2 \end{bmatrix} \quad (8)$$

[Mathematical 9]

$$\begin{bmatrix} Isp2 \\ Isp3 \end{bmatrix} = \begin{bmatrix} Sp12 & Sp22 \\ Sp13 & Sp23 \end{bmatrix}\begin{bmatrix} I1 \\ I2 \end{bmatrix} = Z\begin{bmatrix} I1 \\ I2 \end{bmatrix} \quad (9)$$

[Mathematical 10]

$$\begin{bmatrix} Isp2 \\ Isp4 \end{bmatrix} = \begin{bmatrix} Sp12 & Sp22 \\ Sp14 & Sp24 \end{bmatrix}\begin{bmatrix} I1 \\ I2 \end{bmatrix} = Z\begin{bmatrix} I1 \\ I2 \end{bmatrix} \quad (10)$$

[Mathematical 11]

$$\begin{bmatrix} Isp3 \\ Isp4 \end{bmatrix} = \begin{bmatrix} Sp13 & Sp23 \\ Sp14 & Sp24 \end{bmatrix}\begin{bmatrix} I1 \\ I2 \end{bmatrix} = Z\begin{bmatrix} I1 \\ I2 \end{bmatrix} \quad (11)$$

Here, if operations with Duty commands of 0% and 100% are assumed to be prohibited operations, Expressions (4) and (7) to (11) can be replaced with Expressions (12) to (17).

[Mathematical 12]

$$\begin{bmatrix} Isp1 \\ Isp2 \end{bmatrix} = \begin{bmatrix} 0 & Sp21 \\ Sp12 & 1 \end{bmatrix}\begin{bmatrix} I1 \\ I2 \end{bmatrix} = Z\begin{bmatrix} I1 \\ I2 \end{bmatrix} \quad (12)$$

[Mathematical 13]

$$\begin{bmatrix} Isp1 \\ Isp3 \end{bmatrix} = \begin{bmatrix} 0 & Sp21 \\ 1 & Sp23 \end{bmatrix}\begin{bmatrix} I1 \\ I2 \end{bmatrix} = Z\begin{bmatrix} I1 \\ I2 \end{bmatrix} \quad (13)$$

[Mathematical 14]

$$\begin{bmatrix} Isp1 \\ Isp4 \end{bmatrix} = \begin{bmatrix} 0 & Sp21 \\ Sp14 & 0 \end{bmatrix}\begin{bmatrix} I1 \\ I2 \end{bmatrix} = Z\begin{bmatrix} I1 \\ I2 \end{bmatrix} \quad (14)$$

[Mathematical 15]

$$\begin{bmatrix} Isp2 \\ Isp3 \end{bmatrix} = \begin{bmatrix} Sp12 & 1 \\ 1 & Sp23 \end{bmatrix}\begin{bmatrix} I1 \\ I2 \end{bmatrix} = Z\begin{bmatrix} I1 \\ I2 \end{bmatrix} \quad (15)$$

[Mathematical 16]

$$\begin{bmatrix} Isp2 \\ Isp4 \end{bmatrix} = \begin{bmatrix} Sp12 & 1 \\ Sp14 & 0 \end{bmatrix}\begin{bmatrix} I1 \\ I2 \end{bmatrix} = Z\begin{bmatrix} I1 \\ I2 \end{bmatrix} \quad (16)$$

[Mathematical 17]

$$\begin{bmatrix} Isp3 \\ Isp4 \end{bmatrix} = \begin{bmatrix} 1 & Sp23 \\ Sp14 & 0 \end{bmatrix}\begin{bmatrix} I1 \\ I2 \end{bmatrix} = Z\begin{bmatrix} I1 \\ I2 \end{bmatrix} \quad (17)$$

FIG. 11 shows whether or not it is possible to derive the determinant and the inverse matrix of the matrix Z in Expressions (12) to (17), in each case where the Duty command (D1*, D2*) corresponding to the triangular wave carrier (fc1, fc2) is greater than 50% or less than 50%.

For example, in a condition in which the Duty command D1* is greater than 50% and the Duty command D2* is greater than 50%, the matrix Z in Expression (12) is −1. Therefore, it is possible to derive the inverse matrix and phase current estimation is enabled (0).

Meanwhile, in a condition in which the Duty command D1* is greater than 50% and the Duty command D2* is less than 50%, the matrix Z in Expression (12) is 0. Therefore, it is impossible to derive the inverse matrix and phase current estimation is disabled (x).

It is noted that, when the Duty command is 50%, overlap with the sampling timing occurs, and therefore whether or not it is possible to derive the inverse matrix needs to be treated as indeterminate.

That is, under the constraints that the Duty commands (D1*, D2*) are greater than 0% and less than 100%, Expression (15) and the other expressions are selectively used depending on the Duty commands (D1*, D2*), based on the characteristics shown in FIG. 11. Thus, except for the case where the Duty command is 50%, using the inverse matrix of the matrix Z, the phase currents (I1, I2) can be estimated from the detected currents (Isp1 to Isp4) for the common DC bus current Ibus.

Here, if the Duty command (D1*, D2*) changes at the detection timing for Isp1 to Isp4, the state of the upper arm Ap1, Ap2 at the detection timing also changes. Therefore, when the cycle for detecting Isp1 to Isp4 is 1.25 times the carrier cycle, if the update cycle for the Duty commands is set to be equal to or greater than 5.0 times the carrier cycle, which is the least common multiple of the carrier cycle and the current detection cycle, estimation error for the phase currents (I1, I2) can be reduced.

In FIG. 10, update of the Duty commands (D1*, D2*) is performed for D1* after D2*. However, depending on the speed of current control calculation, update of the Duty commands (D1*, D2*) may be performed for D2* after D1*.

Inconsistency of the DC bus current detection timing and the matrix Z occurring at the condition in which the Duty command is 50% can be eliminated by discretization with the Duty command of 50% prohibited.

For example, the Duty commands of 0% to 100% can be discretized into 0.0%, 0.5%, 1.5%, 2.5%, . . . , 48.5%, 49.5%, 50.5%, 51.5%, . . . , 97.5%, 98.5%, 99.5%, 100.0% at intervals of 1%. In this setting, the discretization interval is 0.5% only for the maximum value 100% and the minimum value 0.0%.

Thus, regarding the power conversion device 103 using the two-input two-phase converter as the representative configuration 1 of the power conversion device in embodiment 1, the method for estimating the phase currents (I1, I2) from the common DC bus current Ibus has been described.

The configuration and the function/operation in a representative configuration 2 (three-input three-phase converter) of the power conversion device in embodiment 1 will be described with reference to FIG. 12 to FIG. 15.

Figure 12:
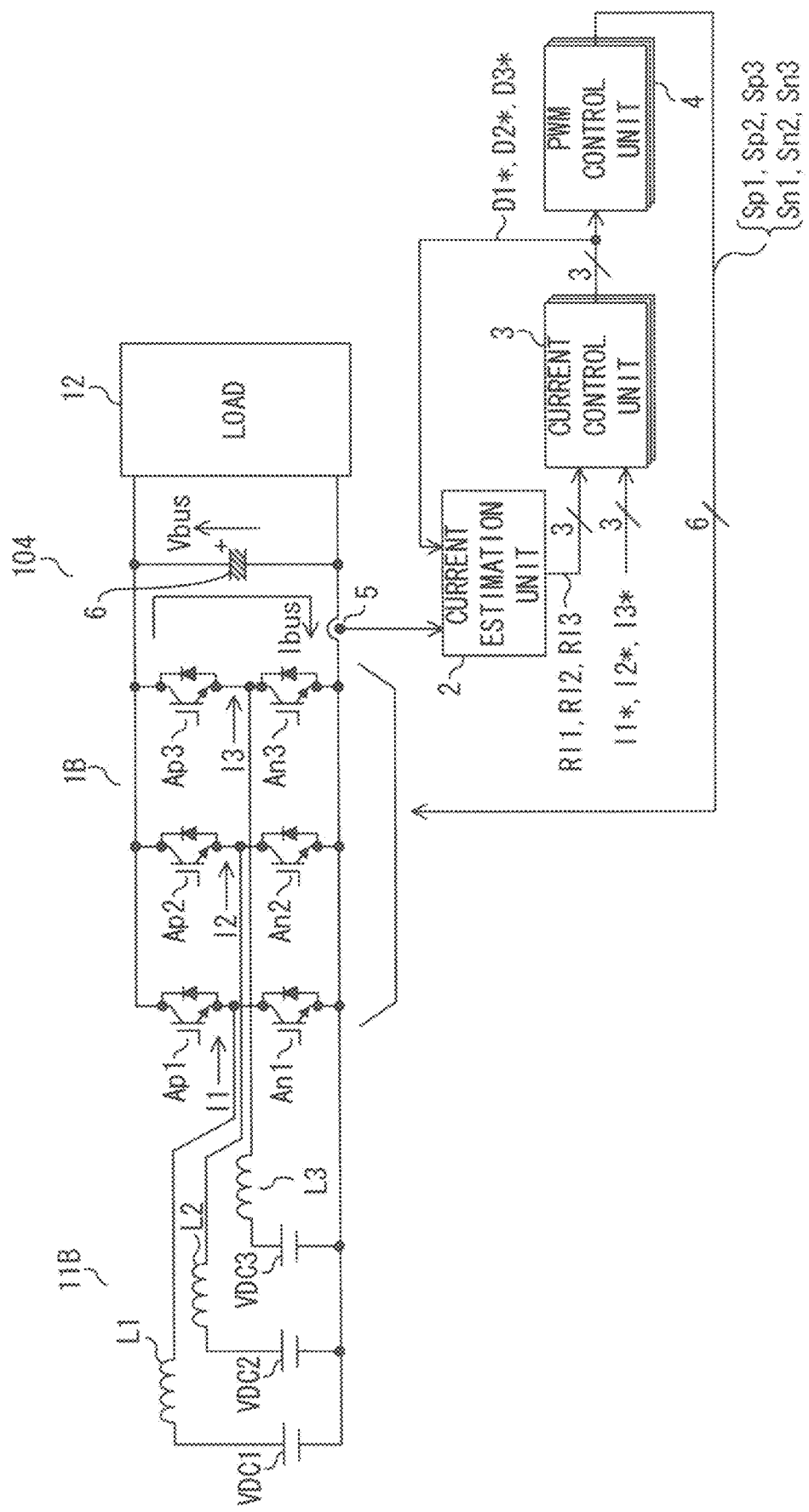
FIG. 12 is a configuration diagram showing a representative configuration 2 (three-input three-phase converter) of the power conversion device according to embodiment 1.

In FIG. 12, for discrimination from the configurations in FIG. 1, etc., the power conversion device is denoted by 104. In addition, the power conversion unit is denoted by 1B and the input power supply unit is denoted by 11B. A smoothing capacitor 6 is provided to the common DC buses connecting the power conversion unit 1B and the load 12.

The input power supply unit 11B of the power conversion device 104 includes reactors L1, L2, L3 and DC power supplies VDC1, VDC2, VDC3, and forms a three-input three-phase converter together with the power conversion unit 1B.

The power conversion device 104 has a three-phase configuration, and therefore includes three current control units 3 and three PWM control units 4.

The current estimation unit 2 estimates phase currents (RI1, RI2, RI3) from the common DC bus current Ibus detected by the current detector 5 and Duty commands (D1*, D2*, D3*) generated by the current control units 3, and outputs the estimated phase currents to the current control units 3.

The current control units 3 generate Duty commands (D1*, D2*, D3*) for controlling the respective phase currents, using the estimated phase currents (RI1, RI2, RI3) and the target values (I1*, I2*, I3*) for the phase currents.

The PWM control units 4 generate ON/OFF signals (Sp1, Sp2, Sp3 and Sn1, Sn2, Sn3) for controlling the upper and lower arms (Ap1, Ap2, Ap3 and An1, An2, An3) of the respective legs of the power conversion unit 1B, from the Duty commands (D1*, D2*, D3*) generated by the current control units 3.

FIG. 13 and FIG. 14 show a setting example 1 for the triangular wave carriers for the respective phases, the ON/OFF states of the high-voltage-side upper arms Ap1, Ap2, Ap3, the phase currents (I1, I2, I3), and the detection timings for the common DC bus current Ibus in the representative configuration 2 (power conversion device 104).

Figure 13B:
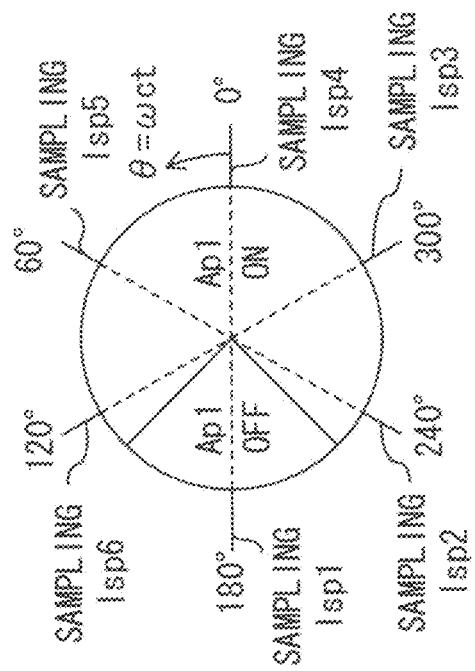
FIG. 13B illustrates the setting example 1 for triangular wave carriers and current detection timings in the representative configuration 2 of the power conversion device according to embodiment 1.
Figure 13A:
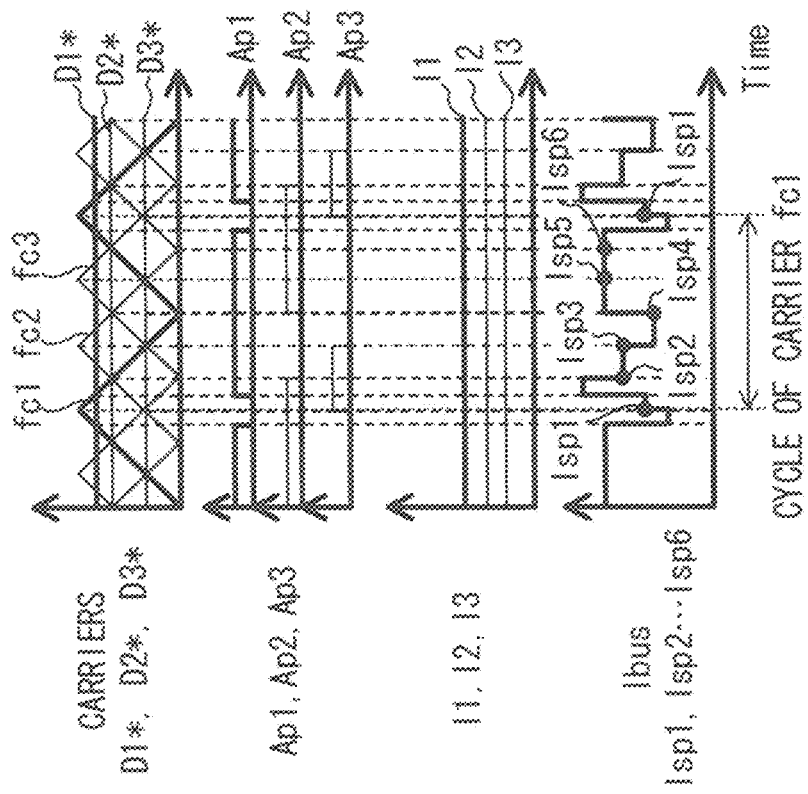
FIG. 13A illustrates a setting example 1 for triangular wave carriers and current detection timings in the representative configuration 2 of the power conversion device according to embodiment 1.

Specifically, FIG. 13A illustrates the relationship among the triangular wave carriers (fc1, fc2, fc3), the ON/OFF states of the high-voltage-side upper arms Ap1, Ap2, Ap3, the phase currents (I1, I2, I3), the common DC bus current Ibus, and the detected currents (Isp1, Isp2, Isp3, Isp4, Isp5, Isp6).

FIG. 13B illustrates the ON/OFF state of the upper arm Ap1 and the detection timings for the common DC bus current Ibus (i.e., detection timings for Isp1 to Isp6), using a phase.

Here, the triangular wave carrier fc1 is represented by $fc1 = (K/\pi) \cdot |\omega c t|$ in a range where the time function t is not less than $-\pi/\omega c$ and not greater than $\pi/\omega c$.

Figure 14B:
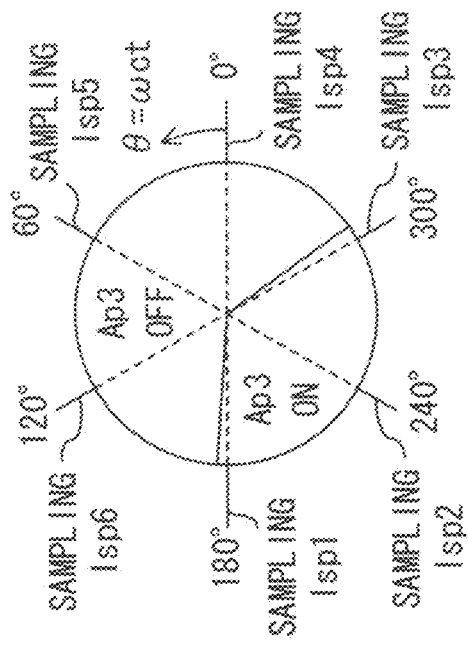
FIG. 14B illustrates the setting example 1 for triangular wave carriers and current detection timings in the representative configuration 2 of the power conversion device according to embodiment 1.
Figure 14A:
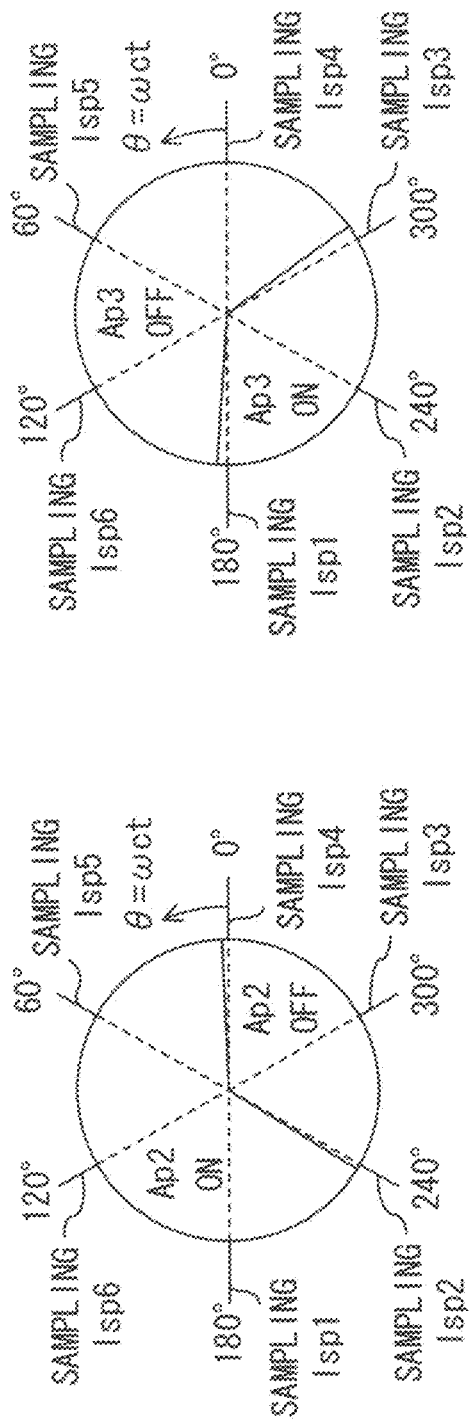
FIG. 14A illustrates the setting example 1 for triangular wave carriers and current detection timings in the representative configuration 2 of the power conversion device according to embodiment 1.

FIG. 14A illustrates the ON/OFF state of the upper arm Ap2 and the detection timings for the common DC bus current Ibus (i.e., detection timings for Isp1 to Isp6), using a phase.

Here, the triangular wave carrier fc2 is represented by $fc2 = (K/\pi) \cdot |\omega c t - (2\pi/3)|$ in a range where the time function t is not less than $-(1/3)\pi/\omega c$ and not greater than $(5/3)\pi/\omega c$.

FIG. 14B illustrates the ON/OFF state of the upper arm Ap3 and the detection timings for the common DC bus current Ibus (i.e., detection timings for Isp1 to Isp6), using a phase.

Here, the triangular wave carrier fc3 is represented by $fc3 = (K/\pi) \cdot |\omega c t + (2\pi/3)|$ in a range where the time function t is not less than $-(5/3)\pi/\omega c$ and not greater than $(1/3)\pi/\omega c$.

Here, with one cycle of the triangular wave carrier (fc1, fc2, fc3) defined as 360 degrees, the relationship between the ON/OFF states of the high-voltage-side upper arms Ap1, Ap2, Ap3 corresponding to the Duty commands, and the detection timings for the common DC bus current Ibus, can be extracted. Thus, it is possible to find, in advance, a condition in which sampling error is likely to occur due to overlap between the arm ON/OFF switching timing and the detection timing for the common DC bus current Ibus.

In FIG. 13 and FIG. 14, it can be said that, for all of the three phases, sampling error is likely to occur when the Duty command is 0%, (100/3)%, (200/3)%, and 100%.

Figure 15:
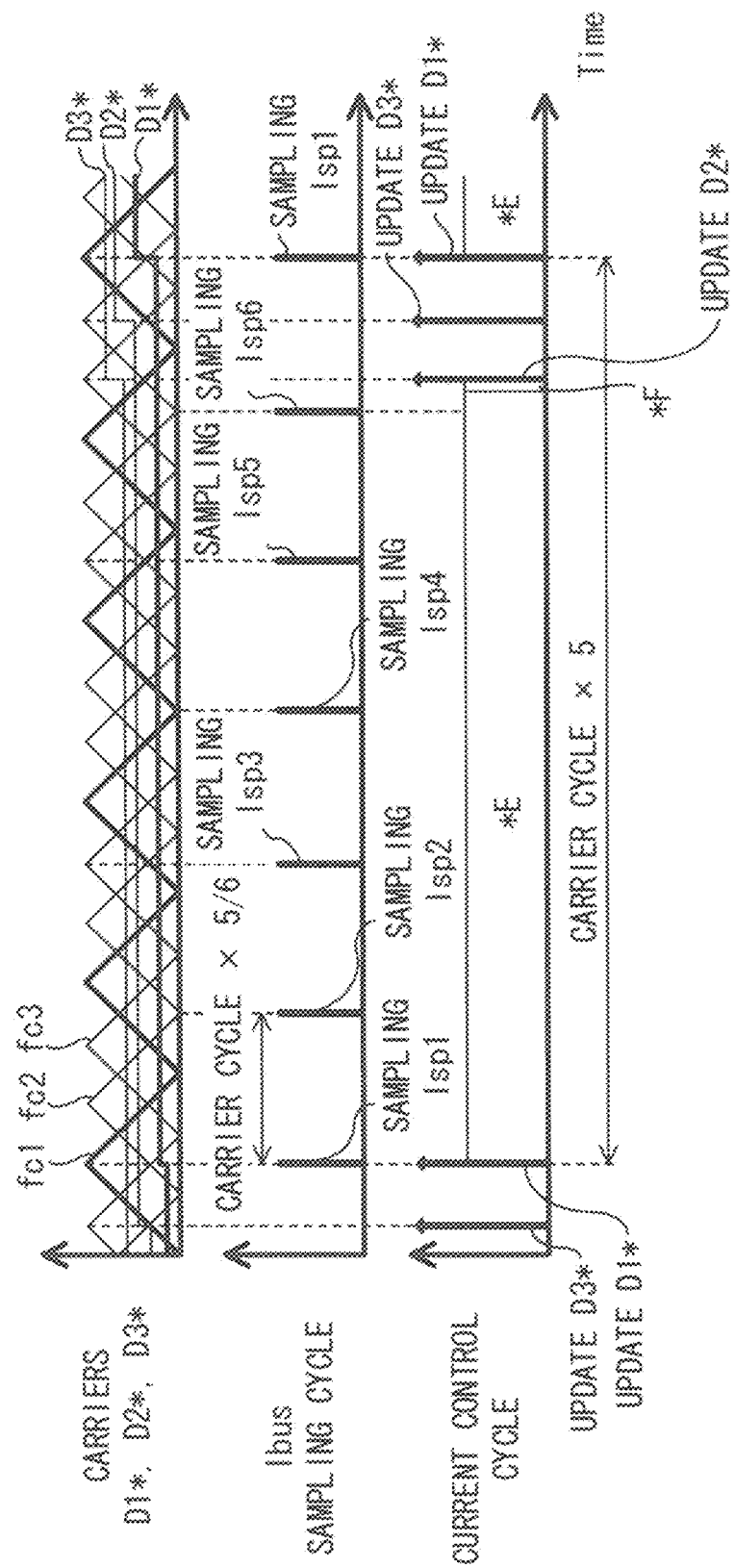
FIG. 15 illustrates the setting example 1 for a carrier cycle, a sampling cycle, phase current estimation, and a Duty command update cycle that enable estimation for each phase current in the representative configuration 2 of the power conversion device according to embodiment 1.

FIG. 15 shows the setting example 1 for a Duty command update cycle that enables estimation for each phase current, corresponding to FIG. 13 and FIG. 14, in the representative configuration 2 (power conversion device 104). Specifically, FIG. 15 shows the setting example 1 for the carrier cycle, the sampling cycle, phase current estimation, and the Duty command update cycle that enable estimation for each phase current.

In FIG. 15, *E represents "perform current detection (Isp1 to Isp6) and estimate phase currents", and *F represents "current control".

Here, the carrier phase difference among the phases is set to 120 degrees, the detection timing cycle for the common DC bus current Ibus is set to 5/6 times the carrier cycle, and the cycle of current control and update for the Duty command is set to 5.0 times the carrier cycle, which is the least common multiple of the carrier cycle and the current detection timing cycle.

It is noted that the current detection timing cycle is, namely, the cycle of the estimation timing for each phase current.

In conditions in which the Duty command is 0%, 100/3%, 200/3%, and 100%, the common DC bus current detection timing and the arm ON/OFF timing overlap each other, so that detection error is likely to occur in detection for the common DC bus current Ibus. However, it is not general to perform operations with a Duty command of 0% and a Duty command of 100%, and therefore it will be described that the phase currents can be estimated from the common DC bus current Ibus over almost the entire region.

In the setting example in FIG. 13 to FIG. 15, the relationship between the phase currents and the common DC bus current Ibus can be represented by Expression (18). Here, indexes x, y, z correspond to indexes for the detection timings for the detected currents Isp1 to Isp6.

[Mathematical 18]

$$\begin{bmatrix} Ispx \\ Ispy \\ Ispz \end{bmatrix} = \begin{bmatrix} Sp1x & Sp2x & Sp3x \\ Sp1y & Sp2y & Sp3y \\ Sp1z & Sp2z & Sp3z \end{bmatrix} \begin{bmatrix} I1 \\ I2 \\ I3 \end{bmatrix} = Z \begin{bmatrix} I1 \\ I2 \\ I3 \end{bmatrix} \quad (18)$$

If operations with Duty commands of 0% and 100% are assumed to be prohibited operations, Expression (18) can be replaced with Expression (19) for using Isp1, Isp3, and Isp5 detected at the maximum values of the triangular wave carriers.

[Mathematical 19]

$$\begin{bmatrix} Isp1 \\ Isp3 \\ Isp5 \end{bmatrix} = \begin{bmatrix} 0 & Sp21 & Sp31 \\ Sp13 & 0 & Sp33 \\ Sp15 & Sp25 & 0 \end{bmatrix} \begin{bmatrix} I1 \\ I2 \\ I3 \end{bmatrix} = Z \begin{bmatrix} I1 \\ I2 \\ I3 \end{bmatrix} \quad (19)$$

If operations with Duty commands of 0% and 100% are assumed to be prohibited operations, Expression (18) can be replaced with Expression (20) for using Isp2, Isp4, and Isp6 detected at the minimum values of the triangular wave carriers.

[Mathematical 20]

$$\begin{bmatrix} Isp2 \\ Isp4 \\ Isp6 \end{bmatrix} = \begin{bmatrix} Sp12 & Sp22 & 1 \\ 1 & Sp24 & Sp34 \\ Sp16 & 1 & Sp36 \end{bmatrix} \begin{bmatrix} I1 \\ I2 \\ I3 \end{bmatrix} = Z \begin{bmatrix} I1 \\ I2 \\ I3 \end{bmatrix} \quad (20)$$

For example, in the operation condition shown in FIG. 13 and FIG. 14, Expression (19) and Expression (20) can be represented by Expression (21) and Expression (22), respectively.

[Mathemcatical 21]

$$\begin{bmatrix} Isp1 \\ Isp3 \\ Isp5 \end{bmatrix} = \begin{bmatrix} 0 & 1 & 1 \\ 1 & 0 & 1 \\ 1 & 1 & 0 \end{bmatrix} \begin{bmatrix} I1 \\ I2 \\ I3 \end{bmatrix} = Z \begin{bmatrix} I1 \\ I2 \\ I3 \end{bmatrix} \quad (21)$$

[Mathematical 22]

$$\begin{bmatrix} Isp2 \\ Isp4 \\ Isp6 \end{bmatrix} = \begin{bmatrix} 1 & 0 & 1 \\ 1 & 0 & 0 \\ 1 & 1 & 0 \end{bmatrix} \begin{bmatrix} I1 \\ I2 \\ I3 \end{bmatrix} = Z \begin{bmatrix} I1 \\ I2 \\ I3 \end{bmatrix} \quad (22)$$

In Expression (21) and Expression (22), the determinant of the matrix Z is 2 and 1, respectively, and therefore the inverse matrix can be derived. Thus, it is found that the phase currents can be reproduced from the common DC bus current Ibus using both expressions for the operation condition shown in FIG. 13 and FIG. 14.

The condition in which the phase currents cannot be reproduced from the common DC bus current Ibus using Expression (19) and Expression (20) is, for example, a case where the Duty command D1* is less than 100/3%, the Duty command D2* is greater than 200/3%, and the Duty command D3* is greater than 200/3%. In this case, Expression (19) and Expression (20) can be represented by Expression (23) and Expression (24), respectively.

[Mathemcatical 23]

$$\begin{bmatrix} Isp1 \\ Isp3 \\ Isp5 \end{bmatrix} = \begin{bmatrix} 0 & 1 & 1 \\ 1 & 1 & 1 \\ 0 & 1 & 1 \end{bmatrix} \begin{bmatrix} I1 \\ I2 \\ I3 \end{bmatrix} = Z \begin{bmatrix} I1 \\ I2 \\ I3 \end{bmatrix} \quad (23)$$

[Mathematical 24]

$$\begin{bmatrix} Isp2 \\ Isp4 \\ Isp6 \end{bmatrix} = \begin{bmatrix} 0 & 1 & 1 \\ 0 & 0 & 1 \\ 0 & 1 & 0 \end{bmatrix} \begin{bmatrix} I1 \\ I2 \\ I3 \end{bmatrix} = Z \begin{bmatrix} I1 \\ I2 \\ I3 \end{bmatrix} \quad (24)$$

In both of Expression (23) and Expression (24), the determinant of the matrix Z is zero, and therefore the inverse matrix cannot be derived. However, for example, in Expression (25) obtained by replacing the row for Isp5 in Expression (23) with the row for Isp6 in Expression (24), the determinant of the matrix Z is 1, and therefore the inverse matrix can be derived. The matrix Z can be extracted in advance based on the relationship of the Duty commands for the respective phases. Therefore, if such three values that the determinant will not become zero are extracted in advance from the six detected currents, stable estimation for the phase currents from the common DC bus current can be achieved.

[Mathematical 25]

$$\begin{bmatrix} Isp1 \\ Isp3 \\ Isp6 \end{bmatrix} = \begin{bmatrix} 0 & 1 & 1 \\ 1 & 1 & 1 \\ 0 & 1 & 0 \end{bmatrix} \begin{bmatrix} I1 \\ I2 \\ I3 \end{bmatrix} = Z \begin{bmatrix} I1 \\ I2 \\ I3 \end{bmatrix} \quad (25)$$

Here, if the Duty command changes at the detection timing for Isp1 to Isp6, the state of the upper arm Ap1, Ap2, Ap3 at the detection timing also changes. Therefore, when the cycle for detecting Isp1 to Isp6 is 5/6 times the carrier cycle, if the update cycle for the Duty commands is set to be equal to or greater than 5.0 times the carrier cycle, which is the least common multiple of the carrier cycle and the detection cycle, estimation error for the phase currents I1, I2, I3 can be reduced.

Figure 16:
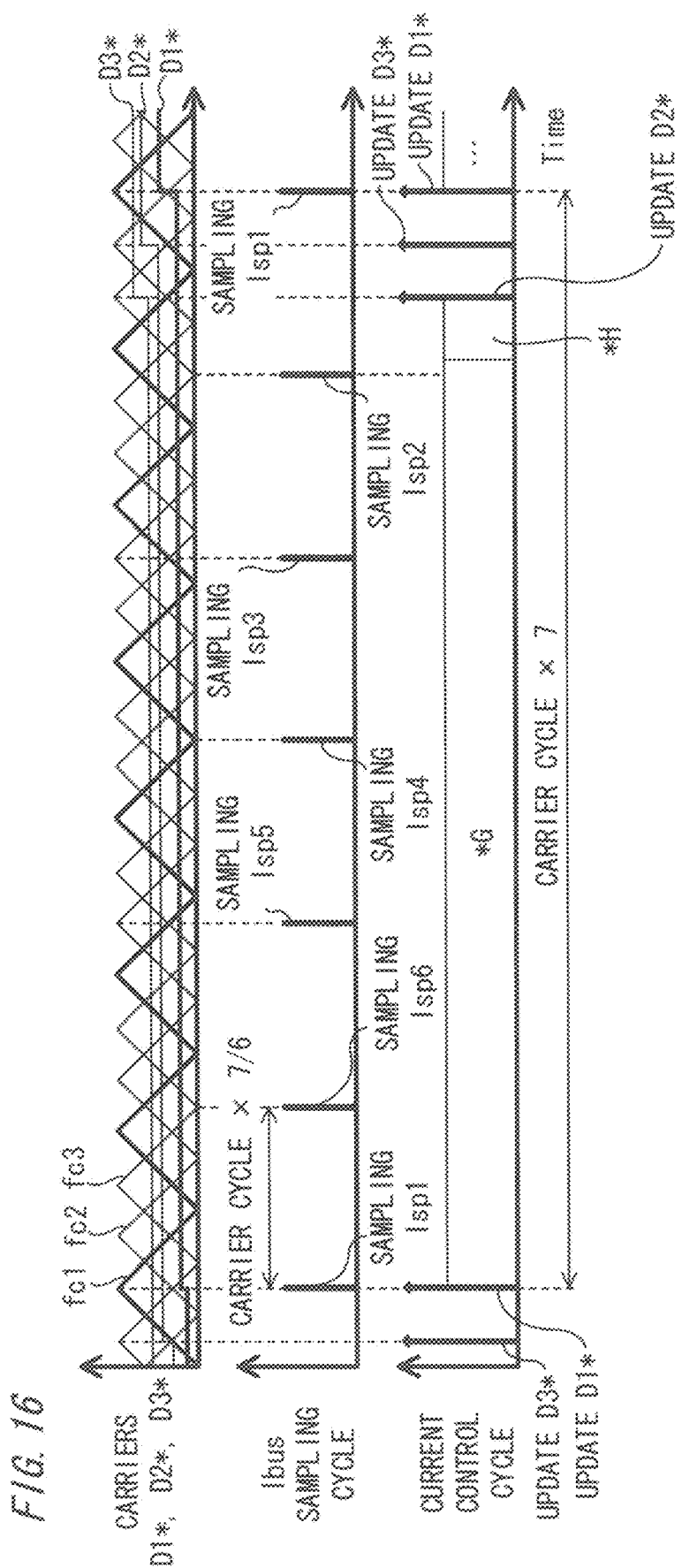
FIG. 16 illustrates a setting example 2 for a carrier cycle, a sampling cycle, phase current estimation, and a Duty command update cycle that enable estimation for each phase current in the representative configuration 2 of the power conversion device according to embodiment 1.

FIG. 16 shows a setting example 2 for the Duty command update cycle that enables estimation for each phase current, corresponding to FIG. 13 and FIG. 14, in the representative configuration 2 (power conversion device 104). Specifically, FIG. 16 shows the setting example 2 for the carrier cycle, the sampling cycle, phase current estimation, and the Duty command update cycle that enable estimation for each phase current.

In FIG. 16, *G represents "perform current detection (Isp1 to Isp6) and estimate phase currents", and *H represents "current control".

Here, the carrier phase difference among the phases is set to 120 degrees, the detection timing cycle for the common DC bus current Ibus is 7/6 times the carrier cycle, and the cycle of current control and update for the Duty command is set to 7.0 times the carrier cycle, which is the least common multiple of the carrier cycle and the current detection timing cycle.

In conditions in which the Duty command is 0%, 100/3%, 200/3%, and 100%, the common DC bus current detection timing and the arm ON/OFF timing overlap each other, so that detection error is likely to occur in detection for the common DC bus current Ibus. However, it is not general to perform operations with a Duty command of 0% and a Duty command of 100%, and therefore it will be described that the phase currents can be estimated from the common DC bus current Ibus over almost the entire region.

In the setting example 2 in FIG. 16, the relationships of Expressions (18) to (25) described in the setting example 1 in FIG. 15 can be used.

For the setting example 2, if the Duty command changes at the detection timing for Isp1 to Isp6, the state of the upper arm Ap1, Ap2, Ap3 at the detection timing also changes. Therefore, if the update cycle for the Duty commands is set to be equal to or greater than 7.0 times the carrier cycle, which is the least common multiple of the carrier cycle and the current detection cycle, estimation error for the phase currents I1, I2, I3 can be reduced.

In FIG. 16, update of the Duty commands is performed for D1* after D2* and D3*. However, depending on the speed of current control calculation, update of the Duty commands may be performed for D2* and D3* after D1*.

Thus, regarding the power conversion device 104 using the three-input three-phase converter as the representative configuration 2 of the power conversion device in embodiment 1, the method for estimating the phase currents (I1, I2, I3) from the common DC bus current Ibus has been described.

The configuration and the function/operation in a representative configuration 3 (four-input four-phase converter) of the power conversion device in embodiment 1 will be described with reference to FIG. 17 to FIG. 23.

Figure 17:
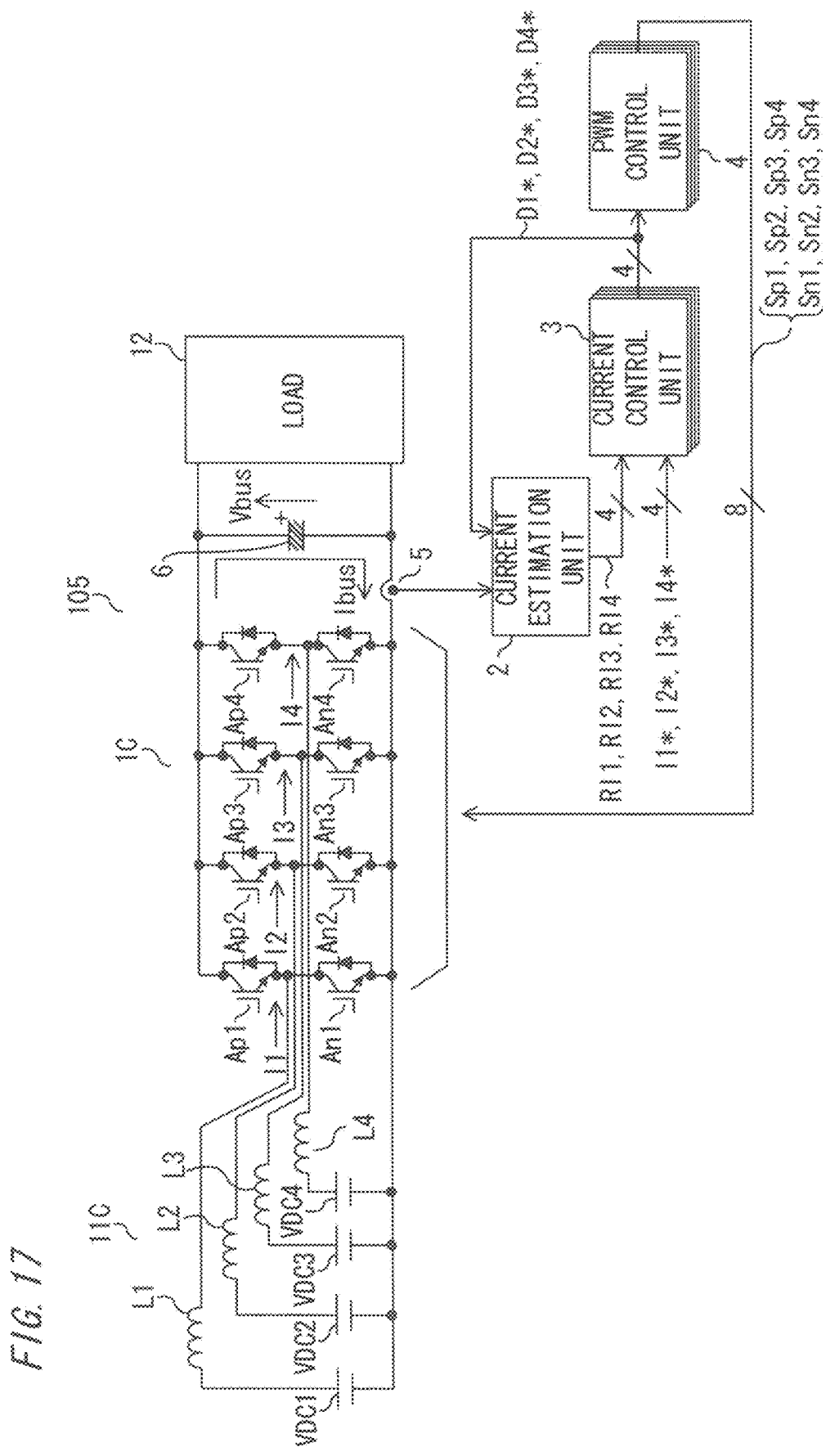
FIG. 17 is a configuration diagram showing a representative configuration 3 (four-input four-phase converter) of the power conversion device according to embodiment 1.

In FIG. 17, for discrimination from the configurations in FIG. 1, etc., the power conversion device is denoted by 105. In addition, the power conversion unit is denoted by 1C and the input power supply unit is denoted by 11C.

The input power supply unit 11C of the power conversion device 105 includes reactors L1, L2, L3, L4 and DC power supplies VDC1, VDC2, VDC3, VDC4, and forms a four-input four-phase converter together with the power conversion unit 1C.

The power conversion device 105 has a four-phase configuration, and therefore includes four current control units 3 and four PWM control units 4.

The current estimation unit 2 estimates phase currents (RI1, RI2, RI3, RI4) from the common DC bus current Ibus detected by the current detector 5 and Duty commands (D1*, D2*, D3*, D4*) generated by the current control units 3, and outputs the estimated phase currents to the current control units 3.

The current control units 3 generate Duty commands (D1*, D2*, D3*, D4*) for controlling the respective phase currents, using the estimated phase currents (RI1, RI2, RI3, RI4) and the target values (I1*, I2*, I3*, I4*) for the phase currents.

The PWM control units 4 generate ON/OFF signals (Sp1, Sp2, Sp3, Sp4 and Sn1, Sn2, Sn3, Sn4) for controlling the upper and lower arms (Ap1, Ap2, Ap3, Ap4 and An1, An2, An3, An4) of the respective legs of the power conversion unit 1B, from the Duty commands (D1*, D2*, D3*, D4*) generated by the current control units 3.

FIG. 18 and FIG. 19 show a setting example 1 for the triangular wave carriers for the respective phases, the ON/OFF states for the high-voltage-side upper arms Ap1, Ap2, Ap3, Ap4, the phase currents (I1, I2, I3, I4), and the detection timings for the common DC bus current Ibus in the representative configuration 3 (power conversion device 105).

Figure 18B:
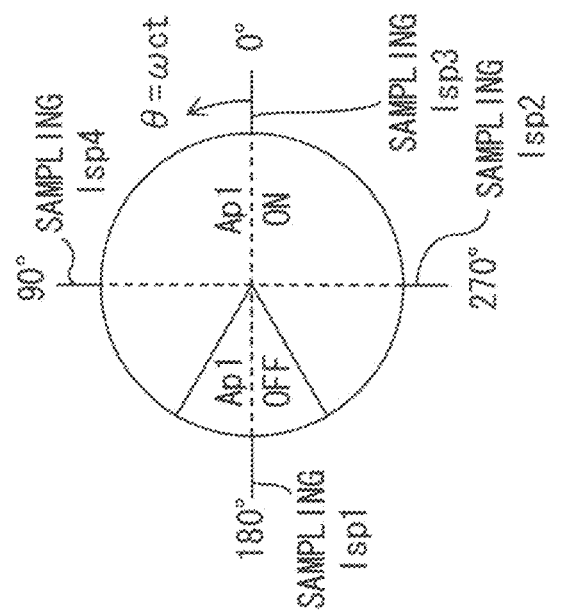
FIG. 18B illustrates the setting example 1 for triangular wave carriers and current detection timings in the representative configuration 3 of the power conversion device according to embodiment 1.
Figure 18A:
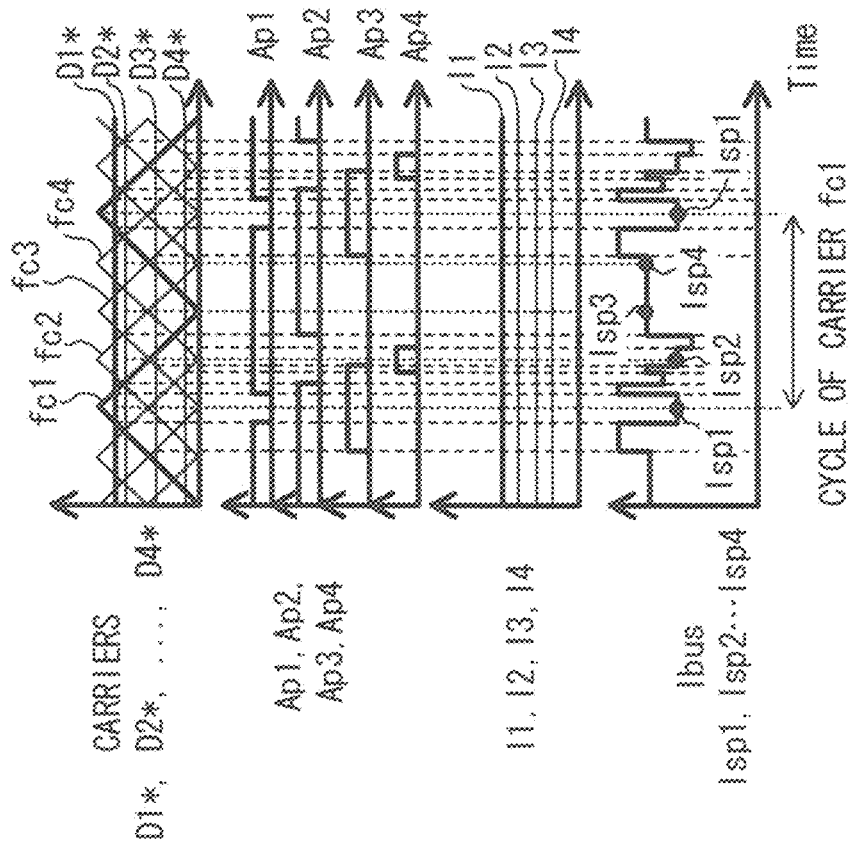
FIG. 18A illustrates a setting example 1 for triangular wave carriers and current detection timings in the representative configuration 3 of the power conversion device according to embodiment 1.

Specifically, FIG. 18A illustrates the relationship among the triangular wave carriers (fc1, fc2, fc3, fc4), the ON/OFF states of the high-voltage-side upper arms Ap1, Ap2, Ap3, Ap4, the phase currents (I1, I2, I3, I4), the common DC bus current Ibus, and the detected currents (Isp1, Isp2, Isp3, Isp4).

FIG. 18B illustrates the ON/OFF state of the upper arm Ap1 and the detection timings for the common DC bus current Ibus (i.e., detection timings for Isp1 to Isp4), using a phase.

Here, the triangular wave carrier fc1 is represented by $fc1=(K/\pi) \cdot |\omega ct|$ in a range where the time function t is not less than $-\pi/\omega c$ and not greater than $\pi/\omega c$.

FIG. 19A illustrates the ON/OFF state of the upper arm Ap2 and the detection timings for the common DC bus current Ibus, using a phase.

Here, the triangular wave carrier fc2 is represented by $fc2=(K/\pi) \cdot |\omega ct-(\pi/2)|$ in a range where the time function t is not less than $-(1/2)\pi/\omega c$ and not greater than $(3/2)\pi/\omega c$.

FIG. 19B illustrates the ON/OFF state of the upper arm Ap3 and the detection timings for the common DC bus current Ibus, using a phase.

Here, the triangular wave carrier fc3 is represented by $fc3=(K/\pi) \cdot |\omega ct+\pi|$ in a range where the time function t is not less than $-2\pi/\omega c$ and not greater than 0.

FIG. 19C illustrates the ON/OFF state of the upper arm Ap4 and the detection timings for the common DC bus current Ibus, using a phase.

Here, the triangular wave carrier fc4 is represented by $fc4=(K/\pi) \cdot |\omega ct+(\pi/2)|$ in a range where the time function t is not less than $-(3/2)\pi/\omega c$ and not greater than $(1/2)\pi/\omega c$.

Here, with one cycle of the triangular wave carrier (fc1, fc2, fc3, fc4) defined as 360 degrees, the relationship between the ON/OFF states of the high-voltage-side upper arms Ap1, Ap2, Ap3, Ap4 corresponding to the Duty commands, and the detection timings for the common DC bus current Ibus, can be extracted. Thus, it is possible to find, in advance, a condition in which sampling error is likely to occur due to overlap between the arm ON/OFF switching timing and the detection timing for the common DC bus current Ibus.

In FIG. 18 and FIG. 19, it can be said that, for all of the four phases, sampling error is likely to occur when the Duty command is 0%, 50%, and 100%.

FIG. 20 shows the setting example 1 for a Duty command update cycle, which corresponds to FIG. 18 and FIG. 19 and in which a problem remains in estimation for each phase current, in the representative configuration 3 (power conversion device 105). Specifically, FIG. 20 shows the setting example 1 for the carrier cycle, the sampling cycle, phase current estimation, and the Duty command update cycle in which a problem remains in estimation for each phase current.

In FIG. 20, *I represents "perform current detection (Isp1 to Isp4) and estimate phase currents", and *J represents "current control".

Here, the carrier phase difference among the phases is set to 90 degrees, the detection timing cycle for the common DC bus current Ibus is 5/4 times the carrier cycle, and the cycle of current control and update for the Duty command is set to 5.0 times the carrier cycle, which is the least common multiple of the carrier cycle and the current detection timing cycle.

It is noted that the current detection timing cycle is, namely, the cycle of the estimation timing for each phase current.

In conditions in which the Duty command is 0%, 50%, and 100%, the common DC bus current detection timing and the arm ON/OFF timing overlap each other, so that detection error is likely to occur in detection for the common DC bus current Ibus. However, it is not general to perform operations with a Duty command of 0% and a Duty command of 100%, and therefore it will be described that the phase current can be estimated from the common DC bus current Ibus restrictively in a condition in which the Duty command is greater than 0% and less than 100%.

In the setting example 1 in FIG. 18 to FIG. 20, the relationship between the phase currents and the common DC bus current Ibus can be represented by Expression (26).

[Mathematical 26]

$$\begin{bmatrix} Isp1 \\ Isp2 \\ Isp3 \\ Isp4 \end{bmatrix} = \begin{bmatrix} Sp11 & Sp21 & Sp31 & Sp41 \\ Sp12 & Sp22 & Sp32 & Sp42 \\ Sp13 & Sp23 & Sp33 & Sp43 \\ Sp14 & Sp24 & Sp34 & Sp44 \end{bmatrix} \begin{bmatrix} I1 \\ I2 \\ I3 \\ I4 \end{bmatrix} = Z \begin{bmatrix} I1 \\ I2 \\ I3 \\ I4 \end{bmatrix} \quad (26)$$

For example, in the operation condition shown in FIG. 18 and FIG. 19, Expression (26) can be represented by Expression (27).

[Mathematical 27]

$$\begin{bmatrix} Isp1 \\ Isp2 \\ Isp3 \\ Isp4 \end{bmatrix} = \begin{bmatrix} 0 & 1 & 1 & 0 \\ 1 & 0 & 0 & 1 \\ 1 & 1 & 0 & 0 \\ 1 & 1 & 0 & 0 \end{bmatrix} \begin{bmatrix} I1 \\ I2 \\ I3 \\ I4 \end{bmatrix} = Z \begin{bmatrix} I1 \\ I2 \\ I3 \\ I4 \end{bmatrix} \quad (27)$$

However, in Expression (27), the third row and the fourth row of the matrix Z are the same, so that the determinant becomes zero. Therefore, the phase currents cannot be reproduced from the common DC bus current Ibus. In addition, unlike the representative configuration 2, in the setting example 1 in the representative configuration 3, the number of the phases and the number of detection points for the common DC bus current Ibus are equal. Therefore, this setting example is a restrictive setting example that includes a condition in which the phase currents cannot be estimated from the common DC bus current Ibus.

FIG. 21 and FIG. 22 show a setting example 2 for the triangular wave carriers for the respective phases, the ON/OFF states for the high-voltage-side upper arms Ap1, Ap2, Ap3, Ap4, the phase currents (I1, I2, I3, I4), and the detection timings for the common DC bus current Ibus in the representative configuration 3 (power conversion device 105).

Figure 21B:
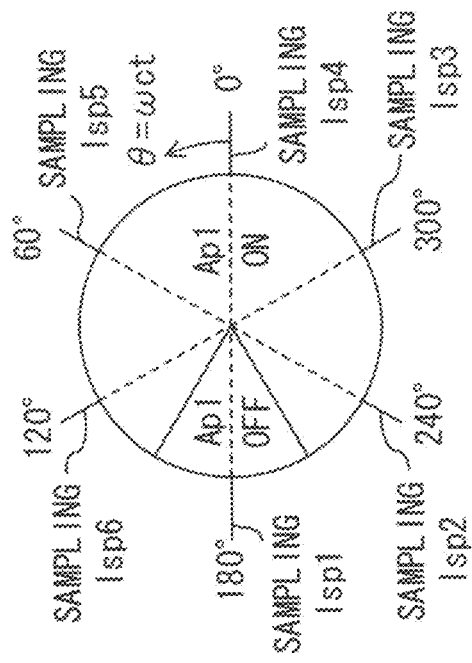
FIG. 21B illustrates a setting example 2 for triangular wave carriers and current detection timings in the representative configuration 3 of the power conversion device according to embodiment 1.
Figure 21A:
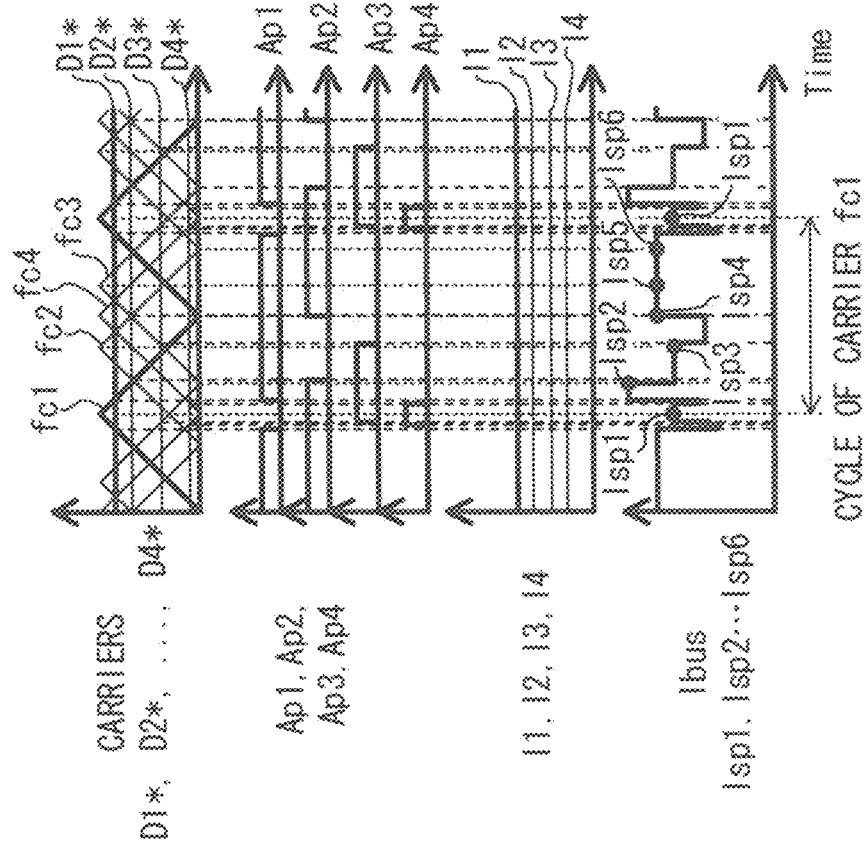
FIG. 21A illustrates a setting example 2 for triangular wave carriers and current detection timings in the representative configuration 3 of the power conversion device according to embodiment 1.

Specifically, FIG. 21A illustrates the relationship among the triangular wave carriers (fc1, fc2, fc3, fc4), the ON/OFF states of the high-voltage-side upper arms Ap1, Ap2, Ap3, Ap4, the phase currents (I1, I2, I3, I4), the common DC bus current Ibus, and the detected currents (Isp1, Isp2, Isp3, Isp4, Isp5, Isp6).

The triangular wave carriers fc1, fc2, fc3 have phase differences of 120 degrees from each other, and the triangular wave carrier fc4 has a phase difference of 180 degrees from fc1. That is, the initial phase differences of the triangular wave carriers fc1, fc2, fc3, fc4 are different.

FIG. 21B illustrates the ON/OFF state of the upper arm Ap1 and the detection timings for the common DC bus current Ibus (i.e., detection timings for Isp1 to Isp6), using a phase.

Here, the triangular wave carrier fc1 is represented by fc1=(K/π)·|ωct| in a range where the time function t is not less than −π/ωc and not greater than π/ωc.

Figure 22A:
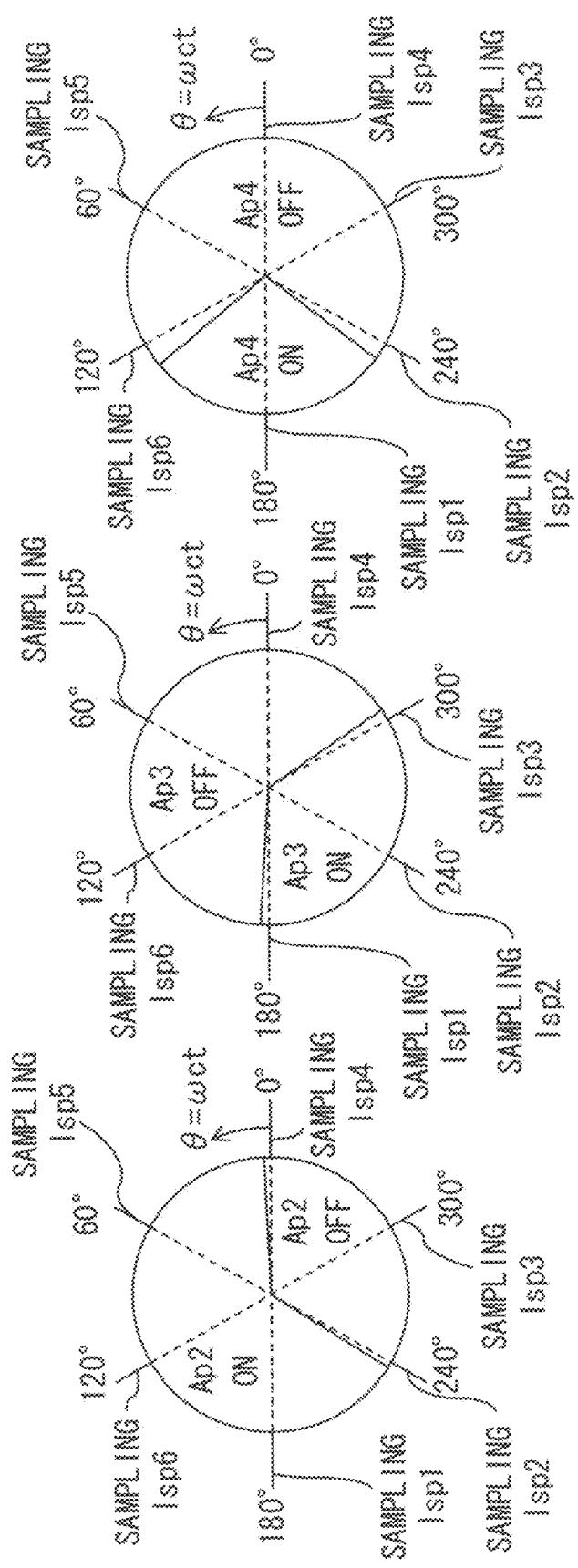
FIG. 22A illustrates the setting example 2 for triangular wave carriers and current detection timings in the representative configuration 3 of the power conversion device according to embodiment 1.

FIG. 22A illustrates the ON/OFF state of the upper arm Ap2 and the detection timings for the common DC bus current Ibus (i.e., detection timings for Isp1 to Isp6), using a phase.

Here, the triangular wave carrier fc2 is represented by fc2=(K/π)·|ωct−(2π/3)| in a range where the time function t is not less than −(1/3)π/ωc and not greater than (5/3)π/ωc.

Figure 22B:
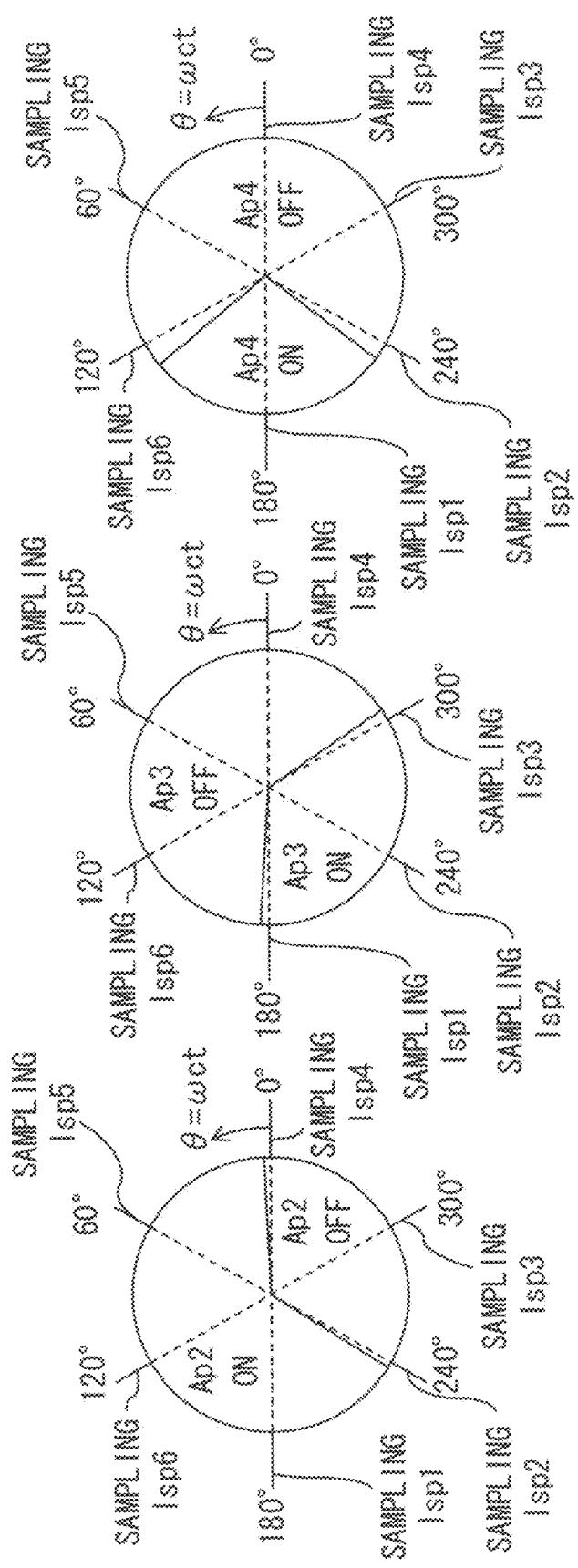
FIG. 22B illustrates the setting example 2 for triangular wave carriers and current detection timings in the representative configuration 3 of the power conversion device according to embodiment 1.

FIG. 22B illustrates the ON/OFF state of the upper arm Ap3 and the detection timings for the common DC bus current Ibus (i.e., detection timings for Isp1 to Isp6), using a phase.

Here, the triangular wave carrier fc3 is represented by fc3=(K/π)·|ωct+(2π/3)| in a range where the time function t is not less than −(5/3)π/ωc and not greater than (1/3)π/ωc.

Figure 22C:
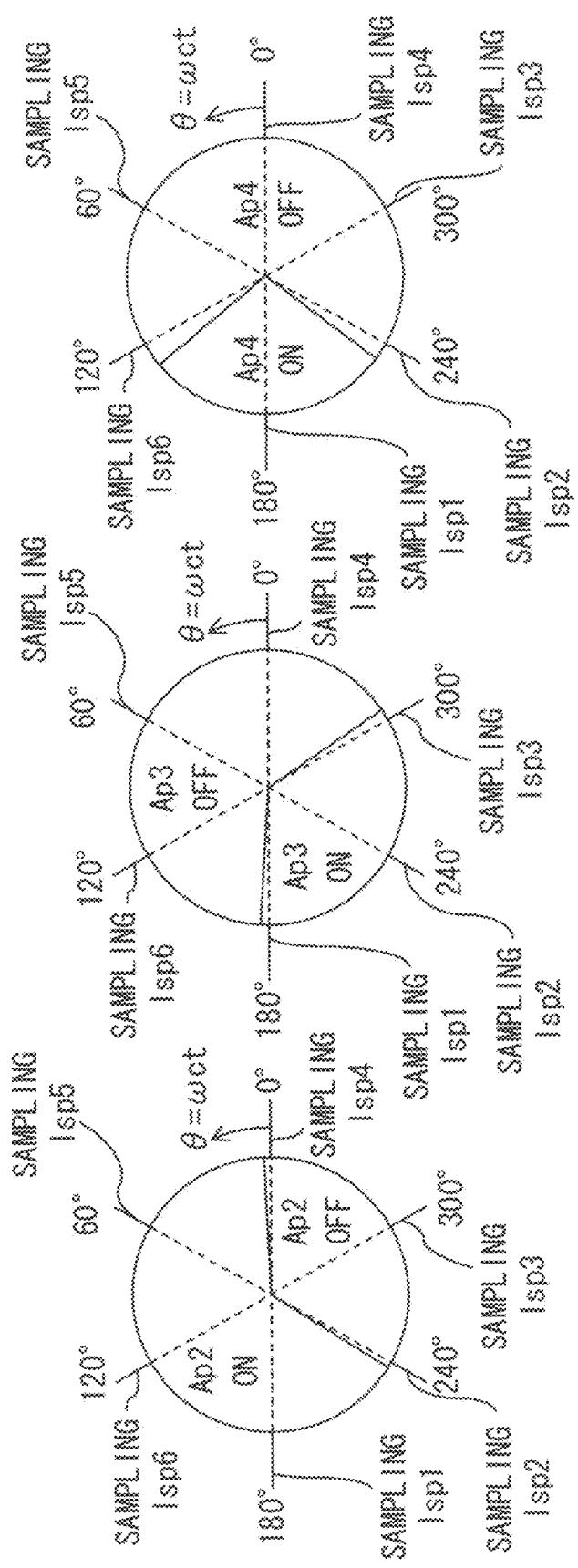
FIG. 22C illustrates the setting example 2 for triangular wave carriers and current detection timings in the representative configuration 3 of the power conversion device according to embodiment 1.

FIG. 22C illustrates the ON/OFF state of the upper arm Ap4 and the detection timings for the common DC bus current Ibus (i.e., detection timings for Isp1 to Isp6), using a phase.

Here, the triangular wave carrier fc4 is represented by fc4=(K/π)·|ωct+(π/2)+π| in a range where the time function t is not less than −2π/ωc and not greater than 0.

Here, with one cycle of the triangular wave carrier (fc1, fc2, fc3, fc4) defined as 360 degrees, the relationship between the ON/OFF states of the high-voltage-side upper arms Ap1, Ap2, Ap3, Ap4 corresponding to the Duty commands, and the detection timings for the common DC bus current Ibus, can be extracted. Thus, it is possible to find, in advance, a condition in which sampling error is likely to occur due to overlap between the arm ON/OFF switching timing and the detection timing for the common DC bus current Ibus.

In FIG. 21 and FIG. 22, it can be said that, for all of the four phases, sampling error is likely to occur when the Duty command is 0%, 100/3%, 200/3%, and 100%.

Figure 23:
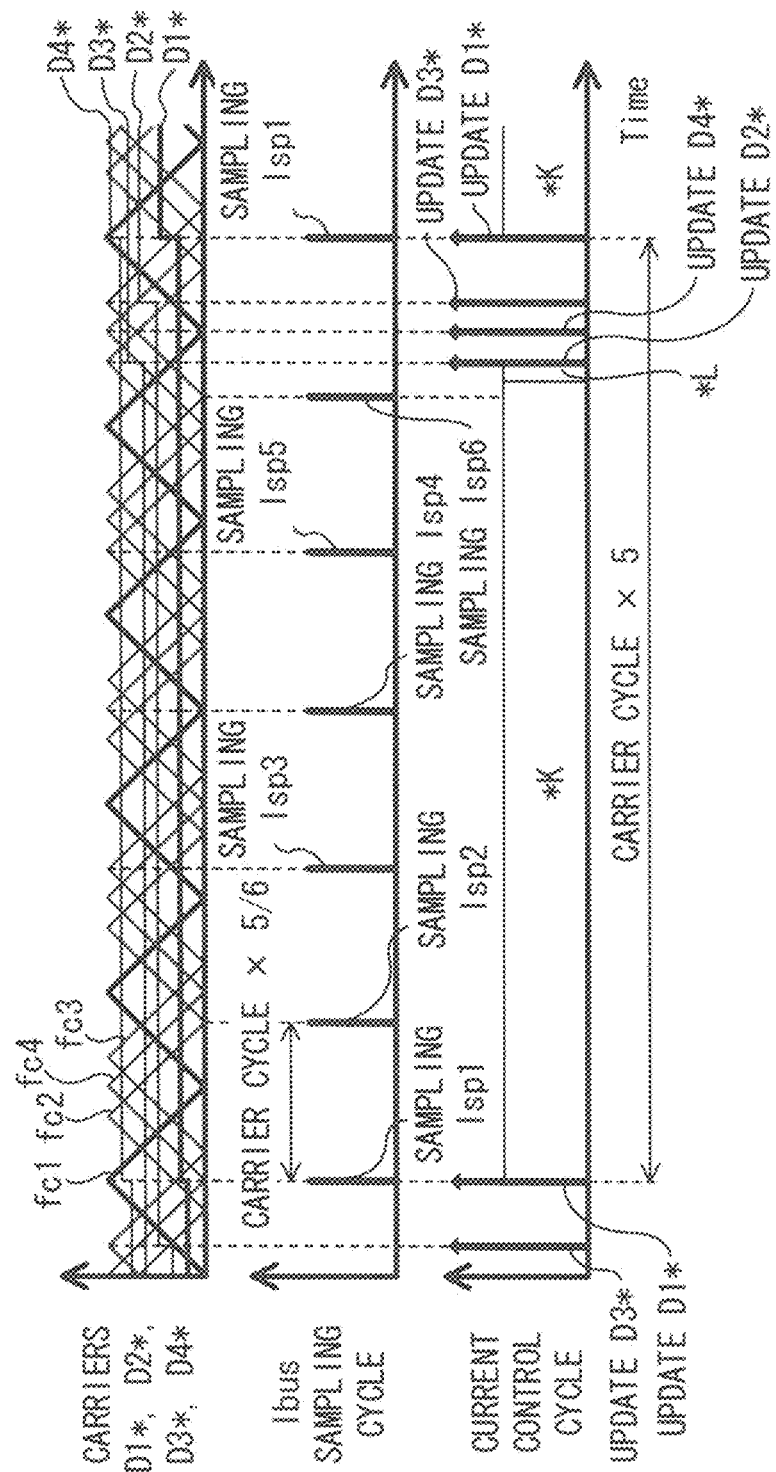
FIG. 23 illustrates the setting example 2 for a carrier cycle, a sampling cycle, phase current estimation, and a Duty command update cycle that enable estimation for each phase current, in the representative configuration 3 of the power conversion device according to embodiment 1.

FIG. 23 shows the setting example 2 for a Duty command update cycle that enables estimation for each phase current, corresponding to FIG. 21 and FIG. 22, in the representative configuration 3 (power conversion device 105). Specifically, FIG. 23 shows the setting example 2 for the carrier cycle, the sampling cycle, phase current estimation, and the Duty command update cycle that enable estimation for each phase current.

In FIG. 23, *K represents "perform current detection (Isp1 to Isp6) and estimate phase currents", and *L represents "current control".

Here, the carrier phase difference among the three phases (fc1, fc2, fc3) of the four phases is set to 120 degrees, the carrier phase difference between one phase (fc1) of the three phases and the other one phase (fc4) is set to 180 degrees, the detection timing cycle for the common DC bus current Ibus is set to 5/6 times the carrier cycle, and the cycle of current control and update for the Duty command is set to 5.0 times the carrier cycle, which is the least common multiple of the carrier cycle and the current detection timing cycle.

It is noted that the current detection timing cycle is, namely, the cycle of the estimation timing for each phase current.

In conditions in which the Duty command is 0%, 50%, and 100%, the common DC bus current detection timing and the arm ON/OFF timing overlap each other, so that detection error is likely to occur in detection for the common DC bus current Ibus. It will be described that, in a condition in which the Duty command is greater than 0% and less than 100%, the phase currents (I1 to I4) can be estimated from the common DC bus current Ibus.

In the setting example in FIG. 21 to FIG. 23, the relationship between the phase currents and the common DC bus current Ibus can be represented by Expression (28). Here, indexes w, x, y, z correspond to indexes for the detection timings for Isp1 to Isp6.

[Mathematical 28]

$$\begin{bmatrix} Ispw \\ Ispx \\ Ispy \\ Ispz \end{bmatrix} = \begin{bmatrix} Sp1w & Sp2w & Sp3w & Sp4w \\ Sp1x & Sp2x & Sp3x & Sp4x \\ Sp1y & Sp2y & Sp3y & Sp4y \\ Sp1z & Sp2z & Sp3z & Sp4z \end{bmatrix} \begin{bmatrix} I1 \\ I2 \\ I3 \\ I4 \end{bmatrix} = Z \begin{bmatrix} I1 \\ I2 \\ I3 \\ I4 \end{bmatrix} \quad (28)$$

For example, in the operation condition shown in FIG. 21 and FIG. 22, Expression (28) can be represented by Expression (29).

[Mathematical 29]

$$\begin{bmatrix} Isp1 \\ Isp2 \\ Isp4 \\ Isp6 \end{bmatrix} = \begin{bmatrix} 0 & 1 & 1 & 1 \\ 1 & 0 & 1 & 0 \\ 1 & 0 & 0 & 0 \\ 1 & 1 & 0 & 0 \end{bmatrix} \begin{bmatrix} I1 \\ I2 \\ I3 \\ I4 \end{bmatrix} = Z \begin{bmatrix} I1 \\ I2 \\ I3 \\ I4 \end{bmatrix} \quad (29)$$

FIG. 21 and FIG. 22 show an operation state in which the Duty command D1* is greater than 200/3%, the Duty commands D2* and D3* are greater than 100/3% and less than 200/3%, and the Duty command D4* is less than 100/3%, as in FIG. 18 and FIG. 19 shown above. However, although an inverse matrix cannot be derived for the matrix Z in Expression (27) corresponding to FIG. 18 and FIG. 19, the determinant of the matrix Z in Expression (29) corresponding to FIG. 21 and FIG. 22 is −1 and therefore the inverse matrix can be derived.

Thus, it is found that, in the setting example 2 in FIG. 21 to FIG. 23, by combining the setting for the two-phase configuration shown in the representative configuration 1 and the setting for the three-phase configuration shown in the representative configuration 2, it is possible to cope with the condition in which the current estimation unit 2 could not perform effective estimation in the setting example 1 in FIG. 18 to FIG. 20.

In the representative configuration 3, the setting example 1 and the setting example 2 have shown the characteristics difference through changing of the phase relationship among the carriers. The shape of the triangular wave carriers may be changed from a symmetric triangular wave of which the rising slope and the falling slope are the same, to a deformed triangular wave of which the slopes are made different, whereby the arm ON/OFF state corresponding to the Duty command at the detection timing may be changed. For example, the deformed triangular wave may be configured such that, in the triangular wave carriers fc1 to fc4 shown in FIG. 18, FIG. 19 and FIG. 21, FIG. 22, the positions of the maximum values are fixed and the positions of the minimum values are advanced or delayed by 120 degrees.

Thus, regarding the power conversion device 105 using the four-input four-phase converter as the representative configuration 3 of the power conversion device in embodiment 1, the method for estimating the phase currents (I1 to I4) from the common DC bus current Ibus has been described.

Next, derived examples of the representative configurations 1 to 3 will be described.

Figure 24:
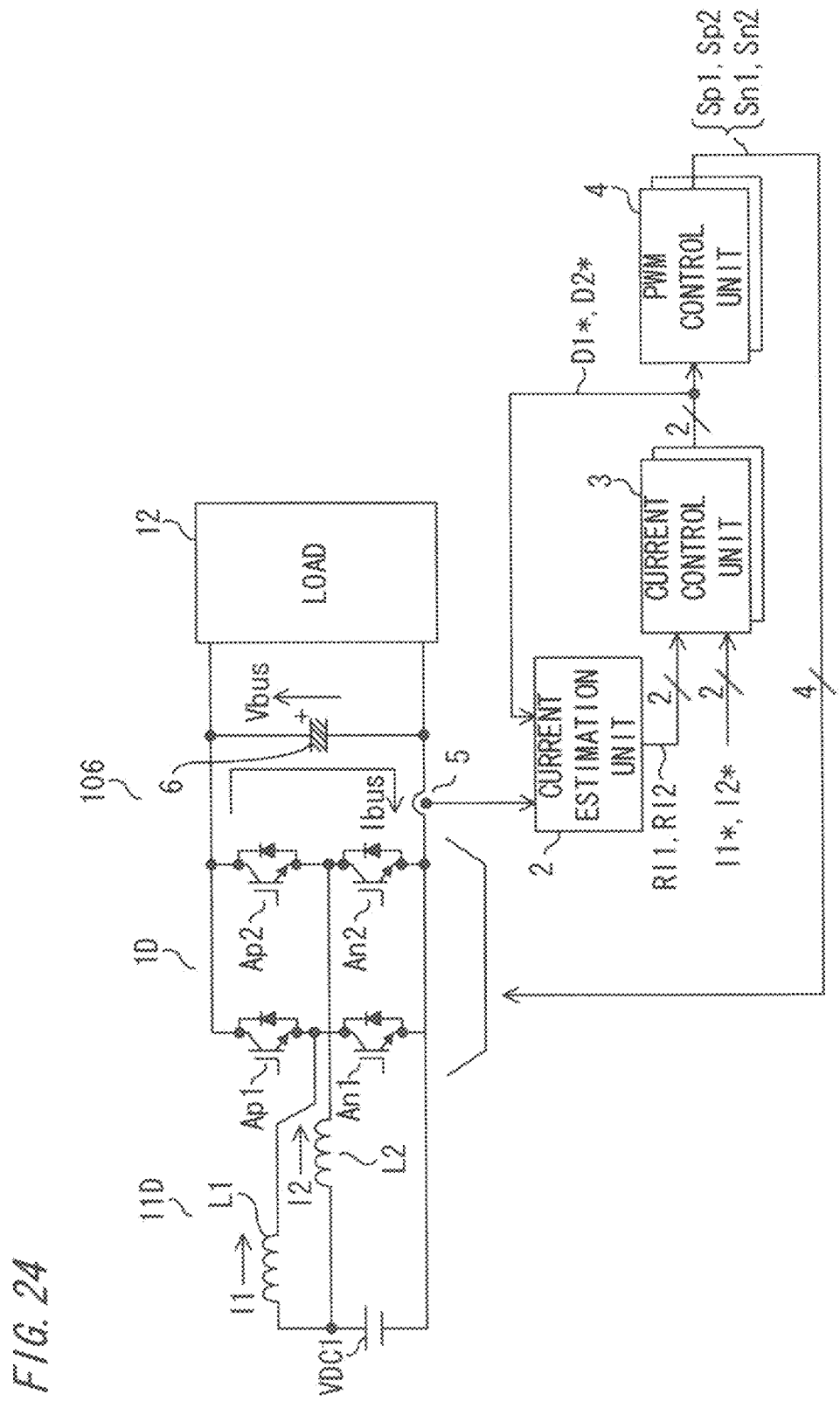
FIG. 24 is a configuration diagram showing a derived example of the representative configuration 1 of the power conversion device according to embodiment 1.

FIG. 24 shows a one-input two-phase converter in a derived example of the representative configuration 1.

For discrimination from the configurations in FIG. 1, etc., the power conversion device is denoted by 106. In addition, the power conversion unit is denoted by 1D and the input power supply unit is denoted by 11D.

The input power supply unit 11D of the power conversion device 106 includes reactors L1, L2 and a DC power supply VDC1, and forms a one-input two-phase converter together with the power conversion unit 1D.

The power conversion device 106 has a two-phase configuration, and therefore includes two current control units 3 and two PWM control units 4.

The current estimation unit 2 estimates phase currents (RI1, RI2) from the common DC bus current Ibus detected by the current detector 5 and Duty commands (D1*, D2*) generated by the current control units 3, and outputs the estimated phase currents to the current control units 3.

The current control units 3 generate Duty commands (D1*, D2*) for controlling the respective phase currents, using the estimated phase currents (RI1, RI2) and the target values (I1*, I2*) for the phase currents.

The PWM control units 4 generate ON/OFF signals (Sp1, Sp2 and Sn1, Sn2) for controlling the upper and lower arms (Ap1, Ap2 and An1, An2) of the respective legs of the power conversion unit 1D, from the Duty commands (D1*, D2*) generated by the current control units 3.

Figure 25:
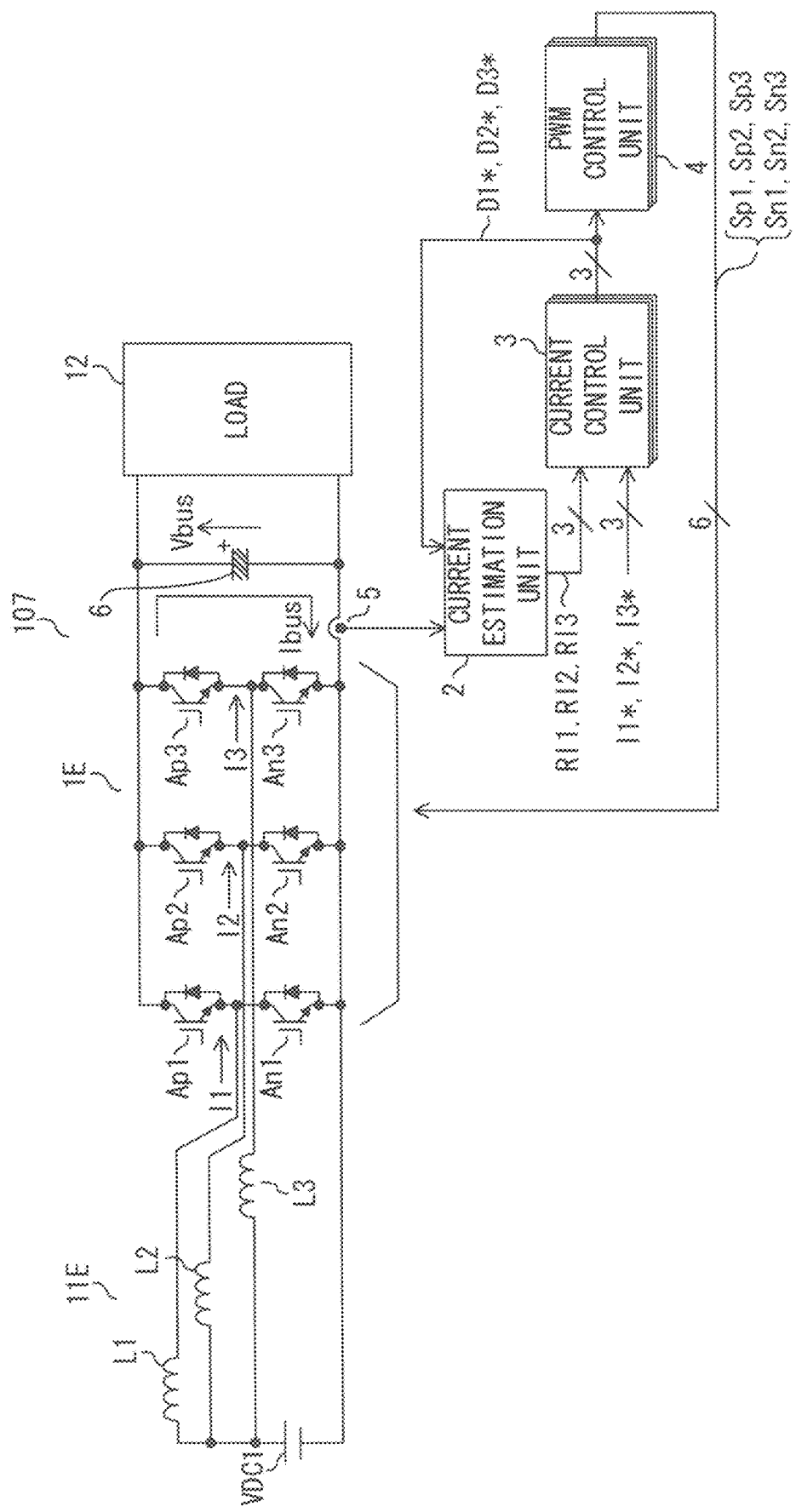
FIG. 25 is a configuration diagram showing a derived example 1 of the representative configuration 2 of the power conversion device according to embodiment 1.

FIG. 25 shows a one-input three-phase converter in a derived example 1 of the representative configuration 2.

For discrimination from the configurations in FIG. 1, etc., the power conversion device is denoted by 107. In addition, the power conversion unit is denoted by 1E and the input power supply unit is denoted by 11E.

The input power supply unit 11E of the power conversion device 107 includes reactors L1, L2, L3 and a DC power supply VDC1, and forms a one-input three-phase converter together with the power conversion unit 1E.

The power conversion device 107 has a three-phase configuration, and therefore includes three current control units 3 and three PWM control units 4.

The current estimation unit 2 estimates phase currents (RI1, RI2, RI3) from the common DC bus current Ibus detected by the current detector 5 and Duty commands (D1*, D2*, D3*) generated by the current control units 3, and outputs the estimated phase currents to the current control units 3.

The current control units 3 generate Duty commands (D1*, D2*, D3*) for controlling the respective phase currents, using the estimated phase currents (RI1, RI2, RI3) and the target values (I1*, I2*, I3*) for the phase currents.

The PWM control units 4 generate ON/OFF signals (Sp1, Sp2, Sp3 and Sn1, Sn2, Sn3) for controlling the upper and lower arms (Ap1, Ap2, Ap3 and An1, An2, An3) of the respective legs of the power conversion unit 1E, from the Duty commands (D1*, D2*, D3*) generated by the current control units 3.

Figure 26:
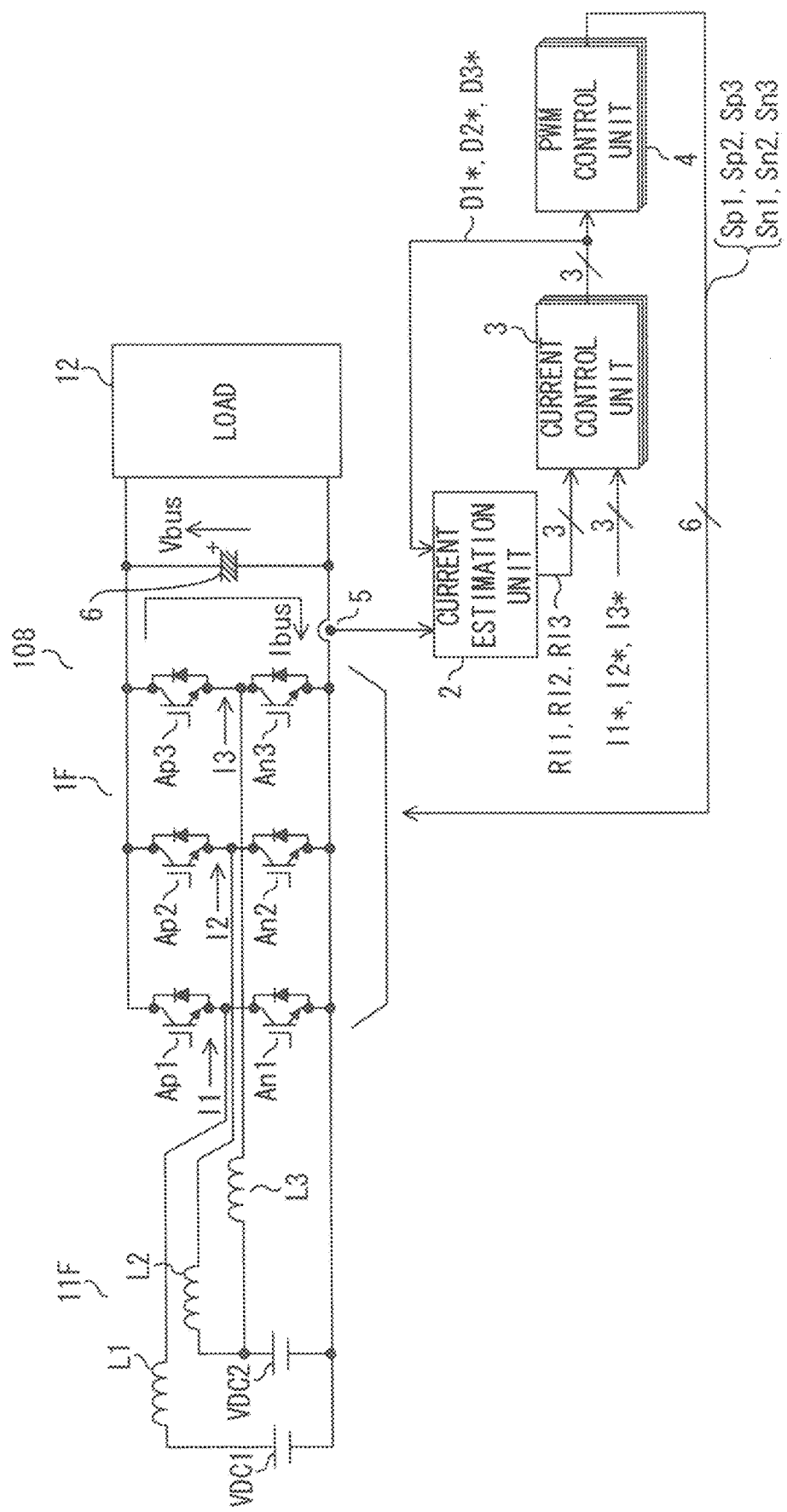
FIG. 26 is a configuration diagram showing a derived example 2 of the representative configuration 2 of the power conversion device according to embodiment 1.

FIG. 26 shows a two-input three-phase converter in a derived example 2 of the representative configuration 2.

For discrimination from the configurations in FIG. 1, etc., the power conversion device is denoted by 108. In addition, the power conversion unit is denoted by 1F and the input power supply unit is denoted by 11F.

The input power supply unit 11F of the power conversion device 108 includes reactors L1, L2, L3 and DC power supplies VDC1, VDC2, and forms a two-input three-phase converter together with the power conversion unit 1F.

The power conversion device 108 has a three-phase configuration, and therefore includes three current control units 3 and three PWM control units 4.

The current estimation units 2 estimate phase currents (RI1, RI2, RI3) from the common DC bus current Ibus detected by the current detector 5 and Duty commands (D1*, D2*, D3*) generated by the current control unit 3, and outputs the estimated phase currents to the current control units 3.

The current control units 3 generate Duty commands (D1*, D2*, D3*) for controlling the respective phase currents, using the estimated phase currents (RI1, RI2, RI3) and the target values (I1*, I2*, I3*) for the phase currents.

The PWM control units 4 generate ON/OFF signals (Sp1, Sp2, Sp3 and Sn1, Sn2, Sn3) for controlling the upper and lower arms (Ap1, Ap2, Ap3 and An1, An2, An3) of the respective legs of the power conversion unit 1F, from the Duty commands (D1*, D2*, D3*) generated by the current control units 3.

Figure 27:
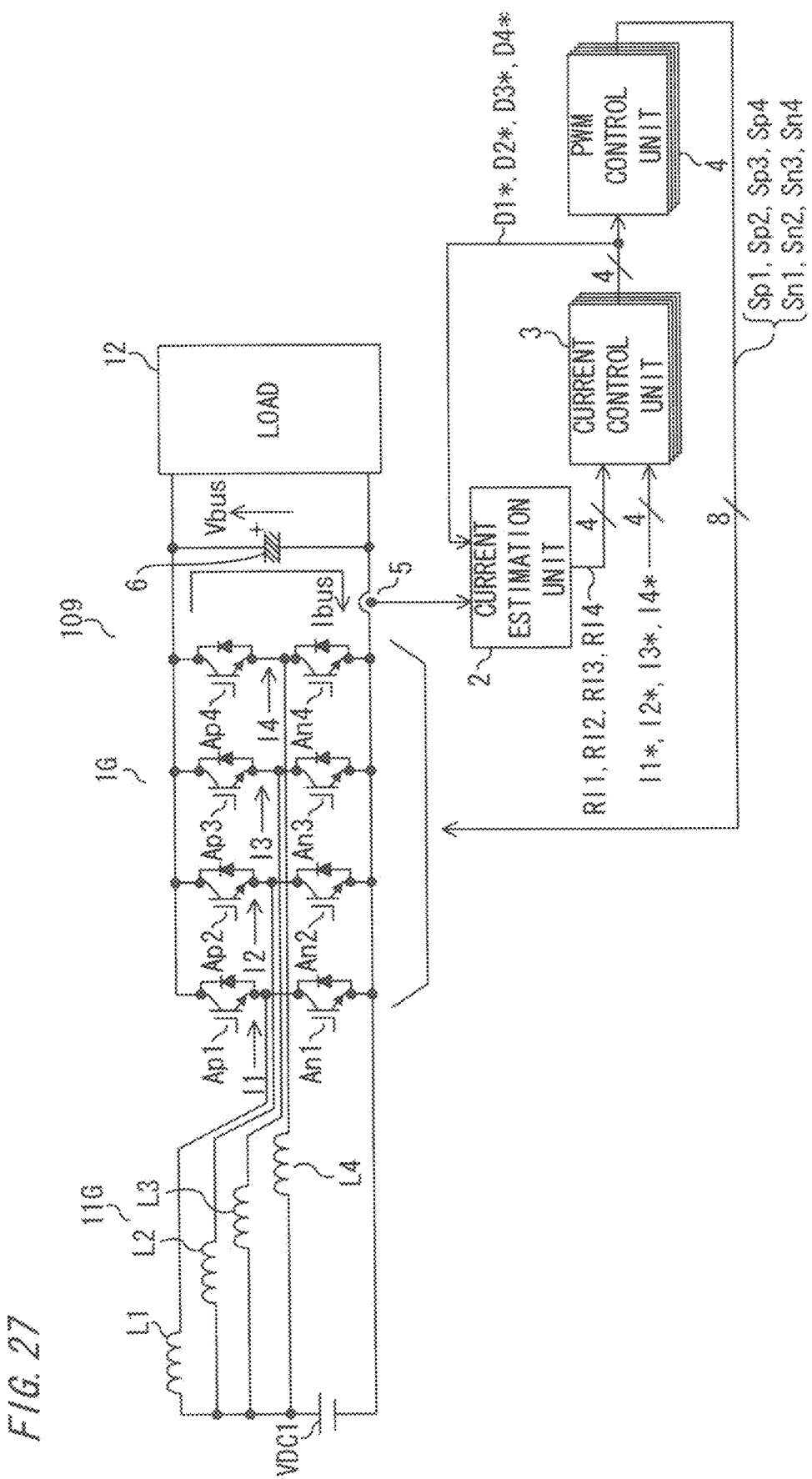
FIG. 27 is a configuration diagram showing a derived example 1 of the representative configuration 3 of the power conversion device according to embodiment 1.

FIG. 27 shows a one-input four-phase converter in a derived example 1 of the representative configuration 3.

For discrimination from the configurations in FIG. 1, etc., the power conversion device is denoted by 109. In addition, the power conversion unit is denoted by 1G and the input power supply unit is denoted by 11G.

The input power supply unit 11G of the power conversion device 109 includes reactors L1, L2, L3, L4 and a DC power supply VDC1, and forms a one-input four-phase converter together with the power conversion unit 1G.

The power conversion device 109 has a four-phase configuration, and therefore includes four current control units 3 and four PWM control units 4.

The current estimation unit 2 estimates phase currents (RI1, RI2, RI3, RI4) from the common DC bus current Ibus detected by the current detector 5 and Duty commands (D1*, D2*, D3*, D4*) generated by the current control units 3, and outputs the estimated phase currents to the current control units 3.

The current control units 3 generate Duty commands (D1*, D2*, D3*, D4*) for controlling the respective phase currents, using the estimated phase currents (RI1, RI2, RI3, RI4) and the target values (I1*, I2*, I3*, I4*) for the phase currents.

The PWM control units 4 generate ON/OFF signals (Sp1, Sp2, Sp3, Sp4 and Sn1, Sn2, Sn3, Sn4) for controlling the upper and lower arms (Ap1, Ap2, Ap3, Ap4 and An1, An2, An3, An4) of the respective legs of the power conversion unit 1G, from the Duty commands (D1*, D2*, D3*, D4*) generated by the current control units 3.

Figure 28:
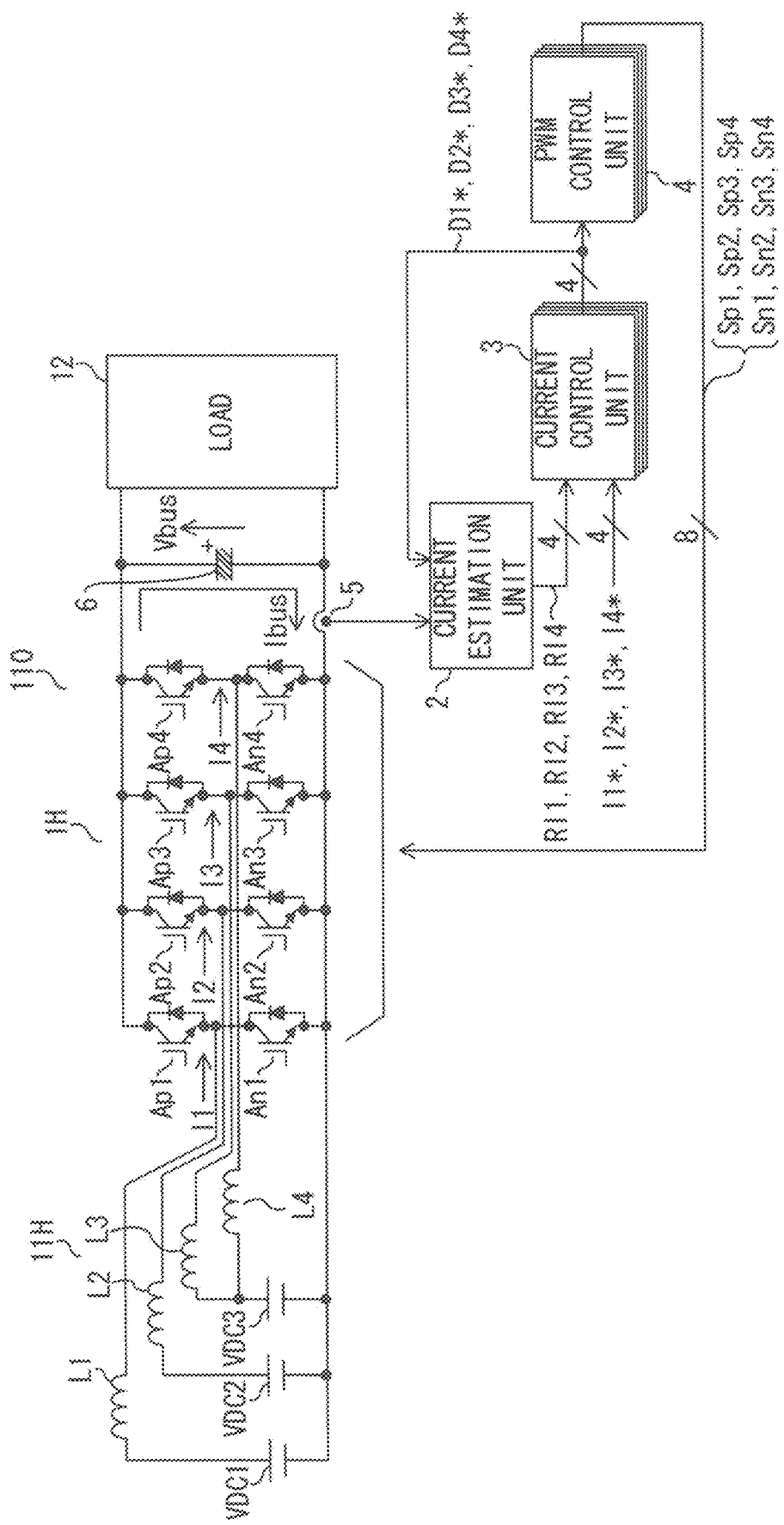
FIG. 28 is a configuration diagram showing a derived example 2 of the representative configuration 3 of the power conversion device according to embodiment 1.

FIG. 28 shows a three-input four-phase converter in a derived example 2 of the representative configuration 3.

For discrimination from the configurations in FIG. 1, etc., the power conversion device is denoted by 110. In addition, the power conversion unit is denoted by 1H and the input power supply unit is denoted by 11H.

The input power supply unit 11H of the power conversion device 110 includes reactors L1, L2, L3, L4 and DC power supplies VDC1, VDC2, VDC3, and forms a three-input four-phase converter together with the power conversion unit 1H.

The power conversion device 110 has a four-phase configuration, and therefore includes four current control units 3 and four PWM control units 4.

The current estimation unit 2 estimates phase currents (RI1, RI2, RI3, RI4) from the common DC bus current Ibus detected by the current detector 5 and Duty commands (D1*, D2*, D3*, D4*) generated by the current control units 3, and outputs the estimated phase currents to the current control units 3.

The current control units 3 generate Duty commands (D1*, D2*, D3*, D4*) for controlling the respective phase currents, using the estimated phase currents (RI1, RI2, RI3, RI4) and the target values (I1*, I2*, I3*, I4*) for the phase currents.

The PWM control units 4 generate ON/OFF signals (Sp1, Sp2, Sp3, Sp4 and Sn1, Sn2, Sn3, Sn4) for controlling the upper and lower arms (Ap1, Ap2, Ap3, Ap4 and An1, An2, An3, An4) of the respective legs of the power conversion unit 1H, from the Duty commands (D1*, D2*, D3*, D4*) generated by the current control unit 3.

Next, representative configurations 4 to 6 of embodiment 1 will be sequentially described. The representative configurations 1 to 3 are directed to converters, whereas the representative configurations 4 to 6 are directed to inverters. Here, the converter refers to a power conversion device in which the voltage of the common DC bus and the voltages connected to the respective phases are DC voltages, and the inverter refers to a power conversion device in which the voltage of the common DC bus is DC voltage and the voltages connected to the respective phases are AC voltages.

The configuration and the function/operation in the representative configuration 4 (single-phase two-line inverter) of the power conversion device in embodiment 1 will be described with reference to FIG. 29 to FIG. 32.

Figure 29:
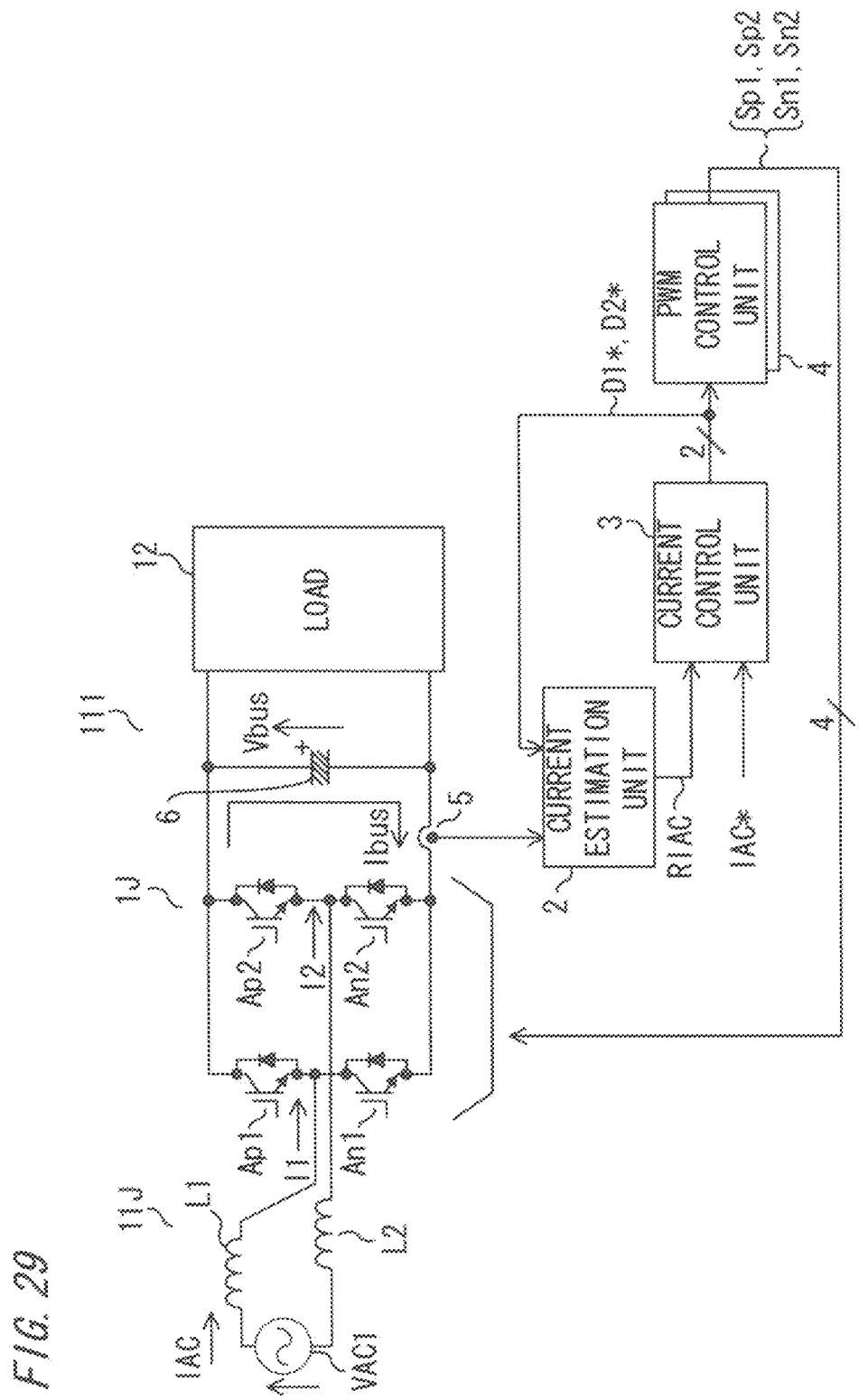
FIG. 29 is a configuration diagram showing a representative configuration 4 (single-phase two-line inverter) of the power conversion device according to embodiment 1.

In FIG. 29, for discrimination from the configurations in FIG. 1, etc., the power conversion device is denoted by 111. In addition, the power conversion unit is denoted by 1J and the input power supply unit is denoted by 11J. A smoothing capacitor 6 is provided to the common DC buses connecting the power conversion unit 1J and the load 12.

The input power supply unit 11J of the power conversion device 111 includes reactors L1, L2 and an AC power supply VAC1, and forms a single-phase two-line inverter together with the power conversion unit 1J.

The power conversion device 111 includes one current control unit 3 and two PWM control units 4.

Current flowing through the reactor L1 corresponds to the phase current I1, and current flowing through the reactor L2 corresponds to the phase current I2.

The current estimation unit 2 estimates phase current (RIAC) from the common DC bus current Ibus detected by the current detector 5 and Duty commands (D1*, D2*) generated by the current control unit 3, and outputs the estimated phase current to the current control unit 3.

The current control unit 3 generates the Duty commands (D1*, D2*) for controlling the respective phase currents, using the estimated phase current (RIAC) and the target value (IAC*) for each phase current.

The PWM control units 4 generate ON/OFF signals (Sp1, Sp2 and Sn1, Sn2) for controlling the upper and lower arms (Ap1, Ap2 and An1, An2) of the respective legs of the power conversion unit 1A, from the Duty commands (D1*, D2*) generated by the current control unit 3.

The number of the PWM control units 4 may be decreased to one by adopting such a configuration that the ON/OFF state of the upper arm (e.g., Ap1) of one of the two legs and the ON/OFF state of the lower arm (An2) of the other leg coincide with each other and similarly the ON/OFF state of the lower arm (An1) of the one leg and the ON/OFF state of the upper arm (Ap2) of the other leg coincide with each other. In the following description, the case of adopting a configuration including two PWM control units 4 will be described.

FIG. 30 and FIG. 31 show a setting example 1 for the triangular wave carriers for the respective phases, the ON/OFF states of the high-voltage-side upper arms Ap1 and Ap2, the phase currents (I1, I2), and the detection timings for the common DC bus current Ibus in the representative configuration 4 (power conversion device 111).

Specifically, FIG. 30 illustrates the relationship among the triangular wave carriers (fc1, fc2), the ON/OFF states of the high-voltage-side upper arms Ap1, Ap2, the phase currents (I1, I2), the common DC bus current Ibus, and the detected currents (Isp1, Isp2).

Figures 31A, 31B:
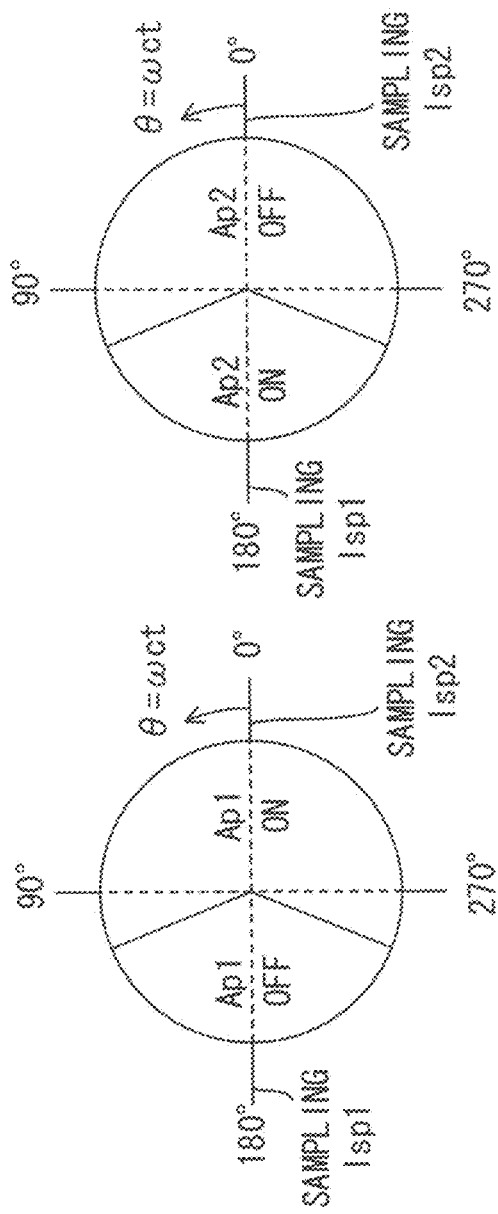
FIG. 31A illustrates the setting example 1 for triangular wave carriers and current detection timings in the representative configuration 4 of the power conversion device according to embodiment 1.
FIG. 31B illustrates the setting example 1 for triangular wave carriers and current detection timings in the representative configuration 4 of the power conversion device according to embodiment 1.

FIG. 31A illustrates the ON/OFF state of the upper arm Ap1 and the detection timings for the common DC bus current Ibus (i.e., detection timings for Isp1, Isp2), using a phase.

Here, the triangular wave carrier fc1 is represented by fc1=(K/π)·|ωct| in a range where the time function t is not less than −π/ωc and not greater than π/ωc.

FIG. 31B illustrates the ON/OFF state of the upper arm Ap2 and the detection timings for the common DC bus current Ibus (i.e., detection timings for Isp1, Isp2), using a phase.

Here, the triangular wave carrier fc2 is represented by fc2=(K/π)·|ωct+π| in a range where the time function t is not less than −2π/ωc and not greater than 0.

Here, with one cycle of the triangular wave carrier (fc1, fc2) defined as 360 degrees, the relationship between the ON/OFF states of the high-voltage-side upper arms Ap1 and Ap2 corresponding to the Duty commands, and the detection timings for the common DC bus current Ibus, can be extracted. Thus, it is possible to find, in advance, a condition in which sampling error is likely to occur due to overlap between the arm ON/OFF switching timing and the detection timing for the common DC bus current Ibus.

In FIG. 30 and FIG. 31, it can be said that, for both of the two phases, sampling error is likely to occur when the Duty command is 0% and 100%.

Figure 32:
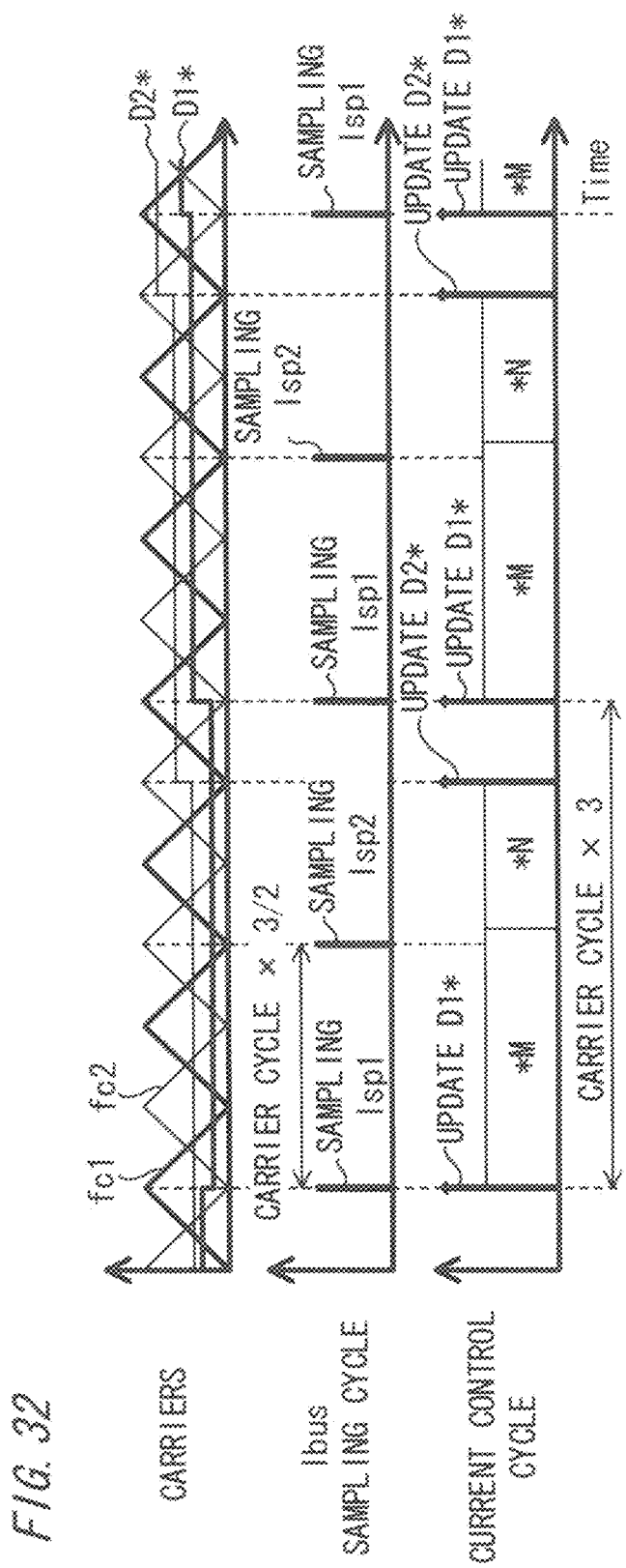
FIG. 32 illustrates the setting example 1 for a carrier cycle, a sampling cycle, phase current estimation, and a Duty command update cycle that enable estimation for each phase current in the representative configuration 4 of the power conversion device according to embodiment 1.

FIG. 32 shows the setting example 1 for a Duty command update cycle that enables estimation for each phase current, corresponding to FIG. 30 and FIG. 31, in the representative configuration 4 (power conversion device 111). Specifically, FIG. 32 shows the setting example 1 for the carrier cycle, the sampling cycle, phase current estimation, and the Duty command update cycle that enable estimation for each phase current.

In FIG. 32, *M represents "perform current detection (Isp1, Isp2) and estimate phase currents", and *N represents "current control".

Here, the carrier phase difference between the phases is set to 180 degrees, the detection timing cycle for the common DC bus current Ibus is set to 1.5 times the carrier cycle, and the cycle of current control and update for the Duty command is set to 3.0 times the carrier cycle, which is the least common multiple of the carrier cycle and the current detection timing cycle.

In a condition in which the Duty command is 0% and a condition in which the Duty command is 100%, the common DC bus current detection timing and the arm ON/OFF timing overlap each other, so that detection error is likely to occur in detection for the common DC bus current Ibus. However, it is not general to perform operations with a Duty command of 0% and a Duty command of 100%, and therefore it will be described that the phase currents can be estimated from the common DC bus current Ibus over almost the entire region.

In the setting example 1 in FIG. 30, FIG. 31, and FIG. 32, the relationship between the phase currents and the common DC bus current Ibus can be represented by Expressions (4) to (6), as in the setting example 1 for the two-input two-phase converter shown in the representative configuration 1.

Here, in the representative configuration 4, unlike the representative configuration 1, the reverse polarity current of the phase current I1 is the phase current I2, and therefore the current estimation unit 2 can select, as an estimated value for IAC, an estimated value of I1, −1 times an estimated value of I2, a value obtained by multiplying the difference between an estimated value of I1 and an estimated value of I2 by 0.5, or the like. Thus, the representative configuration 4 can be treated equally to the representative configuration 1.

In the above description, a setting example corresponding to the setting example 1 in the representative configuration 1 has been described. However, a setting example corresponding to the setting example 2 in the representative configuration 1 can also be configured in the same manner.

Thus, regarding the power conversion device 111 using a single-phase two-line inverter as the representative configuration 4 of the power conversion device in embodiment 1, the method for estimating the AC current, i.e., the phase currents (I1, I2) from the common DC bus current Ibus, has been described.

The configuration and the function/operation in a representative configuration 5 (single-phase three-line inverter) of the power conversion device in embodiment 1 will be described with reference to FIG. 33 to FIG. 36.

Figure 33:
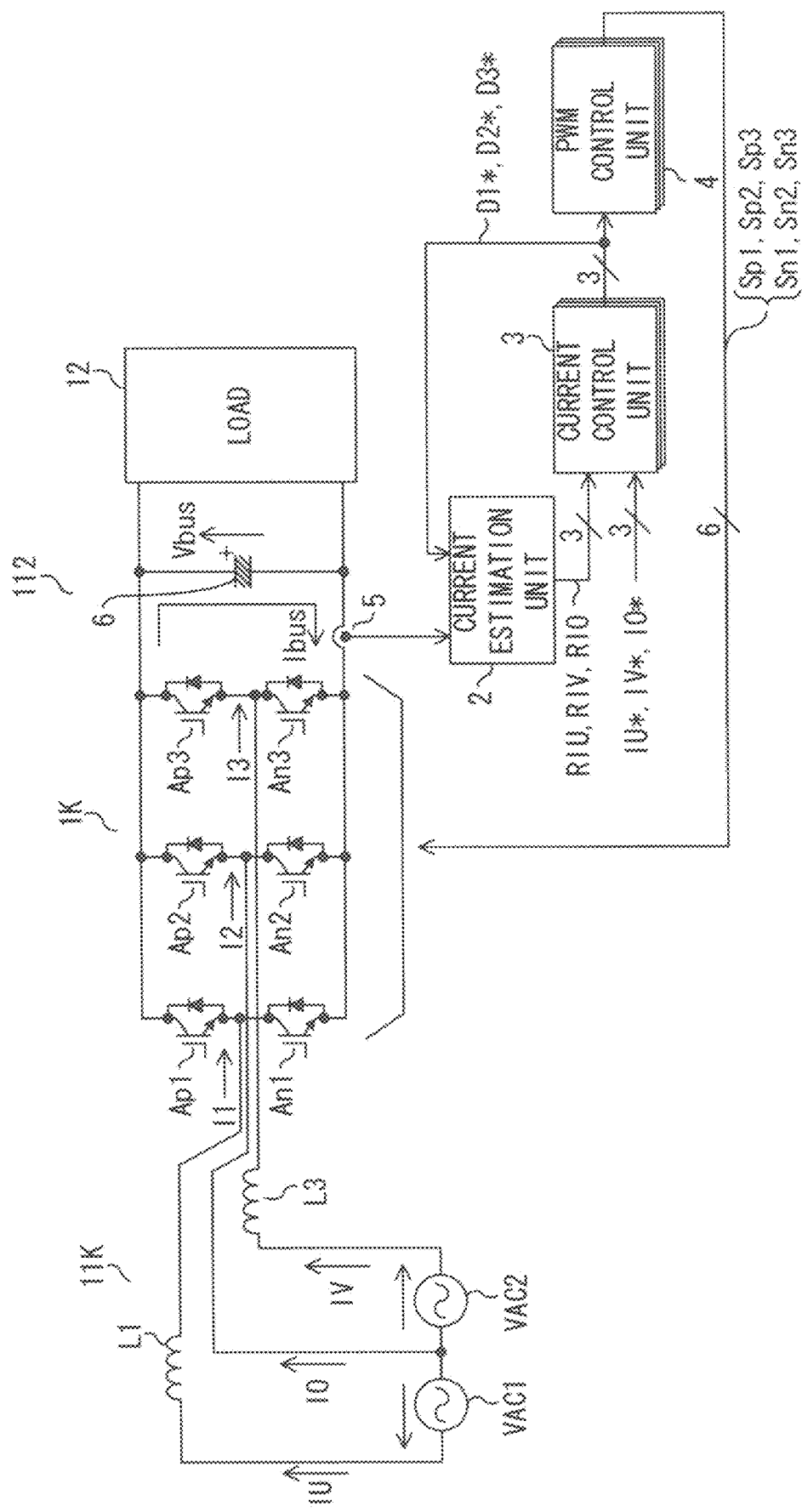
FIG. 33 is a configuration diagram showing a representative configuration 5 (single-phase three-line inverter) of the power conversion device according to embodiment 1.

In FIG. 33, for discrimination from the configurations in FIG. 1, etc., the power conversion device is denoted by 112. In addition, the power conversion unit is denoted by 1K and the input power supply unit is denoted by 11K. A smoothing capacitor 6 is provided to the common DC buses connecting the power conversion unit 1K and the load 12.

The input power supply unit 11K of the power conversion device 112 includes reactors L1, L3 and AC power supplies VAC1, VAC2, and forms a single-phase three-line inverter together with the power conversion unit 1K.

The power conversion device 112 includes three current control units 3 and three PWM control units 4.

AC current (corresponding to phase current I1) flowing through the reactor L1 is denoted by IU, AC current (corresponding to phase current I3) flowing through the reactor L3 is denoted by IV, and AC current (corresponding to phase current I2) flowing through the neutral line is denoted by IO.

The current estimation unit 2 estimates phase currents (RIU, RIV, RIO) from the common DC bus current Ibus detected by the current detector 5 and Duty commands (D1*, D2*, D3*) generated by the current control units 3, and outputs the estimated phase currents to the current control units 3.

The current control units 3 generate Duty commands (D1*, D2*, D3*) for controlling the respective phase currents, using the estimated phase currents (RIU, RIV, RIO) and the target values (IU*, IV*, IO*) for the phase currents.

The PWM control units 4 generate ON/OFF signals (Sp1, Sp2, Sp3 and Sn1, Sn2, Sn3) for controlling the upper and lower arms (Ap1, Ap2, Ap3 and An1, An2, An3) of the legs of the power conversion unit 1K, from the Duty commands (D1*, D2*, D3*) generated by the current control units 3.

FIG. 34 and FIG. 35 show the setting example 1 for triangular wave carriers for the respective phases, the ON/OFF states of the high-voltage-side upper arms Ap1, Ap2, Ap3, the phase currents (I1, I2, I3), and the detection timings for the common DC bus current Ibus in the representative configuration 5 (power conversion device 112).

Specifically, FIG. 34A illustrates the relationship among the triangular wave carriers (fc1, fc2, fc3), the ON/OFF states of the high-voltage-side upper arms Ap1, Ap2, Ap3, the phase currents (I1, I2, I3), the common DC bus current Ibus, and the detected currents (Isp1, Isp2, Isp3, Isp4, Isp5, Isp6).

FIG. 34B illustrates the ON/OFF state of the upper arm Ap1 and the detection timings for the common DC bus current Ibus (i.e., detection timings for Isp1 to Isp6), using a phase.

Here, the triangular wave carrier fc1 is represented by fc1=$(K/\pi) \cdot |\omega c t|$ in a range where the time function t is not less than $-\pi/\omega c$ and not greater than $\pi/\omega c$.

Figure 35A:
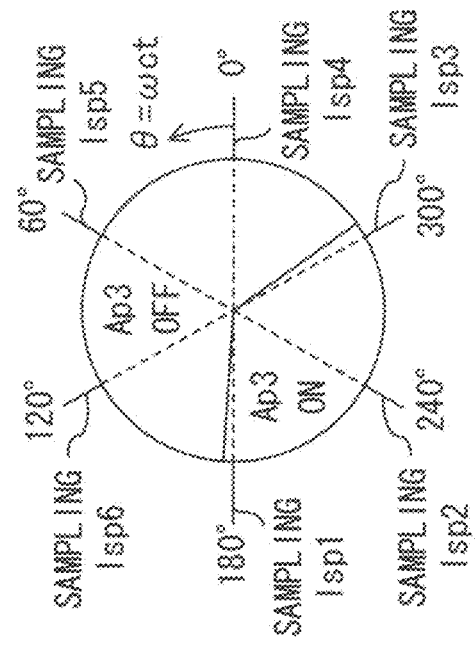
FIG. 35A illustrates the setting example 1 for triangular wave carriers and current detection timings in the representative configuration 5 of the power conversion device according to embodiment 1.

FIG. 35A illustrates the ON/OFF state of the upper arm Ap2 and the detection timings for the common DC bus current Ibus (i.e., detection timings for Isp1 to Isp6), using a phase.

Here, the triangular wave carrier fc2 is represented by fc2=$(K/\pi) \cdot |\omega c t - (2\pi/3)|$ in a range where the time function t is not less than $-(1/3)\pi/\omega c$ and not greater than $(5/3)\pi/\omega c$.

Figure 35B:
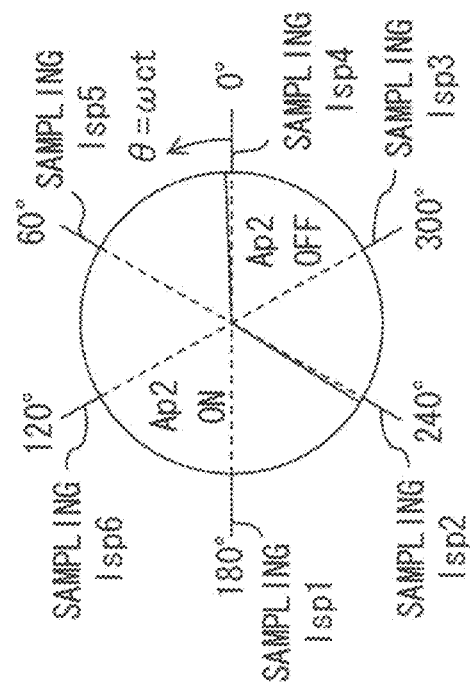
FIG. 35B illustrates the setting example 1 for triangular wave carriers and current detection timings in the representative configuration 5 of the power conversion device according to embodiment 1.

FIG. 35B illustrates the ON/OFF state of the upper arm Ap3 and the detection timings for the common DC bus current Ibus (i.e., detection timings for Isp1 to Isp6), using a phase.

Here, the triangular wave carrier fc3 is represented by fc3=$(K/\pi) \cdot |\omega c t + (2\pi/3)|$ in a range where the time function t is not less than $-(5/3)\pi/\omega c$ and not greater than $(1/3)\pi/\omega c$.

Here, with one cycle of the triangular wave carriers (fc1, fc2, fc3) defined as 360 degrees, the relationship between the ON/OFF states of the high-voltage-side upper arms Ap1, Ap2, Ap3 corresponding to the Duty commands, and the detection timings for the common DC bus current Ibus, can be extracted. Thus, it is possible to find, in advance, a condition in which sampling error is likely to occur due to overlap between the arm ON/OFF switching timing and the detection timing for the common DC bus current Ibus.

In FIG. 34 and FIG. 35, it can be said that, for all of the three phases, sampling error is likely to occur when the Duty command is 0%, 100/3%, 200/3%, and 100%.

Figure 36:
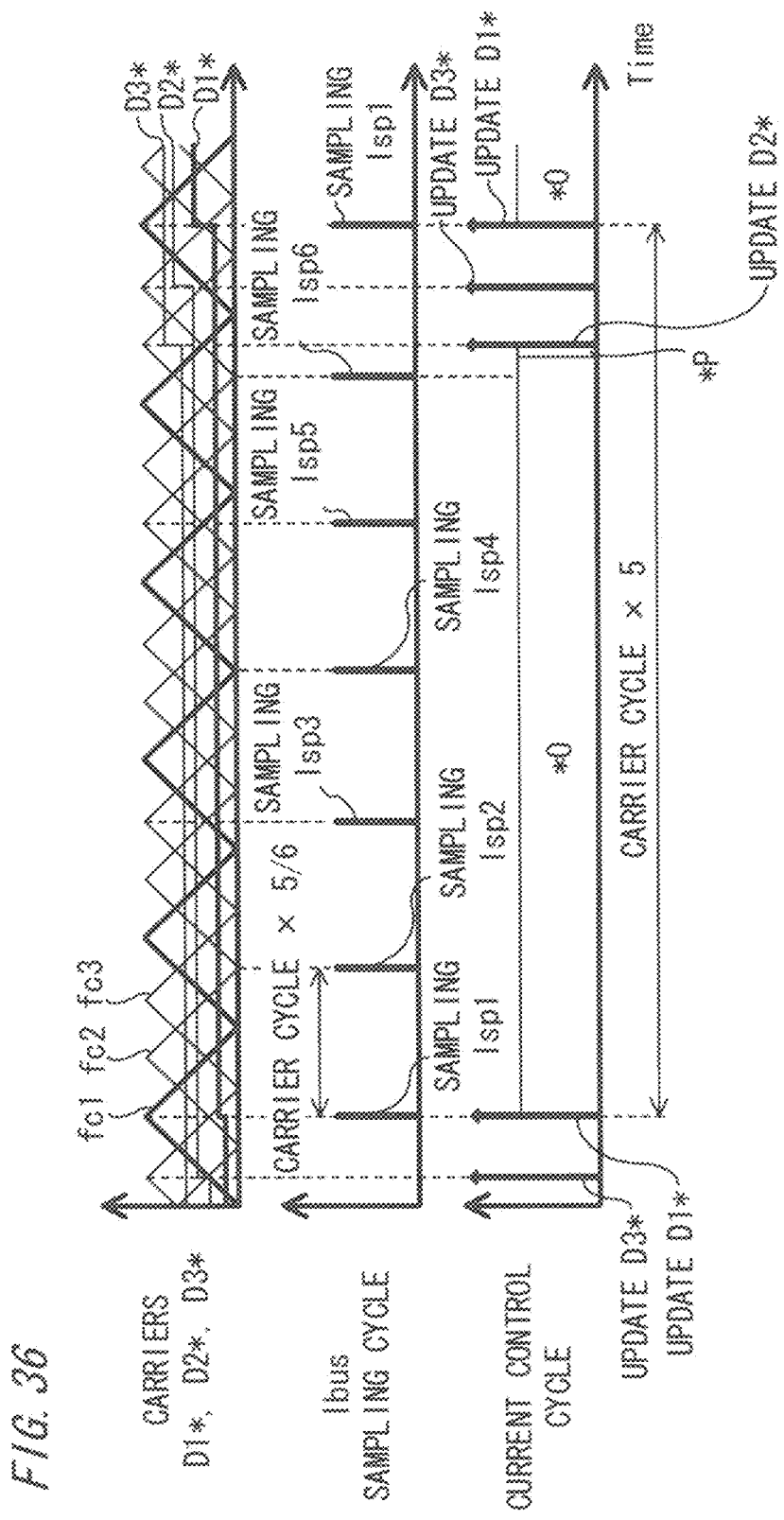
FIG. 36 illustrates the setting example 1 for a carrier cycle, a sampling cycle, phase current estimation, and a Duty command update cycle that enable estimation for each phase current in the representative configuration 5 of the power conversion device according to embodiment 1.

FIG. 36 shows the setting example 1 for a Duty command update cycle that enables estimation for each phase current, corresponding to FIG. 34 and FIG. 35, in the representative configuration 5 (power conversion device 112). Specifically, FIG. 36 shows the setting example 1 for the carrier cycle, the sampling cycle, phase current estimation, and the Duty command update cycle that enable estimation for each phase current.

In FIG. 36, *O represents "perform current detection (Isp1 to Isp6) and estimate phase currents", and *P represents "current control".

Here, the carrier phase difference among the phases is set to 120 degrees, the detection timing cycle for the common DC bus current Ibus is set to 5/6 times the carrier cycle, and the cycle of current control and update for the Duty command is set to 5.0 times the carrier cycle, which is the least common multiple of the carrier cycle and the current detection timing cycle.

In conditions in which the Duty command is 0%, 100/3%, 200/3%, and 100%, the common DC bus current detection timing and the arm ON/OFF timing overlap each other, so that detection error is likely to occur in detection for the common DC bus current Ibus. However, it will be described that the phase currents can be estimated from the common DC bus current Ibus in a condition in which the Duty command is greater than 0% and less than 100%.

In the setting example 1 in FIG. 34, FIG. 35, and FIG. 36, the relationship between the phase currents and the common DC bus current Ibus can be represented by Expression (18) to Expression (25), as in the setting example 1 for the three-input three-phase converter shown in the representative configuration 2.

Thus, the representative configuration 5 can be treated equally to the representative configuration 2.

In the above description, a setting example corresponding to the setting example 1 in the representative configuration 2 has been described. However, a setting example corresponding to the setting example 2 in the representative configuration 2 can also be configured in the same manner.

Thus, regarding the power conversion device 112 using a single-phase three-line inverter as the representative configuration 5 of the power conversion device in embodiment 1, the method for estimating the AC currents (IU, IV, IO), i.e., the phase currents (I1, I2, I3) from the common DC bus current Ibus, has been described.

The configuration and the function/operation in the representative configuration 6 (three-phase three-line inverter) of the power conversion device in embodiment 1 will be described with reference to FIG. 37 and FIG. 38. First, the configuration in FIG. 37 will be described.

For discrimination from the configurations in FIG. 1, etc., the power conversion device is denoted by 113. In addition, the power conversion unit is denoted by 1L and the input power supply unit is denoted by 11L. A smoothing capacitor 6 is provided to the common DC buses connecting the power conversion unit 1L and the load 12.

The input power supply unit 11L of the power conversion device 113 includes reactors L1, L2, L3 and AC power supplies VAC1, VAC2, VAC3, and forms a three-phase three-line inverter together with the power conversion unit 1L.

The power conversion device 113 includes three current control units 3 and three PWM control units 4.

AC current (corresponding to phase current I1) flowing through the reactor L1 is denoted by IU, AC current (corresponding to phase current I2) flowing through the reactor L2 is denoted by IV, and AC current (corresponding to phase current I3) flowing through the reactor L3 is denoted by IW.

The current estimation unit 2 estimates phase currents (RIU, RIV, RIO) from the common DC bus current Ibus detected by the current detector 5 and Duty commands (D1*, D2*, D3*) generated by the current control units 3, and outputs the estimated phase currents to the current control units 3.

The current control units 3 generate Duty commands (D1*, D2*, D3*) for controlling the respective phase currents, using the estimated phase currents (RIU, RIV, RIW) and the target values (IU*, IV*, IW*) for the phase currents.

The PWM control units 4 generate ON/OFF signals (Sp1, Sp2, Sp3 and Sn1, Sn2, Sn3) for controlling the upper and lower arms (Ap1, Ap2, Ap3 and An1, An2, An3) of the respective legs of the power conversion unit 1L, from the Duty commands (D1*, D2*, D3*) generated by the current control units 3.

Next, the configuration in FIG. 38 will be described.

For discrimination from the configurations in FIG. 1, etc., the power conversion device is denoted by 114. In addition, the power conversion unit is denoted by 1M and the input power supply unit is denoted by 11M.

Figure 37:
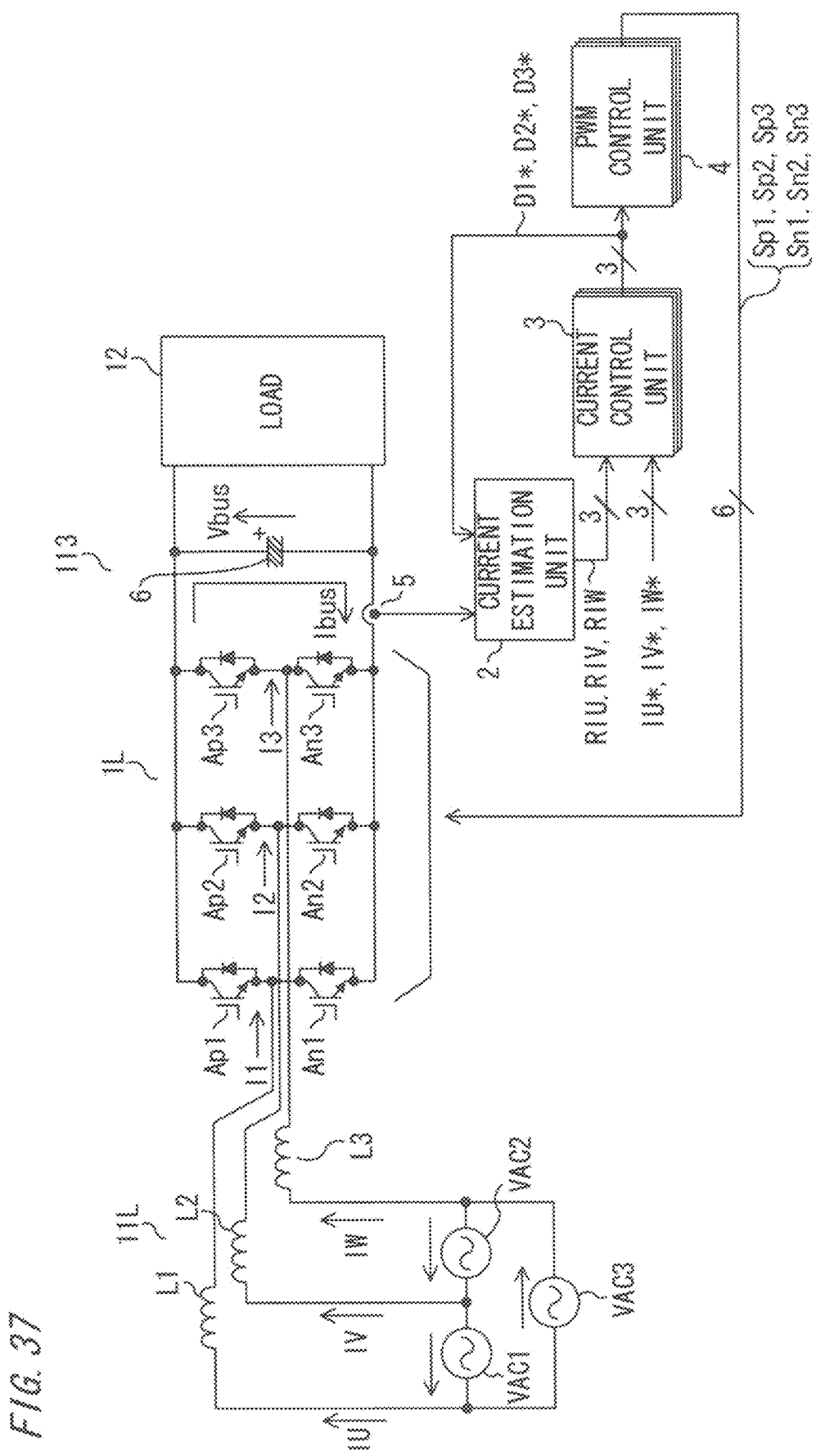
FIG. 37 is a configuration diagram showing a representative configuration 6 (three-phase three-line inverter) of the power conversion device according to embodiment 1.
Figure 38:
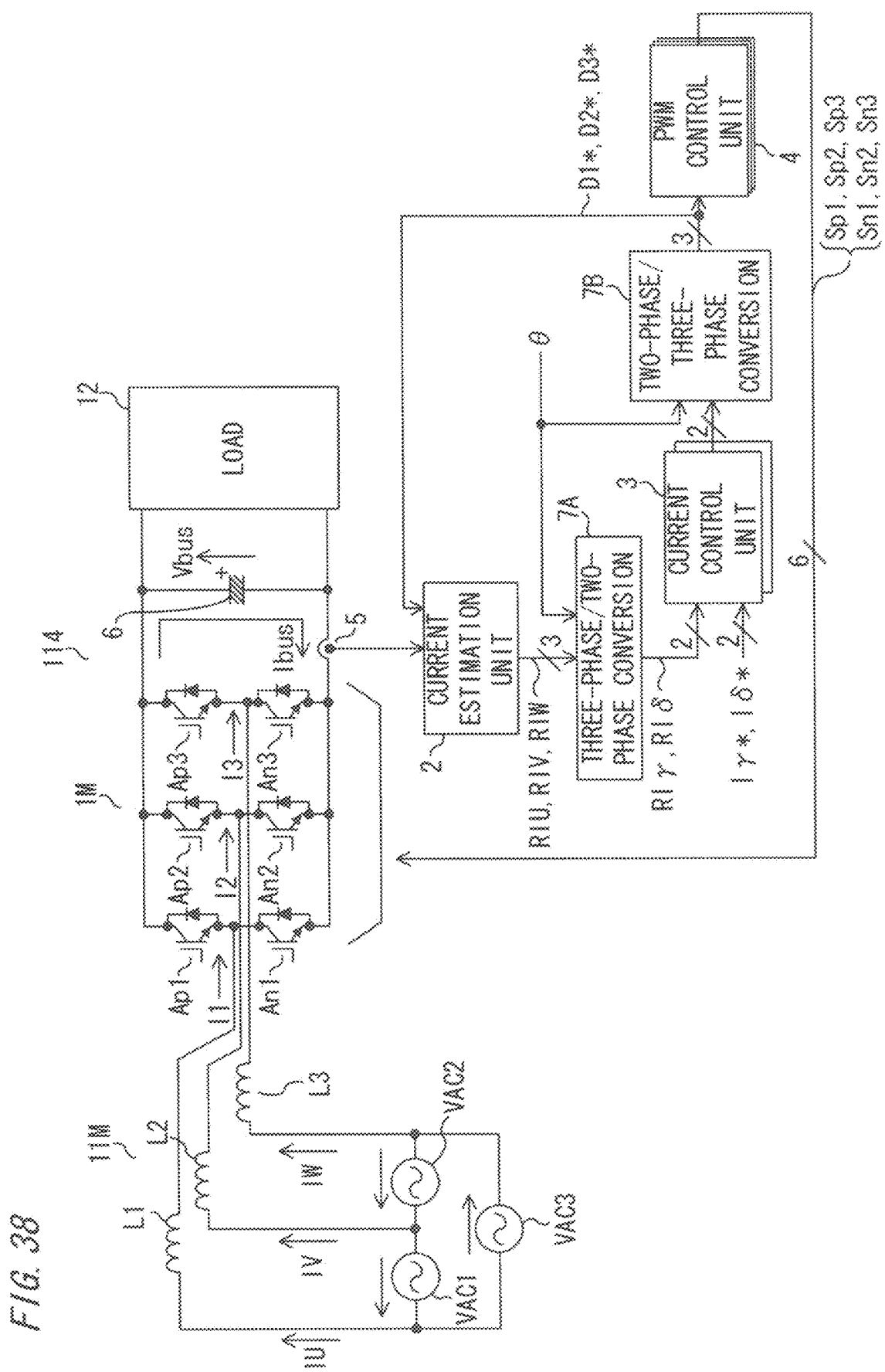
FIG. 38 is a configuration diagram showing a developed version of the representative configuration 6 (three-phase three-line inverter) of the power conversion device according to embodiment 1.

The configuration in FIG. 38 is the three-phase three-line inverter which is the same as FIG. 37, but is different from the power conversion device 113 in FIG. 37 in that a three-phase/two-phase converter 7A and a two-phase/three-phase converter 7B are provided.

In FIG. 38, target values (Iγ*, Iδ*) and estimated currents (RIγ, RIδ) converted into a two-phase coordinate system are inputted to the current control units 3, and accordingly, a phase θ is needed for three-phase/two-phase conversion and two-phase/three-phase conversion. Here, Iγ and Iδ are orthogonal-axis currents after rotational coordinate conversion.

The power conversion device 114 in FIG. 38 adopts a configuration of converting three-phase AC currents from a coordinate system at rest into a rotational coordinate system and does not control a zero-phase component, and therefore two current control units 3 and three PWM control units 4 are provided.

A method for converting three-phase AC currents from a coordinate system at rest into a rotational coordinate system is generally known, and therefore the description thereof is omitted.

The representative configuration 6 is the same as the representative configuration 5 except the AC power supply, and therefore the setting example shown in FIG. 34 to FIG. 36 in the representative configuration 5 can be applied.

Thus, regarding the power conversion devices 113, 114 using a three-phase three-line inverter as the representative configuration 6 of the power conversion device in embodiment 1, the method for estimating the AC currents (IU, IV, IW), i.e., the phase currents (I1, I2, I3) from the common DC bus current Ibus has been described.

Next, a derived example of the representative configurations 4 to 6 in embodiment 1 will be described focusing on the configuration thereof.

Figure 39:
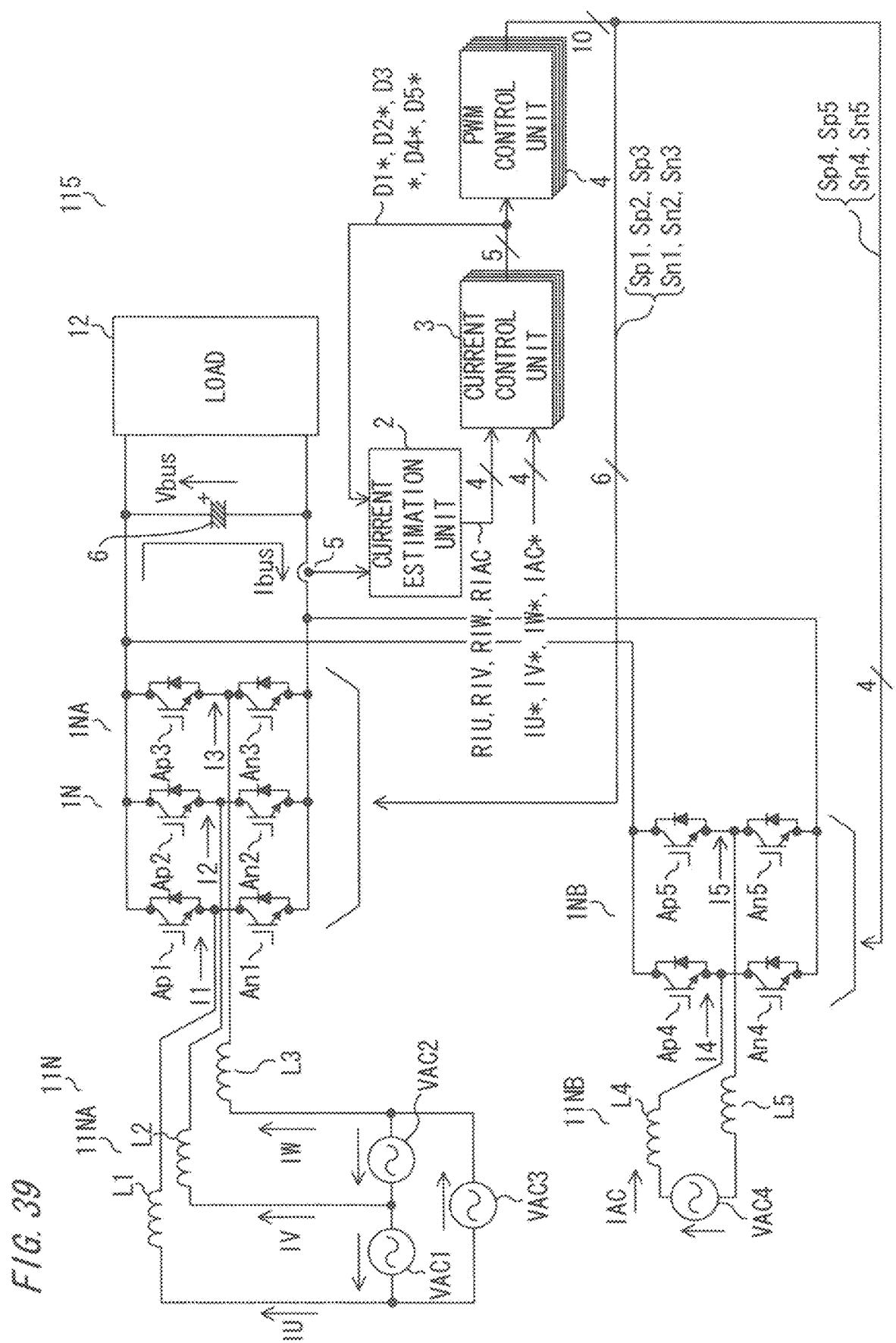
FIG. 39 is a configuration diagram showing a derived example of the representative configurations 4 to 6 of the power conversion device according to embodiment 1.

FIG. 39 shows a three-phase three-line inverter and a single-phase two-line inverter in the derived example of the representative configurations 4 to 6.

For discrimination from the configurations in FIG. 1, etc., the power conversion device is denoted by 115. In addition, the power conversion unit is denoted by 1N and the input power supply unit is denoted by 11N.

The power conversion unit 1N includes a power conversion unit 1NA and a power conversion unit 1NB. The input power supply unit 11N includes an input power supply unit 11NA and an input power supply unit 11NB.

Here, the input power supply unit 11NA includes reactors L1, L2, L3 and AC power supplies VAC1, VAC2, VAC3, and forms a three-phase three-line inverter together with the power conversion unit 1NA.

The input power supply unit 11NB includes reactors L4, L5 and an AC power supply VAC4, and forms a single-phase two-line inverter together with the power conversion unit 1NB.

The power conversion device 115 has a five-phase configuration as a whole, and therefore includes five current control units 3 and five PWM control units 4.

The current estimation unit 2 estimates phase currents (RIU, RIV, RIW, RIAC) from the common DC bus current Ibus detected by the current detector 5 and Duty commands (D1* to D5*) generated by the current control units 3, and outputs the estimated phase currents to the current control units 3. It is noted that the Duty command D5* is −D4*.

The current control units 3 generate Duty commands (D1* to D5*) for controlling the respective phase currents, using the estimated phase currents (RIU, RIV, RIW, RIAC) and the target values (IU*, IV*, IW*, IAC*) for the phase currents.

The PWM control units 4 generate ON/OFF signals (Sp1 to Sp5 and Sn1 to Sn5) for controlling the upper and lower arms (Ap1 to Ap5 and An1 to An5) of the respective legs of the power conversion units 1NA, 1NB, from the Duty commands (D1* to D5*) generated by the current control units 3.

Next, combined configurations 1 to 4 which are configuration examples in which a converter and an inverter are combined in the power conversion device of embodiment 1, will be described.

Figure 40:
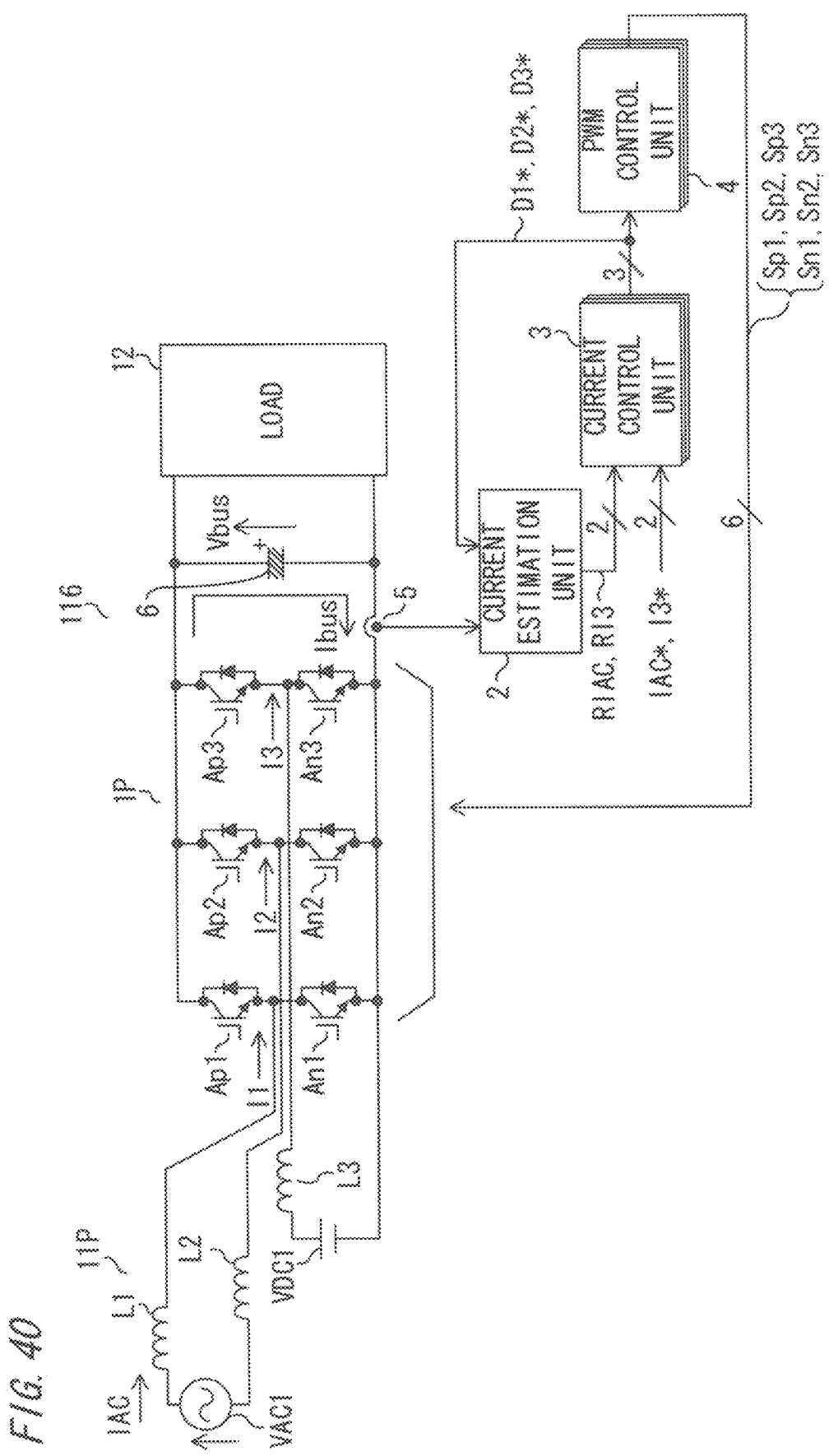
FIG. 40 is a configuration diagram showing a representative combined configuration 1 (one-input one-phase converter and single-phase two-line inverter) of the power conversion device according to embodiment 1.

FIG. 40 shows a representative combined configuration 1 of a one-phase converter and a single-phase two-line inverter.

For discrimination from the configurations in FIG. 1, etc., the power conversion device is denoted by 116. In addition, the power conversion unit is denoted by 1P and the input power supply unit is denoted by 11P.

The input power supply unit 11P of the power conversion device 116 includes reactors L1, L2 and an AC power supply VAC1, and further includes a reactor L3 and a DC power supply VDC1.

The power conversion device 116 has a three-phase configuration as a whole, and therefore includes three current control units 3 and three PWM control units 4.

The current estimation unit 2 estimates phase currents (RIAC, RI3) from the common DC bus current Ibus detected by the current detector 5 and Duty commands (D1* to D3*) generated by the current control units 3, and outputs the estimated phase currents to the current control unit 3. It is noted that the Duty command D2* is −D1*.

The current control units 3 generate Duty commands (D1* to D3*) for controlling the respective phase currents, using the estimated phase currents (RIAC, RI3) and the target values (IAC*, I3*) for the phase currents.

The PWM control units 4 generate ON/OFF signals (Sp1 to Sp3 and Sn1 to Sn3) for controlling the upper and lower arms (Ap1 to Ap3 and An1 to An3) of the respective legs of the power conversion unit 1P, from the Duty commands (D1* to D3*) generated by the current control units 3.

The setting example for the carrier cycle, the sampling cycle, phase current estimation, and the Duty command update cycle that enable estimation for each phase current in the representative combined configuration 1, is the same as in the three-phase configuration shown in embodiment 1.

Figure 41:
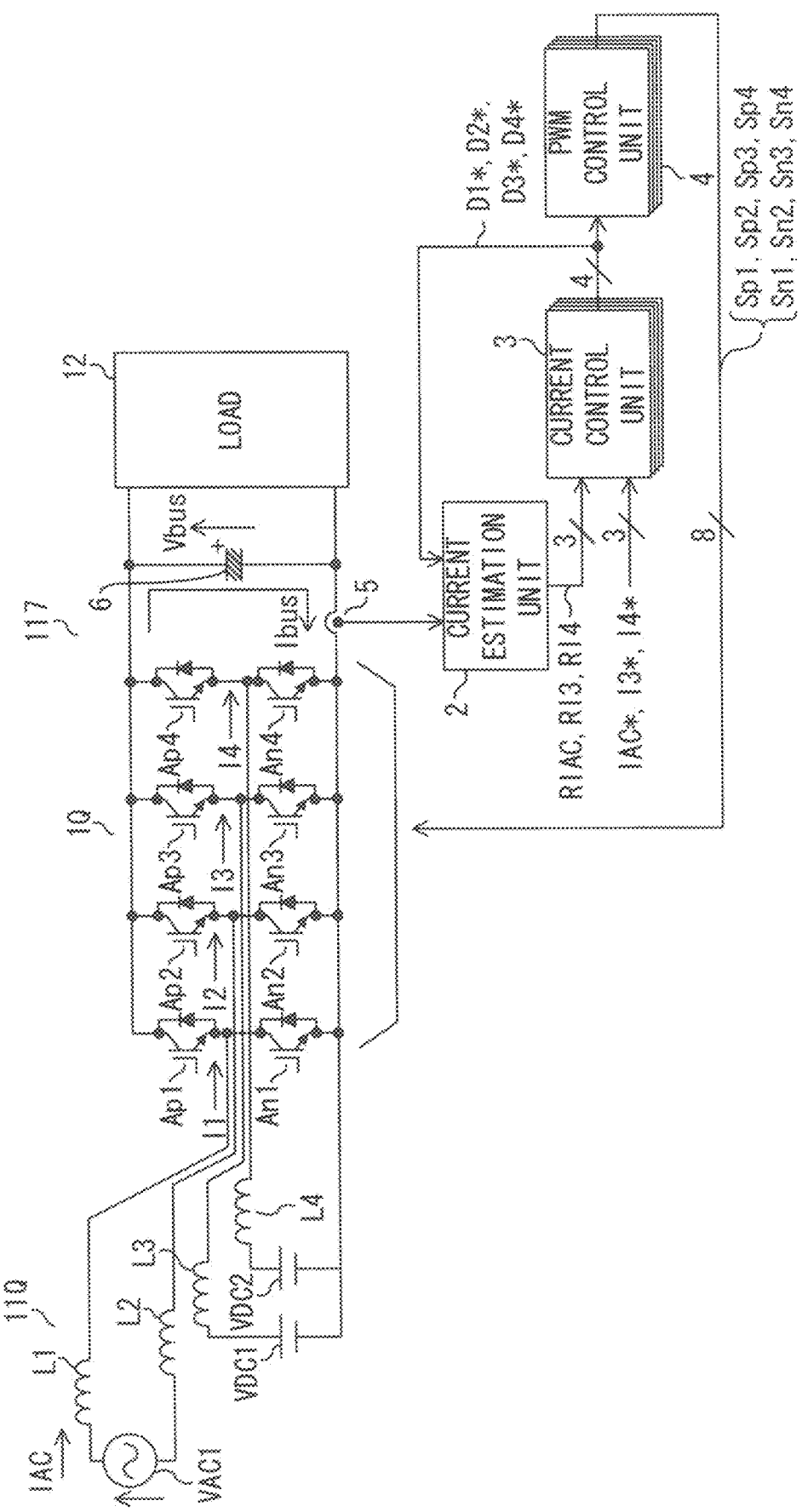
FIG. 41 is a configuration diagram showing a representative combined configuration 2 (two-input two-phase converter and single-phase two-line inverter) of the power conversion device according to embodiment 1.

FIG. 41 shows a representative combined configuration 2 of a two-input two-phase converter and a single-phase two-line inverter.

For discrimination from the configurations in FIG. 1, etc., the power conversion device is denoted by 117. In addition, the power conversion unit is denoted by 1Q and the input power supply unit is denoted by 11Q.

The input power supply unit 11Q of the power conversion device 117 includes reactors L1, L2 and an AC power supply VAC1, and further includes reactors L3, L4 and DC power supplies VDC1, VDC2.

The power conversion device 117 has a four-phase configuration as a whole, and therefore includes four current control units 3 and four PWM control units 4.

The current estimation unit 2 estimates phase currents (RIAC, RI3, RI4) from the common DC bus current Ibus detected by the current detector 5 and Duty commands (D1* to D4*) generated by the current control units 3, and outputs the estimated phase currents to the current control units 3. It is noted that the Duty command D2* is −D1*.

The current control units 3 generate Duty commands (D1* to D4*) for controlling the respective phase currents, using the estimated phase currents (RIAC, RI3, RI4) and the target values (IAC*, I3*, I4*) for the phase currents.

The PWM control units 4 generate ON/OFF signals (Sp1 to Sp4 and Sn1 to Sn4) for controlling the upper and lower arms (Ap1 to Ap4 and An1 to An4) of the respective legs of the power conversion unit 1Q, from the Duty commands (D1* to D4*) generated by the current control units 3.

A setting example for the carrier cycle, the sampling cycle, phase current estimation, and the Duty command update cycle that enable estimation for each phase current in the representative combined configuration 2 is the same as in the four-phase configuration shown in embodiment 1.

Figure 42:
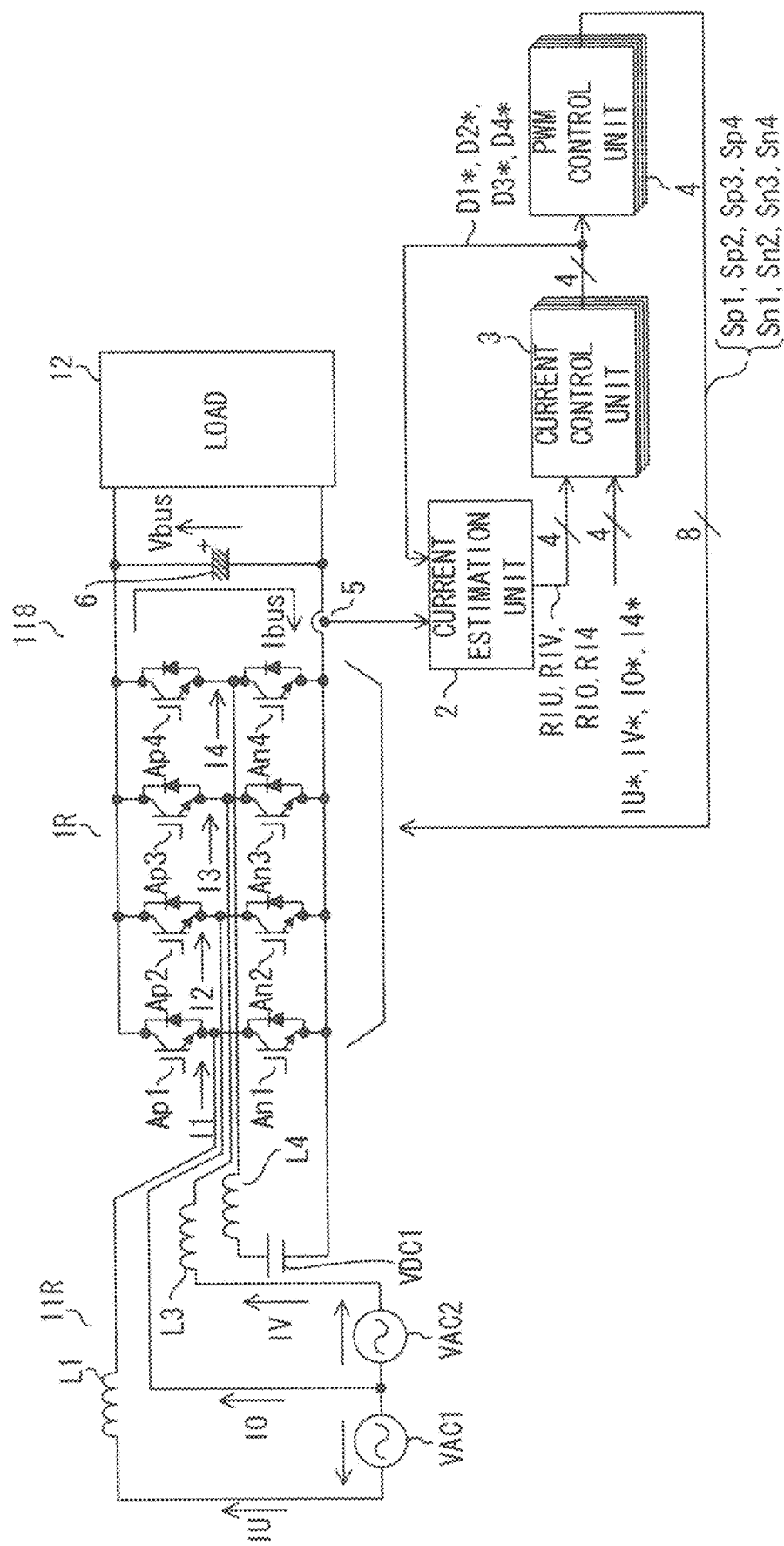
FIG. 42 is a configuration diagram showing a representative combined configuration 3 (one-input one-phase converter and single-phase three-line inverter) of the power conversion device according to embodiment 1.

FIG. 42 shows a representative combined configuration 3 of a one-phase converter and a single-phase three-line inverter.

For discrimination from the configurations in FIG. 1, etc., the power conversion device is denoted by 118. In addition, the power conversion unit is denoted by 1R and the input power supply unit is denoted by 11R.

The input power supply unit 11R of the power conversion device 118 includes reactors L1, L3 and AC power supplies VAC1, VAC2, and further includes a reactor L4 and a DC power supply VDC1.

The power conversion device 118 has a four-phase configuration as a whole, and therefore includes four current control units 3 and four PWM control units 4.

The current estimation unit 2 estimates phase currents (RIU, RIV, RIO, RI4) from the common DC bus current Ibus detected by the current detector 5 and Duty commands (D1* to D4*) generated by the current control units 3, and outputs the estimated phase currents to the current control units 3.

The current control units 3 generate Duty commands (D1* to D4*) for controlling the respective phase currents, using the estimated phase currents (RIU, RIV, RIO, RI4) and the target values (IU*, IV*, IO*, I4*) for the phase currents.

The PWM control units 4 generate ON/OFF signals (Sp1 to Sp4 and Sn1 to Sn4) for controlling the upper and lower arms (Ap1 to Ap4 and An1 to An4) of the respective legs of the power conversion unit 1R, from the Duty commands (D1* to D4*) generated by the current control units 3.

A setting example for the carrier cycle, the sampling cycle, phase current estimation, and the Duty command update cycle that enable estimation for each phase current in the representative combined configuration 3 is the same as in the four-phase configuration shown in embodiment 1.

Figure 43:
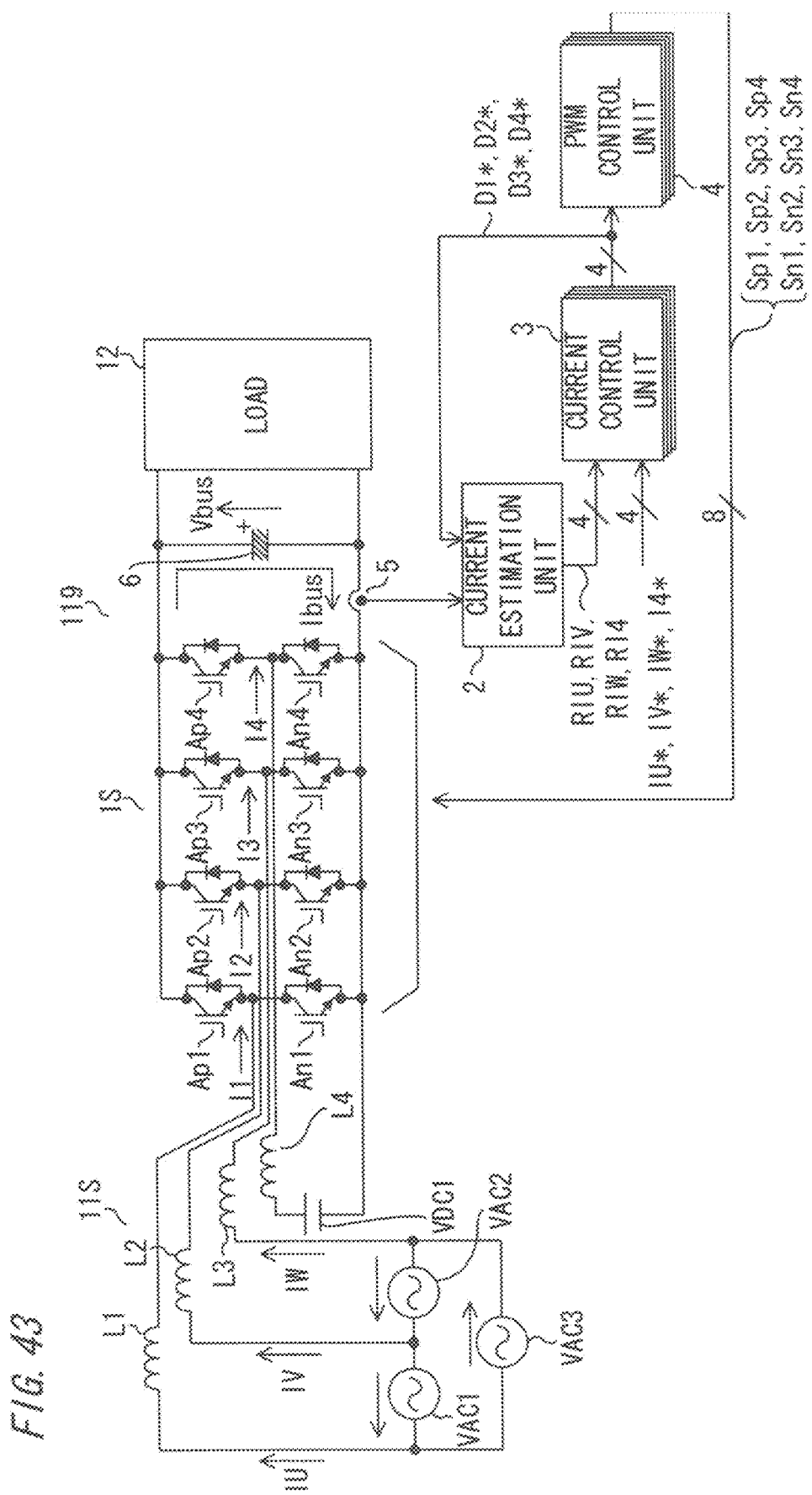
FIG. 43 is a configuration diagram showing a representative combined configuration 4 (one-input one-phase converter and three-phase three-line inverter) of the power conversion device according to embodiment 1.

FIG. 43 shows a representative combined configuration 4 of a one-phase converter and a three-phase three-line inverter.

For discrimination from the configurations in FIG. 1, etc., the power conversion device is denoted by 119. In addition, the power conversion unit is denoted by 1S and the input power supply unit is denoted by 11S.

The input power supply unit 11S of the power conversion device 119 includes reactors L1, L2, L3 and AC power supplies VAC1, VAC2, VAC3, and further includes a reactor L4 and a DC power supply VDC1.

The power conversion device 119 has a four-phase configuration as a whole, and therefore includes four current control units 3 and four PWM control units 4.

The current estimation unit 2 estimates phase currents (RIU, RIV, RIW, RI4) from the common DC bus current Ibus detected by the current detector 5 and Duty commands (D1* to D4*) generated by the current control units 3, and outputs the estimated phase currents to the current control unit 3.

The current control units 3 generate Duty commands (D1* to D4*) for controlling the respective phase currents, using the estimated phase currents (RIU, RIV, RIW, RI4) and the target values (IU*, IV*, IW*, I4*) for the phase currents.

The PWM control units 4 generate ON/OFF signals (Sp1 to Sp4 and Sn1 to Sn4) for controlling the upper and lower arms (Ap1 to Ap4 and An1 to An4) of the respective legs of the power conversion unit 1S, from the Duty commands (D1* to D4*) generated by the current control units 3.

A setting example for the carrier cycle, the sampling cycle, phase current estimation, and the Duty command update cycle that enable estimation for each phase current in the representative combined configuration 4 is the same as in the four-phase configuration shown in embodiment 1.

As described above, the function of the current estimation unit 2 is applicable also in a configuration in which different initial phase differences are set for the triangular wave carriers for the respective legs, a plurality of different power supplies are connected to the respective phases, and the plurality of legs are connected to the common DC buses.

As described above, in embodiment 1, it has been described that, using six representative configurations, the Duty command update cycle is set based on the carrier cycle of the triangular wave carriers and the DC bus current sampling cycle, whereby the ON/OFF states of the arms can be prevented from being changed at a predetermined number of detection timings for the common DC bus current Ibus. Further, it has been described that, because the matrixes to be used in the current estimation unit 2 can be managed in advance, stable estimation for the phase currents can be achieved.

It is noted that the setting for the Duty command update cycle based on the carrier cycle and the DC bus current sampling cycle aims at facilitating management for the ON/OFF states of the arms associated with changes in the Duty commands at a predetermined number of detection timings for the common DC bus current Ibus per one current estimation. However, such changes in the ON/OFF states do not occur unless, for example, for three-phase configuration, the Duty command varies through 100/3% or 200/3%. Therefore, the Duty command update cycle may be exceptionally set for only a condition in which changes in the ON/OFF states of the arms are expected, while the Duty commands may be updated at a faster cycle in a condition in which changes in the ON/OFF states of the arms are not expected.

In the description of embodiment 1, the ON/OFF states of the high-voltage-side arms are used in expressions for reproducing the phase currents. However, the same can be achieved also by using the logically inverted values of the ON/OFF operations of the low-voltage-side arms.

When one of the high-voltage-side arm and the low-voltage-side arm is a diode, reproduction for the phase currents can be achieved in the same manner using the switching element arm as a reference. In the drawings, a ripple component due to switching in each phase current is ignored, but the above configurations can be applied also when a ripple component is contained in the phase currents.

As described above, the power conversion device according to embodiment 1 includes: a power conversion unit having a plurality of legs connected to a common DC bus; a current detector for detecting current of the common DC bus; a PWM control unit for generating ON/OFF signals for the legs; a current estimation unit for estimating phase currents; and a current control unit for adjusting Duty commands so that the phase currents coincide with target values, wherein the PWM control unit generates the ON/OFF signals for controlling the power conversion unit based on the magnitude relationship between the Duty commands for the respective legs and the triangular wave carriers having different initial phases and having a common cycle, the current estimation unit acquires detected currents from the current detector at a sampling cycle different from the carrier cycle and estimates each phase current, and the current control unit adjusts the Duty commands so that the estimated values of the respective phase currents coincide with the target values at a cycle synchronized with a time equal to or greater than a least common multiple of the carrier cycle and the sampling cycle.

Therefore, the power conversion device of embodiment 1 allows different power supplies to be connected to the respective phases, and can achieve stable current estimation at a fixed cycle and current control based thereon.

Embodiment 2

A power conversion device according to embodiment 2 has a configuration including an isolation converter that operates with a phase shift, in which a PWM control unit generates ON/OFF signals for arms having the same pulse waveform with different initial phases based on individual phase shift command values for the respective legs, a current estimation unit acquires detected currents from a current detector at a sampling cycle different from the cycle of the ON/OFF signals for the arms and estimates the phase currents, and a current control unit adjusts the phase shift command values so that the estimated phase currents coincide with target values at a cycle synchronized with a time equal to or greater than a least common multiple of the sampling cycle and the cycle of the ON/OFF signals for the arms.

The power conversion device according to embodiment 2 will be described focusing on a difference from embodiment 1, with reference to FIG. 44 which is a configuration diagram showing a basic configuration, FIG. 45, FIG. 46A, and FIG. 46B which illustrate a setting example 1 for current detection timings in the basic configuration, FIG. 47 which illustrates the setting example 1 for a phase shift command update cycle that enables estimation for each phase current in the basic configuration, FIG. 48 which is a configuration diagram showing a combined configuration example with embodiment 1, FIG. 49A, FIG. 49B, FIG. 50A, and FIG. 50B which illustrate the setting example 1 for current detection timings in the combined configuration example with embodiment 1, and FIG. 51 which illustrates the setting example 1 for a phase shift command update cycle that enables estimation for each phase current in the combined configuration 1 with embodiment 1.

In the configuration diagram (FIG. 44, etc.) of embodiment 2, parts that are the same as or correspond to those in embodiment 1 are denoted by the same reference characters.

The configuration and the function/operation in a basic configuration of the power conversion device in embodiment 2 will be described with reference to FIG. 44 to FIG. 47.

First, with reference to FIG. 44, the function/operation in the basic configuration including an isolation converter will be described focusing on an input power supply unit and a power conversion unit.

Figure 44:
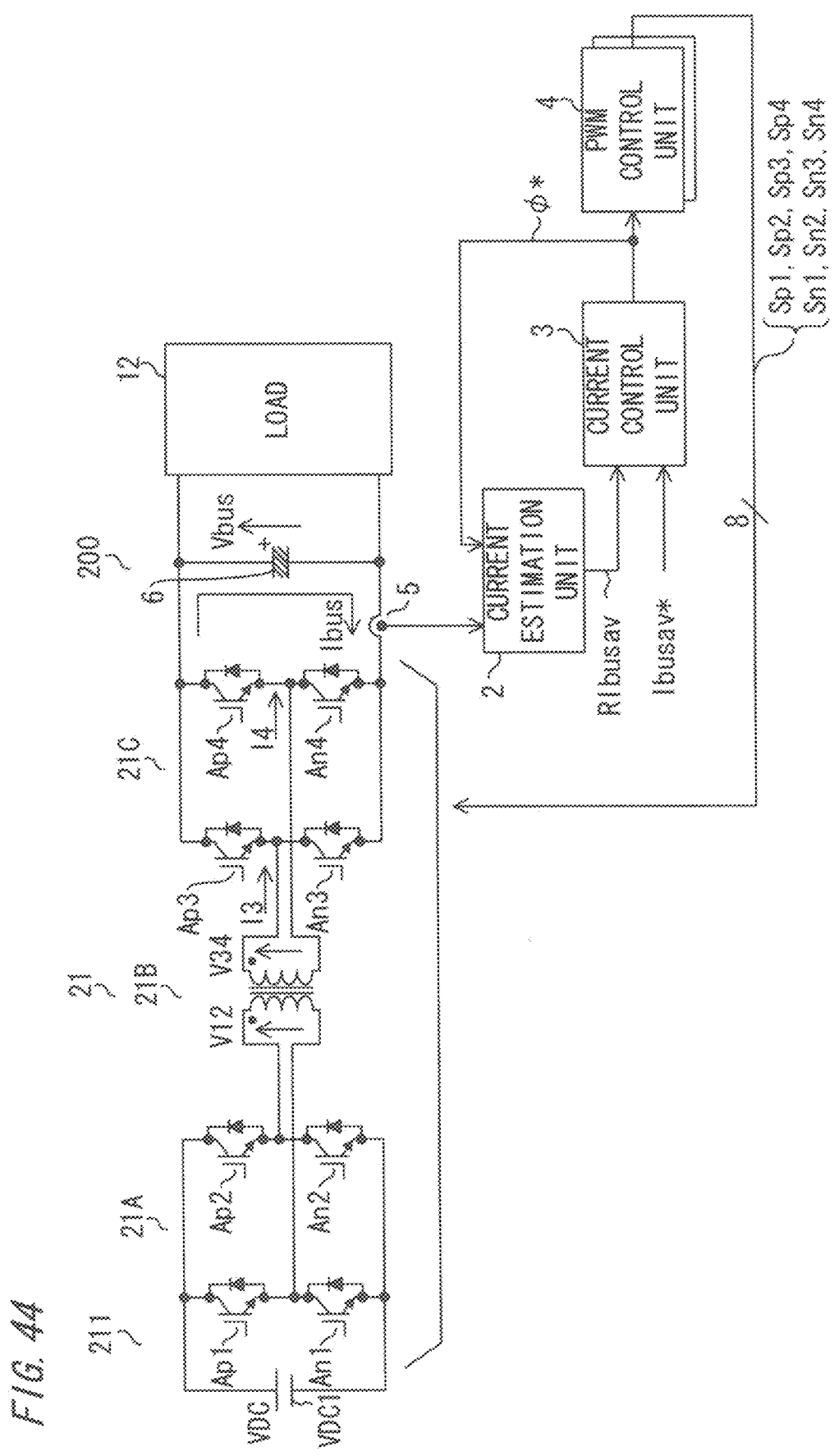
FIG. 44 is a configuration diagram showing a basic configuration of the power conversion device according to embodiment 2.

In FIG. 44, for discrimination from the configuration of embodiment 1, the power conversion device is denoted by 200, the power conversion unit is denoted by 21, and the input power supply unit is denoted by 211. A smoothing capacitor 6 is provided to the common DC buses connecting the power conversion unit 21 and the load 12.

The power conversion unit 21 includes a power conversion unit 21A having upper and lower arms (Ap1, Ap2, An1, An2), an isolation transformer 21B, and a power conversion unit 21C having upper and lower arms (Ap3, Ap4, An3, An4). In the isolation transformer 21B, voltage on the primary side (low-voltage side) is denoted by V12 and voltage on the secondary side (high-voltage side) is denoted by V34. In addition, currents on the secondary side of the isolation transformer 21B are denoted by I3, I4.

The input power supply unit 211 includes a DC power supply VDC1. Voltage of the DC power supply VDC1 is denoted by VDC.

The isolation converter which performs power transmission with a phase shift is configured such that the Duty commands between the current control units 3 and the PWM control units 4 shown in the power conversion device 101 (FIG. 2) of embodiment 1 are replaced with a phase shift command, and includes one current control unit 3 and two PWM control units 4.

In the following description, operation is assumed such that, in each of two pairs of legs provided respectively on the primary side and the secondary side of the isolation transformer 21B, the ON/OFF state of the upper arm of one of the two legs and the ON/OFF state of the lower arm of the other leg coincide with each other and similarly the ON/OFF state of the lower arm of the one leg and the ON/OFF state of the upper arm of the other leg coincide with each other.

The current estimation unit 2 estimates phase current (RIbusav) from the common DC bus current Ibus detected by the current detector 5 and a phase shift command (φ*) generated by the current control unit 3, and outputs the estimated phase current to the current control unit 3. It is noted that Ibusav is the average value of the common DC bus current Ibus.

The current control unit 3 generates a phase shift command (φ*) for controlling each phase current, using the estimated phase current (RIbusav) and a target value (Ibusav*) for the phase current.

The PWM control units 4 generate ON/OFF signals (Sp1 to Sp4 and Sn1 to Sn4) for controlling the upper and lower arms (Ap1 to Ap4 and An1 to An4) of the respective legs of the power conversion unit 1A, from the phase shift command ($\varphi^*$) generated by the current control unit 3.

Figure 45:
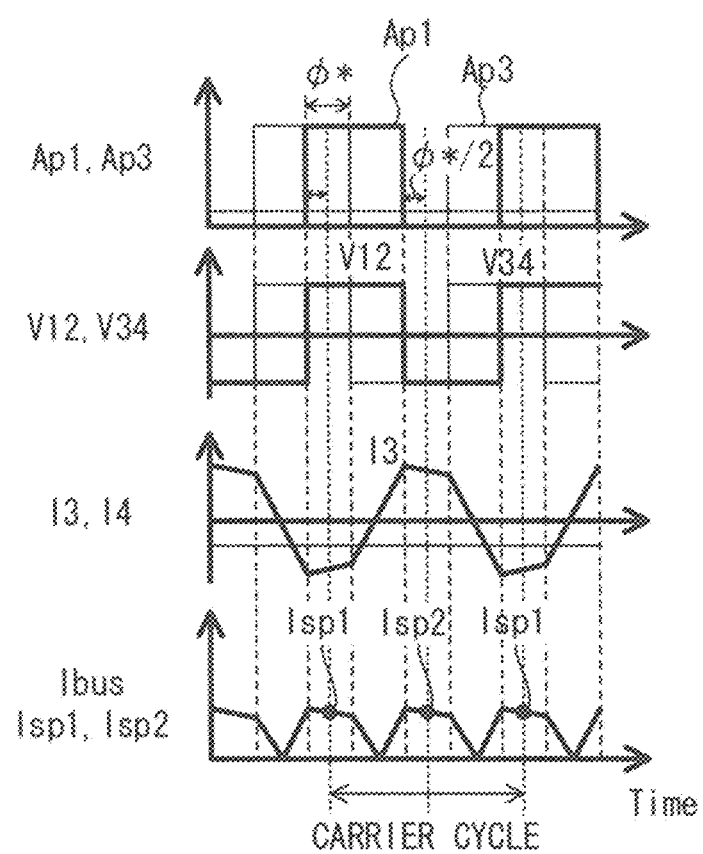
FIG. 45 illustrates a setting example 1 for current detection timings in the basic configuration of the power conversion device according to embodiment 2.
Figure 46:
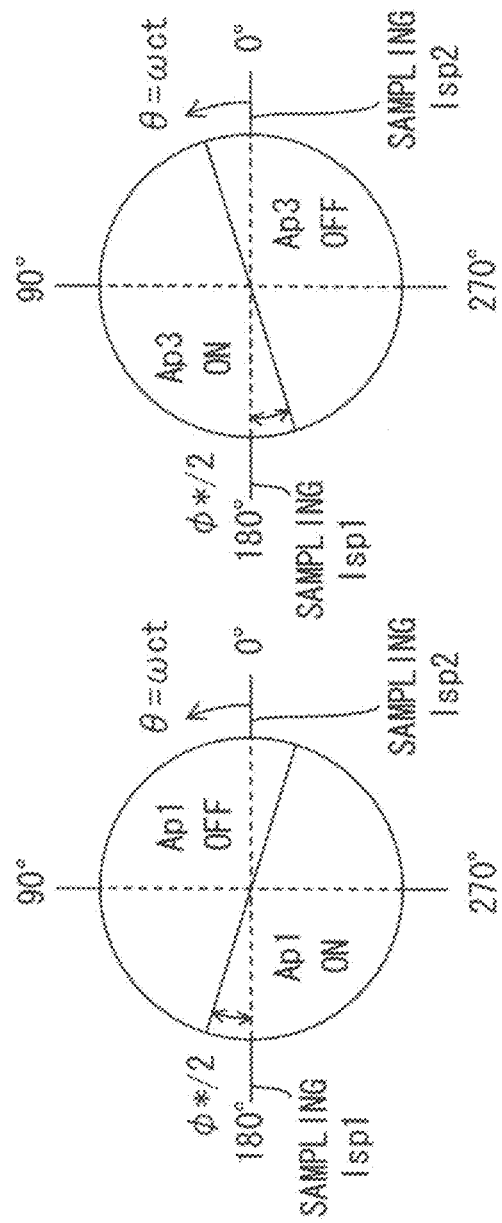
FIG. 46A illustrates the setting example 1 for current detection timings in the basic configuration of the power conversion device according to embodiment 2.
FIG. 46B illustrates the setting example 1 for current detection timings in the basic configuration of the power conversion device according to embodiment 2.

FIG. 45 and FIG. 46 show a setting example 1 for the ON/OFF states of the high-voltage-side upper arms Ap1 and Ap3, voltages on the primary side and the secondary side of the isolation transformer 21B, phase currents (I3, I4), and the detection timings for the common DC bus current Ibus in the power conversion device 200.

Specifically, FIG. 45 illustrates the relationship among the ON/OFF states of the high-voltage-side upper arms Ap1, Ap3, the primary-side voltage V12 and the secondary-side voltage V34 of the isolation transformer 21B, the phase currents (I3, I4), the common DC bus current Ibus, and the detected currents (Isp1, Isp2).

It is noted that the phase current I4 is −I3.

FIG. 46A illustrates the ON/OFF state of the upper arm Ap1 and the detection timing for the common DC bus current Ibus (i.e., detection timings for Isp1, Isp2), using a phase.

FIG. 46B illustrates the ON/OFF state of the upper arm Ap3 and the detection timings for the common DC bus current Ibus (i.e., detection timings for Isp1, Isp2), using a phase.

Here, with one cycle of the triangular wave carriers (fc1, fc3) defined as 360 degrees, the relationship between the ON/OFF states of the high-voltage-side upper arms Ap1 and Ap3 corresponding to the phase shift command, and the detection timings for the common DC bus current Ibus, can be extracted.

It is noted that An2 performs ON/OFF operation in synchronization with Ap1, and An1 and Ap2 perform ON/OFF operation in synchronization with the inverted value of the Ap1. Similarly, An4 performs ON/OFF operation in synchronization with Ap3, and An3 and Ap4 perform ON/OFF operation in synchronization with the inverted value of Ap3.

Thus, it is possible to find, in advance, a condition in which sampling error is likely to occur due to overlap between the arm ON/OFF switching timing and the detection timing for the common DC bus current Ibus.

In FIG. 45 and FIG. 46, it can be said that, for both of the two phases, sampling error is likely to occur when the phase shift command is 0 degrees and 180 degrees.

Figure 47:
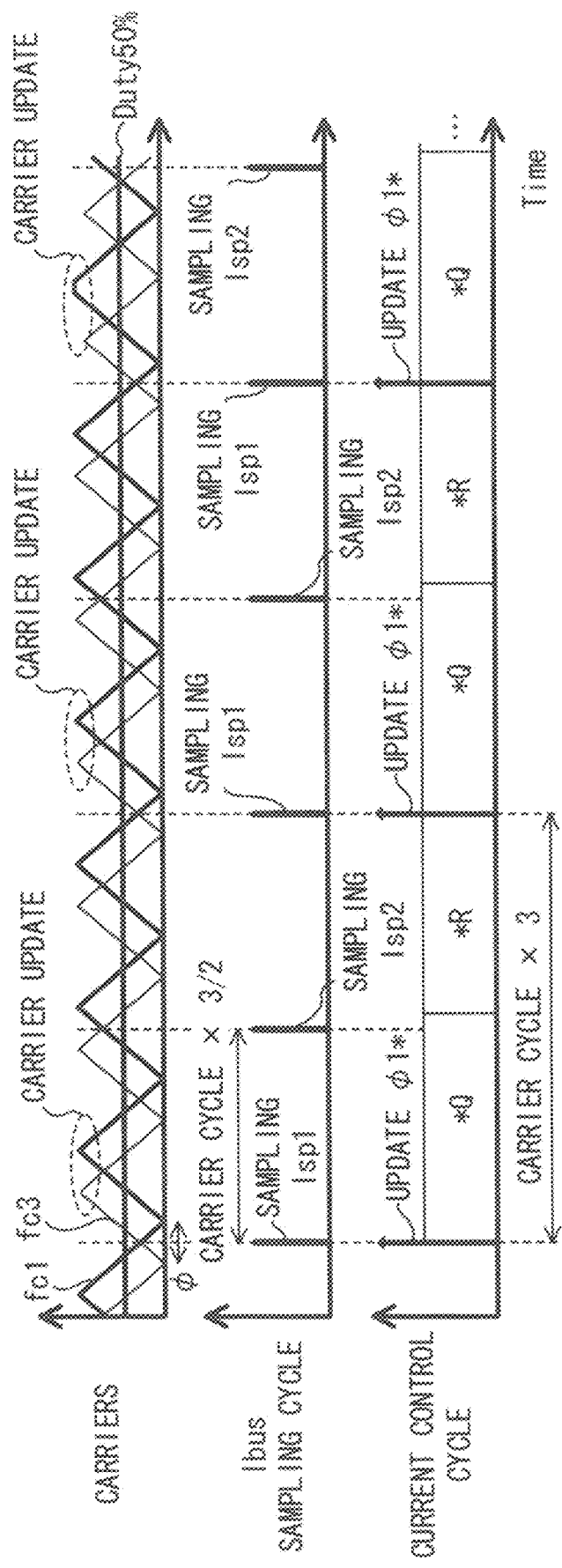
FIG. 47 illustrates the setting example 1 for a carrier cycle, a sampling cycle, phase current estimation, and a phase shift command update cycle that enable estimation for each phase current in the basic configuration of the power conversion device according to embodiment 2.
Figure 48:
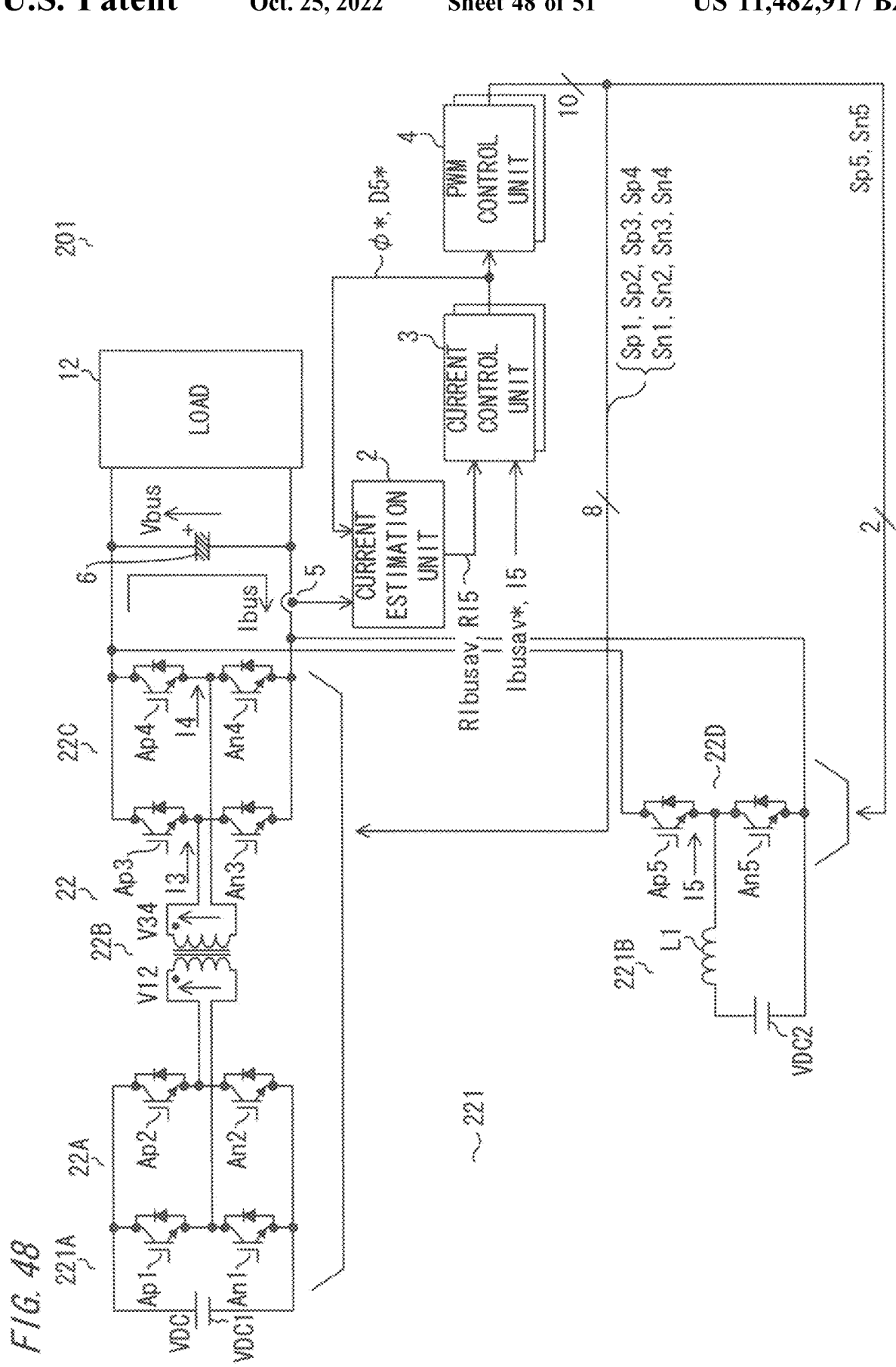
FIG. 48 is a configuration diagram showing a combined configuration example (isolation converter and one-input one-phase converter) with embodiment 1, in the power conversion device according to embodiment 2.

FIG. 47 shows the setting example 1 for a phase shift command update cycle that enables estimation for each phase current, corresponding to FIG. 45 and FIG. 46, in the power conversion device 200. Specifically, FIG. 47 shows the setting example 1 for the carrier cycle, the sampling cycle, phase current estimation, and the phase shift command update cycle that enable estimation for each phase current.

In FIG. 47, *Q represents "perform current detection (Isp1, Isp2) and estimate phase currents", and *R represents "current control". In addition, $\varphi$ is the phase shift.

Here, the carrier phase difference between the phases is set to 180 degrees, the detection timing cycle for the common DC bus current Ibus is set to 1.5 times the carrier cycle, and the cycle of current control and update for the phase shift command is 3.0 times the carrier cycle, which is the least common multiple of the carrier cycle and the current detection timing cycle.

Because the polarity of current generated in the isolation transformer 21B is switched at the carrier cycle, estimation for each phase current as shown in embodiment 1 cannot be performed. However, when there is a difference in the detected currents Isp1 and Isp2 shown in FIG. 45, this means that an offset for a DC component is generated in the isolation transformer 21B, and therefore this configuration can be used for control for canceling the DC component.

In addition, the average value of the common DC bus current Ibus can be estimated by considering the input voltage VDC, the common DC bus voltage Vbus, and the phase shift command ($\varphi^*$) with respect to the detected currents Isp1 and Isp2.

Next, a method for applying the embodiment of the present disclosure in the combined configuration of the power converter in which the average current per carrier cycle is constant as described in embodiment 1 and the power converter which performs power transmission while the average current per carrier cycle is zero as in the isolation converter, will be described.

Figure 4:
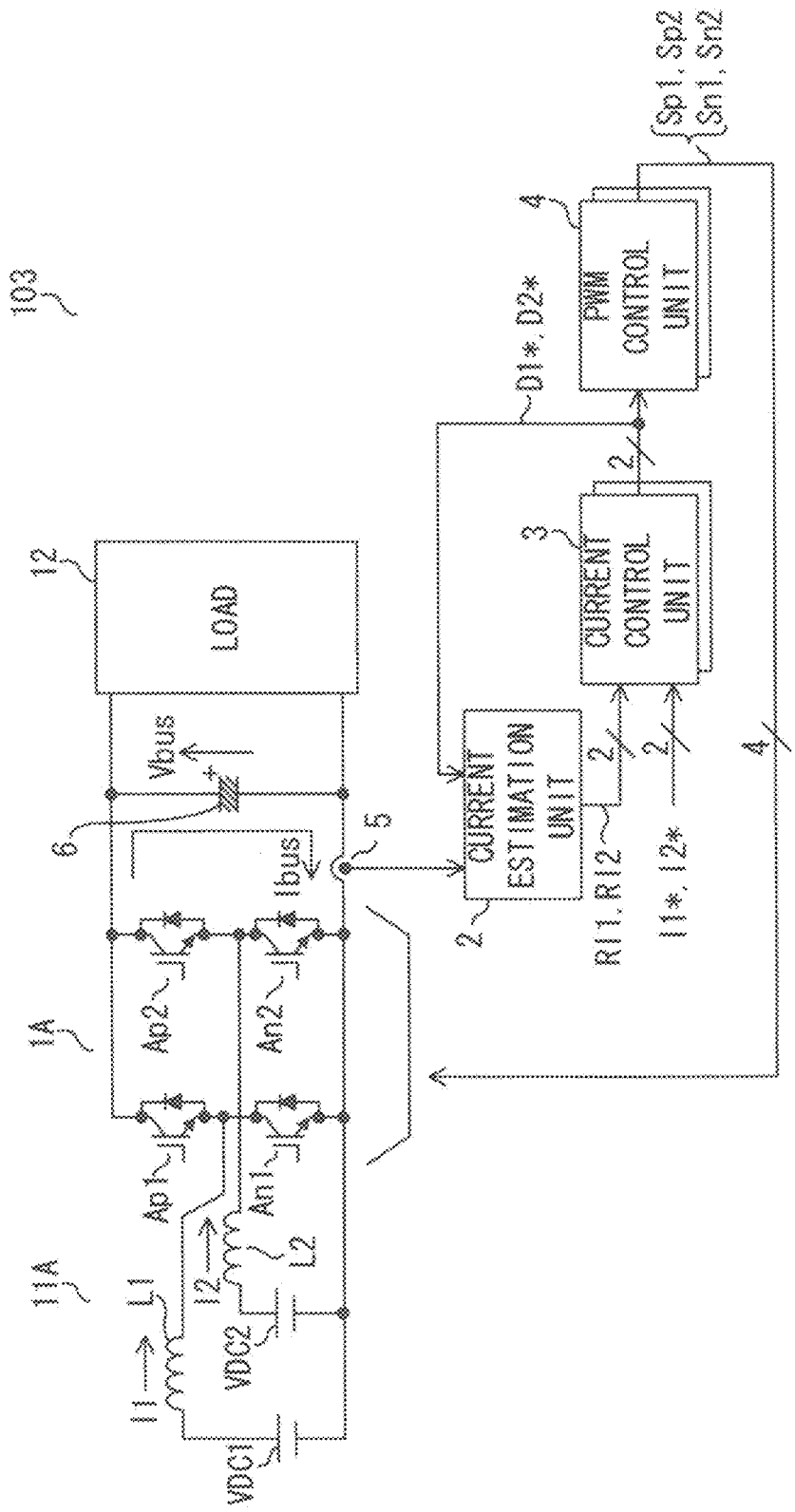
FIG. 4 is a configuration diagram showing a representative configuration 1 (two-input two-phase converter) of the power conversion device according to embodiment 1.

This power converter conceptually corresponds to a combination of the input power supply unit 11A and the power conversion unit 1A in FIG. 4 in embodiment 1, for example.

The function/operation in the combined configuration example of the power conversion device 200 including the isolation converter, and the power converter in which the average current per carrier cycle is constant as described in embodiment 1, will be described with reference to FIG. 48 to FIG. 51.

First, the input power supply unit and the power conversion unit will be mainly described with reference to FIG. 48. For discrimination from the power conversion device 200 in embodiment 2, the power conversion device is denoted by 201. In addition, the power conversion unit is denoted by 22 and the input power supply unit is denoted by 221. A smoothing capacitor 6 is provided to the common DC buses connecting the power conversion unit 22 and the load 12.

The power conversion unit 22 includes a power conversion unit 22A having upper and lower arms (Ap1, Ap2, An1, An2), an isolation transformer 22B, a power conversion unit 22C having upper and lower arms (Ap3, Ap4, An3, An4), and a power conversion unit 22D having upper and lower arms (Ap5, Ap5). In the isolation transformer 22B, voltage on the primary side (low-voltage side) is denoted by V12 and voltage on the secondary side (high-voltage side) is denoted by V34. In addition, currents on the secondary side of the isolation transformer 22B are denoted by I3, I4.

The input power supply unit 221 includes an input power supply unit 221A having a DC power supply VDC1, and an input power supply unit 221B having a reactor L1 and a DC power supply VDC2. Voltage of the DC power supply VDC1 is denoted by VDC.

The current estimation unit 2 estimates phase currents (RIbusav, I5) from the common DC bus current Ibus detected by the current detector 5 and a phase shift command and a Duty command ($\varphi^*$, D5*) generated by the current control units 3, and outputs the estimated phase currents to the current control units 3.

The current control units 3 generate a phase shift command and a Duty command ($\varphi^*$, D5*) for controlling the respective phase currents, using the estimated phase currents (RIbusav, I5) and the target values (Ibusav*, I5*) for the phase currents.

The PWM control units 4 generate ON/OFF signals (Sp1 to Sp5 and Sn1 to Sn5) for controlling the upper and lower arms (Ap1 to Ap5 and An1 to An5) of the respective legs of the power conversion unit 22, from the phase shift command and the Duty command ($\varphi^*$, D5*) generated by the current control units 3.

FIG. 49 and FIG. 50 show a setting example 1 for the triangular wave carrier, the ON/OFF states of the high-voltage-side upper arms Ap1 and Ap3, the voltages on the primary side and the secondary side of the isolation transformer 22B, the phase currents (I3, I4, I5), and the detection timings for the common DC bus current Ibus in the power conversion device 201.

Figure 49B:
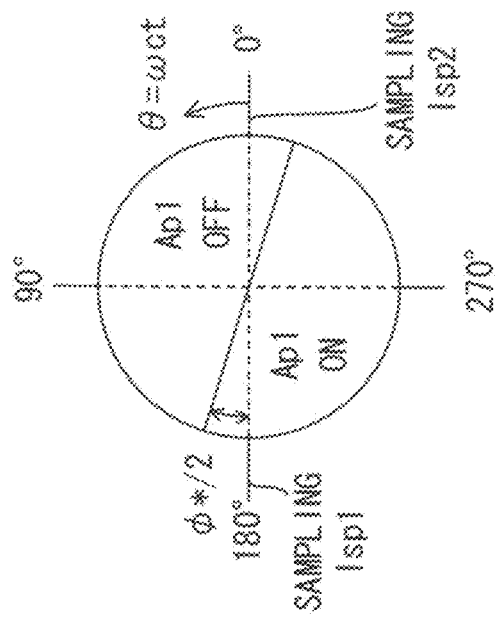
FIG. 49B illustrates the setting example 1 for current detection timings in the combined configuration example with embodiment 1, in the power conversion device according to embodiment 2.
Figure 49A:
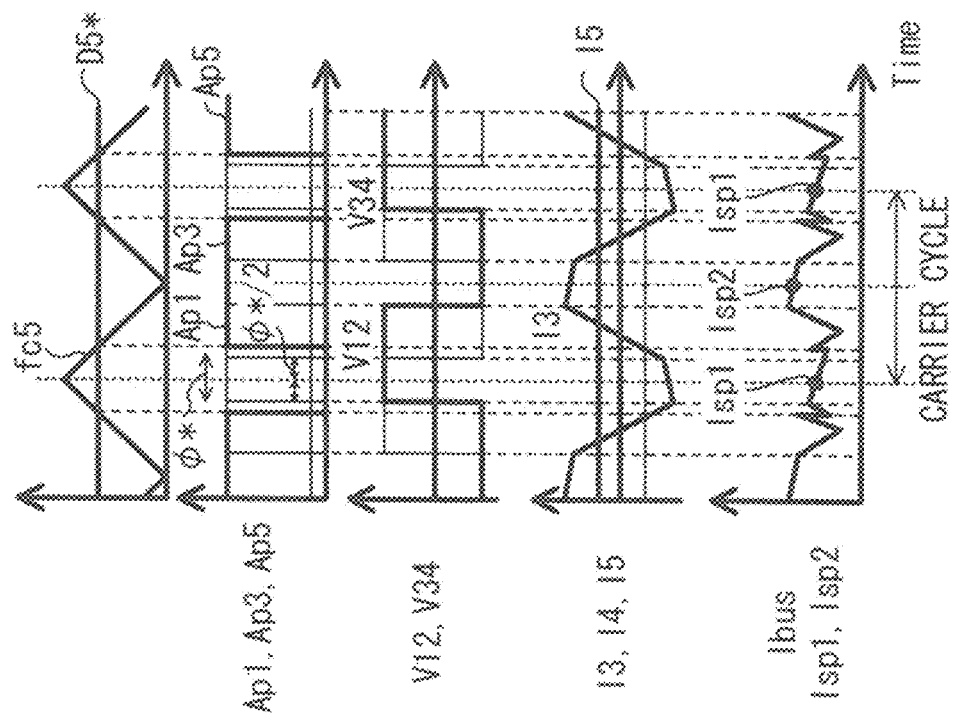
FIG. 49A illustrates a setting example 1 for current detection timings in the combined configuration example with embodiment 1, in the power conversion device according to embodiment 2.

Specifically, FIG. 49A illustrates the relationship among the triangular wave carrier (fc5), the ON/OFF states of the high-voltage-side upper arms Ap1, Ap3, Ap5, the primary-side voltage V12 and the secondary-side voltage V34 of the isolation transformer 22B, the phase currents (I3, I4, I5), the common DC bus current Ibus, and the detected currents (Isp1, Isp2).

It is noted that the phase current I4 is −I3.

FIG. 49B illustrates the ON/OFF state of the upper arm Ap1 and the detection timings for the common DC bus current Ibus, using a phase.

Figures 50A, 50B:
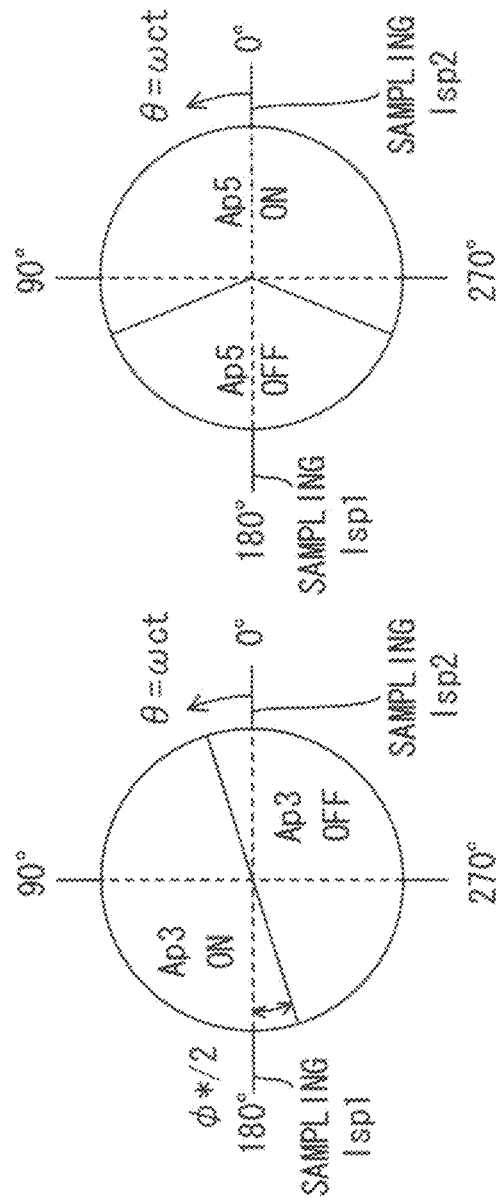
FIG. 50A illustrates the setting example 1 for current detection timings in the combined configuration example with embodiment 1, in the power conversion device according to embodiment 2.
FIG. 50B illustrates the setting example 1 for current detection timings in the combined configuration example with embodiment 1, in the power conversion device according to embodiment 2.

FIG. 50A illustrates the ON/OFF state of the upper arm Ap3 and the detection timings for the common DC bus current Ibus, using a phase.

FIG. 50B illustrates the ON/OFF state of the upper arm Ap5 and the detection timings for the common DC bus current Ibus (i.e., detection timings for Isp1, Isp2), using a phase.

Here, with one cycle of the triangular wave carriers (fc1, fc3, fc5) defined as 360 degrees, the relationship between the ON/OFF states of the high-voltage-side upper arms Ap1, Ap3, Ap5 corresponding to the phase shift command, and the detection timings for the common DC bus current Ibus, can be extracted.

Thus, it is possible to find, in advance, a condition in which sampling error is likely to occur due to overlap between the arm ON/OFF switching timing and the detection timing for the common DC bus current Ibus.

In FIG. 49 and FIG. 50, it can be said that, for both of the two phases, sampling error is likely to occur when the phase shift command is 0 degrees and 180 degrees.

Figure 51:
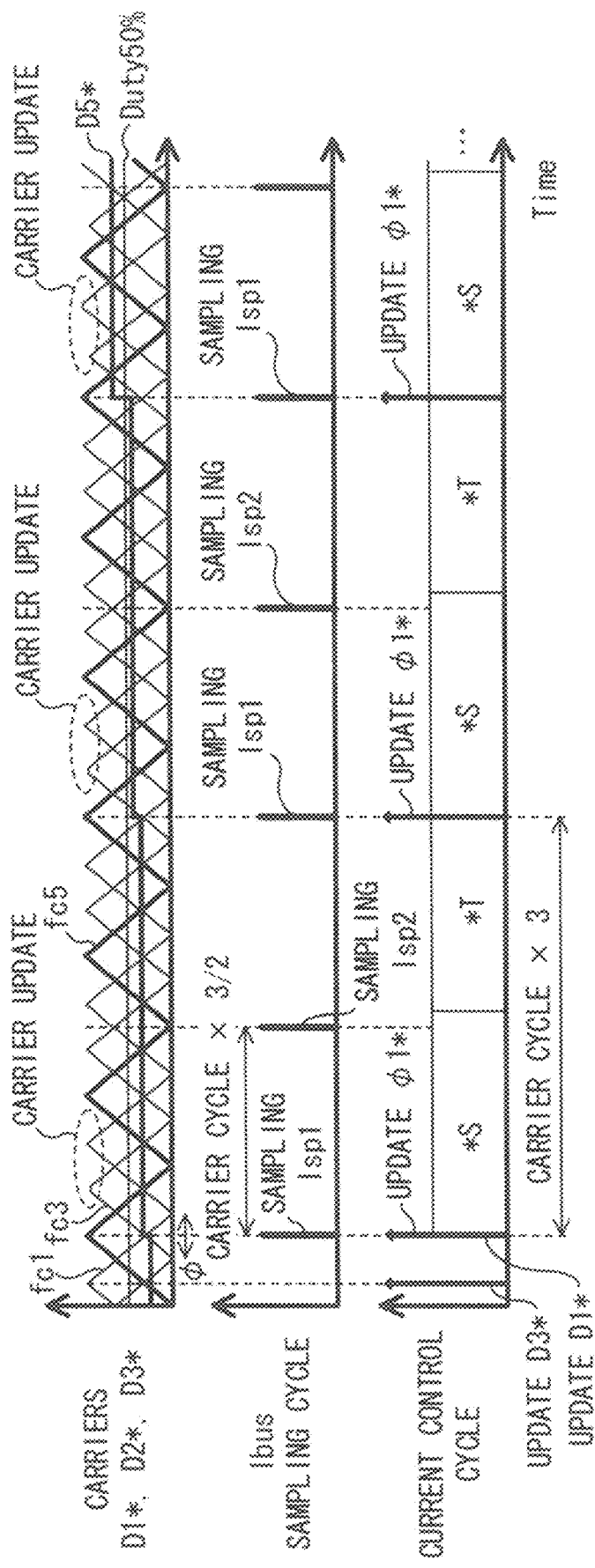
FIG. 51 illustrates the setting example 1 for a carrier cycle, a sampling cycle, phase current estimation, and a phase shift command update cycle that enable estimation for each phase current in the combined configuration 1 with embodiment 1, in the power conversion device according to embodiment 2.

FIG. 51 shows the setting example 1 for a phase shift command update cycle that enables estimation for each phase current, corresponding to FIG. 49 and FIG. 50, in the power conversion device 201. Specifically, FIG. 51 shows the setting example 1 for the carrier cycles, the sampling cycle, phase current estimation, and the phase shift command update cycle that enable estimation for each phase current.

In FIG. 51, *S represents "perform current detection (Isp1, Isp2) and estimate phase currents", and *T represents "current control". In addition, φ is the phase shift.

Here, the carrier phase difference between the phases is set to 180 degrees, the detection timing cycle for the common DC bus current Ibus is 1.5 times the carrier cycle, and the cycle of current control and update for the phase shift command is 3.0 times the carrier cycle, which is the least common multiple of the carrier cycle and the current detection timing cycle.

In the setting example in FIG. 51, while Expression (5) is established for having two non-isolation converters in the representative configuration 1 in embodiment 1, a relationship established in this configuration having one isolation converter and one non-isolation converter is represented by Expression (30).

Here, in Expression (30), the non-isolation converter 1 corresponding to the index 1 in the representative configuration 1 in embodiment 1 is replaced with the isolation converter, and the non-isolation converter 2 corresponding to the index 2 is replaced with the non-isolation converter 5.

In addition, regarding currents generated in the transformer of the isolation converter at the timings for Isp1 and Isp2, the DC deviation per carrier cycle is assumed to be a small value not greater than 1/10 of the current amplitude, and the currents generated at the two detection timings are defined as the same value IDAB.

[Mathematical 30]

$$\begin{bmatrix} Isp1 \\ Isp2 \end{bmatrix} = \begin{bmatrix} 1 & 0 \\ 1 & 1 \end{bmatrix} \begin{bmatrix} I_{DAB} \\ I5 \end{bmatrix} = Z \begin{bmatrix} I_{DAB} \\ I5 \end{bmatrix} \quad (30)$$

The determinant of the matrix Z in Expression (30) is 1, and therefore it is found that estimation using Expression (6) can be performed. It is noted that, because the average current of the isolation converter is different from IDAB, estimation may be performed while correcting the common DC bus current IDAB using the input voltage VDC, the common DC bus voltage Vbus, and the phase shift command (φ*), as described above.

Expression (31) is a generally established expression obtained by reflecting, in Expression (2), the characteristics of the power converter in which the average current per carrier cycle is zero as represented by Expression (30). In Expression (31), the power converter corresponding to the index 1 in Expression (2) is replaced with one or more power converters that output almost constant instantaneous current in all times at the detection timings for the common DC bus current Ibus.

[Mathematical 31]

$$\begin{bmatrix} Isp1 \\ Isp2 \\ \vdots \\ IspN \end{bmatrix} = \begin{bmatrix} 1 & Sp21 & \cdots & SpN1 \\ 1 & Sp22 & \cdots & SpN2 \\ \vdots & \vdots & \ddots & \vdots \\ 1 & Sp2N & \cdots & SpNN \end{bmatrix} \begin{bmatrix} I_{DAB} \\ I2 \\ \vdots \\ IN \end{bmatrix} = Z \begin{bmatrix} I_{DAB} \\ I2 \\ \vdots \\ IN \end{bmatrix} \quad (31)$$

As described above, according to embodiment 2, in the configuration obtained by including one or more power converters such as an isolation converter in which the average current per carrier cycle is zero in the configuration of embodiment 1, stable estimation for each phase current can be achieved with the same means as in embodiment 1. Although one isolation converter is used in the above description, the same effects can be obtained by any configuration that outputs almost constant current at the sampling timings for the common DC bus current Ibus, e.g., a configuration having a plurality of isolation converters.

As described above, the power conversion device of embodiment 2 has a configuration including an isolation converter that operates with a phase shift, in which a PWM control unit generates ON/OFF signals for arms having the same pulse waveform with different initial phases based on individual phase shift command values for the respective legs, a current estimation unit acquires detected currents from a current detector at a sampling cycle different from the cycle of the ON/OFF signals for the arms and estimates the phase currents, and a current control unit adjusts the phase shift command values so that the estimated phase currents coincide with target values at a cycle synchronized with a time equal to or greater than a least common multiple of the sampling cycle and the cycle of the ON/OFF signals for the arms.

Therefore, also in the configuration including an isolation converter, the power conversion device of embodiment 2 allows different power supplies to be connected to the respective phases, and can achieve stable current estimation at a fixed cycle and current control based thereon.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

INDUSTRIAL APPLICABILITY

The present disclosure allows different power supplies to be connected to the respective phases, and can achieve stable current estimation at a fixed cycle and current control based thereon, and therefore is applicable to a wide variety of power conversion devices.

DESCRIPTION OF THE REFERENCE CHARACTERS 100 to 119, 200, 201 power conversion device
1, 1A to 1H, 1J to 1N, 1P to 1S, 21, 21A, 21C, 22, 22A, 22C, 22D power conversion unit
2 current estimation unit
3 current control unit
4 PWM control unit
5 current detector
5A resistor
5B calculator
6 smoothing capacitor
11, 11A to 11H, 11J to 11N, 11P to 11S, 211, 221, 221A, 221B input power supply unit
12 load
21B, 22B isolation transformer
Ap1, Ap2, ApN upper arm
An1, An2, AnN lower arm
I1, I2, . . . , IN phase current
Ibus common DC bus current
Isp1 to Isp6 detected current
RI1, RI2, RIN, RIU, RIV, RIW, RIO, RIAC, RIbusav estimated phase current
I1*, I2*, . . . , IN*, IU*, IV*, IW*, I0*, IAC*, Ibusav* phase current target value
D1*, D2*, . . . , DN* Duty command
Sp1, Sp2, SpN upper arm ON/OFF signal
Sn1, Sn2, SnN upper arm ON/OFF signal
fc1 to fc5 triangular wave carrier
φ* phase shift command
φ phase shift
L1 to L5 reactor
VDC1 to VDC4 DC power supply
VAC1 to VAC4 AC power supply

The invention claimed is:

1. A power conversion device comprising:
a power conversion circuitry including a plurality of legs each formed by connecting a pair of two arms on upper and lower sides, each arm including a switching element, where current flowing through a path connected to a middle point between the two arms in each leg is defined as phase current, both ends of each of the plurality of legs being connected to a common DC bus;
a current detector to measure current flowing through the common DC bus;
a PWM control circuitry to generate ON/OFF signals for controlling the switching elements of the upper and lower arms in the legs;
a current estimation circuitry to estimate the phase current; and
a current control circuitry to control the phase current, wherein
the PWM control circuitry generates the ON/OFF signals for controlling the switching elements in the legs based on a magnitude relationship between individual Duty commands for the respective legs and triangular wave carriers having different initial phases for the respective legs and having a common cycle,
the current estimation circuitry acquires detected values from the current detector at a fixed sampling cycle different from the carrier cycle of the triangular wave carriers, and estimates the phase currents of the legs, and
the current control circuitry adjusts the Duty commands so that the estimated phase currents coincide with target values for the phase currents.

2. The power conversion device according to claim 1, wherein
the current estimation circuitry acquires the detected values from the current detector at the sampling cycle different from the carrier cycle and synchronized with a timing coinciding with a maximum value or a minimum value of a plurality of the triangular wave carriers, and estimates the phase currents.

3. The power conversion device according to claim 2, wherein
the sampling cycle is equal to or greater than 1/2 of the common cycle of the plurality of the triangular wave carriers.

4. The power conversion device according to claim 2, wherein
the sampling cycle is set so that the detected value is detected only one or two times in one cycle of the triangular wave carriers.

5. The power conversion device according to claim 2, wherein
the sampling cycle is set so that acquiring timing of the detected values coincides with the timing of a maximum value or a minimal value successively.

6. The power conversion device according to claim 2, wherein
the current estimation circuitry estimates the phase currents of the legs, using the detected values from the current detector, a number of which is equal to a number of the phase currents.

7. The power conversion device according to claim 2, wherein
a plurality of the triangular wave carriers in the PWM control circuitry have different initial phase differences.

8. The power conversion device according to claim 2, wherein
different DC power supplies or a common DC power supply is connected to a plurality of the paths for the phase currents of the power conversion circuitry.

9. The power conversion device according to claim 2, wherein
a single-phase AC power supply or a multiple-phase AC power supply is connected to a plurality of the paths for the phase currents of the power conversion circuitry.

10. The power conversion device according to claim 2, wherein
a DC power supply and an AC power supply are connected to a plurality of the paths for the phase currents of the power conversion circuitry.

11. The power conversion device according to claim 2, wherein
a plurality of the paths for the phase currents of the power conversion circuitry are connected to a transformer path on a primary side or a secondary side of an isolation converter that operates with a phase shift.

12. The power conversion device according to claim 1, wherein
the current estimation circuitry estimates the phase currents of the legs, using the detected values from the current detector, a number of which is equal to a number of the phase currents.

13. The power conversion device according to claim 1, wherein
a plurality of the triangular wave carriers in the PWM control circuitry have different initial phase differences.

14. The power conversion device according to claim 1, wherein
different DC power supplies or a common DC power supply is connected to a plurality of the paths for the phase currents of the power conversion circuitry.

15. The power conversion device according to claim 1, wherein
a single-phase AC power supply or a multiple-phase AC power supply is connected to a plurality of the paths for the phase currents of the power conversion circuitry.

16. The power conversion device according to claim 1, wherein
a DC power supply and an AC power supply are connected to a plurality of the paths for the phase currents of the power conversion circuitry.

17. The power conversion device according to claim 1, wherein
a plurality of the paths for the phase currents of the power conversion circuitry are connected to a transformer path on a primary side or a secondary side of an isolation converter that operates with a phase shift.

18. A power conversion device comprising:
a power conversion circuitry including a plurality of legs each formed by connecting a pair of two arms on upper and lower sides, each arm including a switching element, where current flowing through a path connected to a middle point between the two arms in each leg is defined as phase current, both ends of each of the plurality of legs being connected to a common DC bus;
a current detector to measure current flowing through the common DC bus;
a PWM control circuitry to generate ON/OFF signals for controlling the switching elements of the upper and lower arms in the legs;
a current estimation circuitry to estimate the phase current; and
a current control circuitry to control the phase current, wherein
a transformer path on a primary side or a secondary side of an isolation converter that operates with a phase shift is connected to a plurality of the paths for the phase currents of the power conversion circuitry,
the PWM control circuitry generates the ON/OFF signals for controlling the switching elements in the legs based on a magnitude relationship between individual phase shift commands for the respective legs and triangular wave carriers having different initial phases for the respective legs and having a common cycle,
the current estimation circuitry acquires detected values from the current detector at a sampling cycle different from the carrier cycle of the triangular wave carriers and synchronized with a timing coinciding with a maximum value and a minimum value of a plurality of the triangular wave carriers, and estimates the phase currents, and
the current control circuitry adjusts the phase shift commands so that the estimated phase currents coincide with target values for the phase currents.

19. A power conversion device comprising:
a power conversion circuitry including a plurality of legs each formed by connecting a pair of two arms on upper and lower sides, each arm including a switching element, where current flowing through a path connected to a middle point between the two arms in each leg is defined as phase current, both ends of each of the plurality of legs being connected to a common DC bus;
a current detector to measure current flowing through the common DC bus;
a PWM control circuitry to generate ON/OFF signals for controlling the switching elements of the upper and lower arms in the legs;
a current estimation circuitry to estimate the phase current; and
a current control circuitry to control the phase current, wherein
the PWM control circuitry generates the ON/OFF signals for controlling the switching elements in the legs based on a magnitude relationship between individual Duty commands for the respective legs and triangular wave carriers having different initial phases for the respective legs and having a common cycle,
the current estimation circuitry acquires detected values from the current detector at a sampling cycle different from the carrier cycle of the triangular wave carriers, and estimates the phase currents of the legs, and
the current control circuitry adjusts the Duty commands so that the estimated phase currents coincide with target values for the phase currents, and
the current control circuitry adjusts the Duty commands so that the estimated phase currents coincide with the target values for the phase currents, at a cycle synchronized with a time equal to or greater than a least common multiple of the carrier cycle and the sampling cycle.

20. A power conversion device comprising:
a power conversion circuitry including a plurality of legs each formed by connecting a pair of two arms on upper and lower sides, each arm including a switching element, where current flowing through a path connected to a middle point between the two arms in each leg is defined as phase current, both ends of each of the plurality of legs being connected to a common DC bus;

a current detector to measure current flowing through the common DC bus;

a PWM control circuitry to generate ON/OFF signals for controlling the switching elements of the upper and lower arms in the legs;

a current estimation circuitry to estimate the phase current; and a current control circuitry to control the phase current, wherein the PWM control circuitry generates the ON/OFF signals for controlling the switching elements in the legs based on a magnitude relationship between individual Duty commands for the respective legs and triangular wave carriers having different initial phases for the respective legs and having a common cycle, the current estimation circuitry acquires detected values from the current detector at a sampling cycle different from the carrier cycle of the triangular wave carriers, and estimates the phase currents of the legs, and the current control circuitry adjusts the Duty commands so that the estimated phase currents coincide with target values for the phase currents, wherein a DC power supply and an AC power supply are connected to a plurality of the paths for the phase currents of the power conversion circuitry, and wherein the PWM control circuitry generates the ON/OFF signals for controlling the switching elements in the legs, such that the ON/OFF signals have a same pulse waveform with different initial phases for the respective legs, based on individual phase shift commands for the respective legs, the current estimation circuitry acquires the detected values from the current detector at a sampling cycle different from a cycle of the ON/OFF signals, and estimates the phase currents for the respective legs at a cycle synchronized with a time equal to or greater than a least common multiple of the sampling cycle and the cycle of the ON/OFF signals, and the current control circuitry adjusts the phase shift commands so that the estimated phase currents coincide with the target values for the phase currents.

* * * * *